Sept. 22, 1959     D. GOLDEN     2,905,930

DATA TRANSFER SYSTEM

Filed May 24, 1954     19 Sheets-Sheet 1

INVENTOR.
DANIEL GOLDEN
BY S.C. Yuter
ATTORNEY

INVENTOR.
DANIEL GOLDEN
BY S.C. Yuter
ATTORNEY

Sept. 22, 1959     D. GOLDEN     2,905,930
DATA TRANSFER SYSTEM
Filed May 24, 1954     19 Sheets-Sheet 3

GATE 1620

BUFFER 1640

DELAY LINE 1660

*INVENTOR.*
DANIEL GOLDEN
BY S.C. Yuter
*ATTORNEY.*

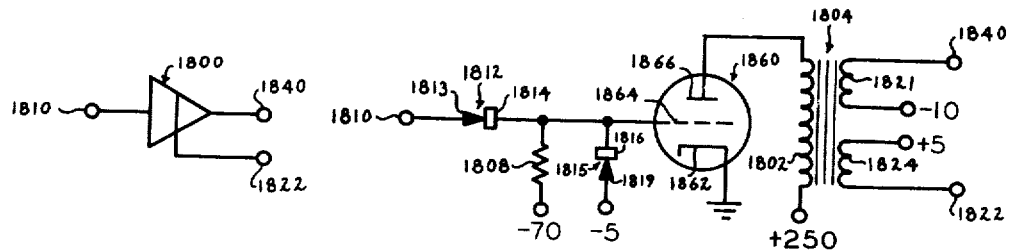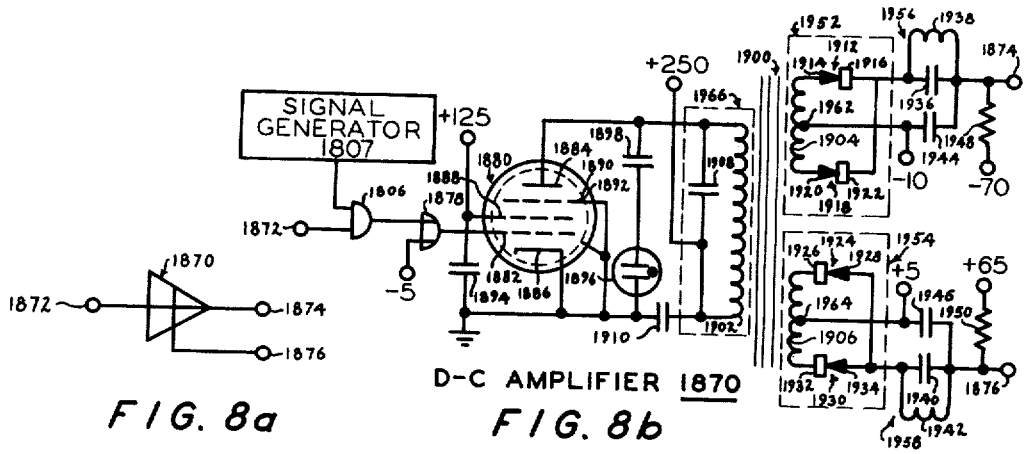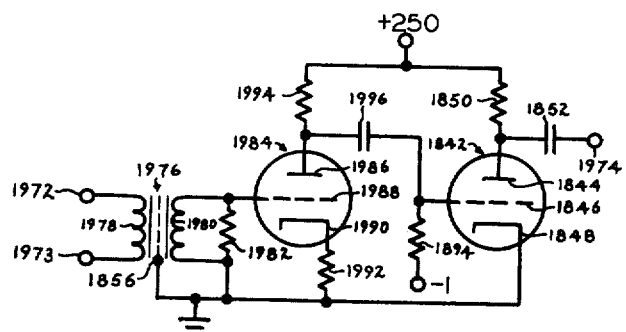

WRITE AMPLIFIER 1790

Sept. 22, 1959     D. GOLDEN     2,905,930
DATA TRANSFER SYSTEM
Filed May 24, 1954     19 Sheets-Sheet 6

RESHAPER 1734

SET DOMINANT FLIP FLOP 1700

RESET DOMINANT FLIP FLOP 1718

BINARY COUNTER STAGE 2000

INVENTOR.
DANIEL GOLDEN

BY S.C. Yuter
ATTORNEY.

Sept. 22, 1959  D. GOLDEN  2,905,930
DATA TRANSFER SYSTEM
Filed May 24, 1954  19 Sheets-Sheet 7

DRUM STORAGE UNIT 200

INVENTOR.
DANIEL GOLDEN
BY S.C. Yuter
ATTORNEY

Sept. 22, 1959  D. GOLDEN  2,905,930
DATA TRANSFER SYSTEM
Filed May 24, 1954  19 Sheets-Sheet 8

CLOCK PULSE GENERATOR 300

INVENTOR.
DANIEL GOLDEN
BY S.C. Yutter
ATTORNEY.

TIMING PULSE GENERATOR 322

INVENTOR.
DANIEL GOLDEN

CONVERTER 500

INVENTOR.
DANIEL GOLDEN
BY S.C. Yuter
ATTORNEY.

Sept. 22, 1959  D. GOLDEN  2,905,930
DATA TRANSFER SYSTEM
Filed May 24, 1954  19 Sheets-Sheet 18

TWENTY-EIGHT CHARACTER LENGTH LABEL

FORTY CHARACTER LENGTH LABEL

INVENTOR.
DANIEL GOLDEN
BY S.C. Yuter
ATTORNEY

United States Patent Office 2,905,930
Patented Sept. 22, 1959

2,905,930

DATA TRANSFER SYSTEM

Daniel Golden, Bronx, N.Y., assignor to Underwood Corporation, New York, N.Y., a corporation of Delaware Application May 24, 1954, Serial No. 431,766

16 Claims. (Cl. 340—174)

This invention relates to data handling, and more particularly to a data transfer system for transferring data from the storage unit of data processor to a high speed printer.

The processing of data in data processors may consist of computing, sorting and collating operations upon mixed numerical and alphabetic data. A typical example would be a magazine subscription billing operation wherein mixed numerical and alphabetic data such as the customer's name, address, subscription date, payment date, expiration date, route, account number, and amount owing is processed.

This mixed data can best be handled by expressing the data as coded numbers. Thus, a data character representing a numerical digit, a letter of the alphabet or a symbol may be expressed as a coded number using the binary system of notation.

After the mixed data has been processed it is necessary to store the processed data preparatory to printing out the result of the processing operation. Information storage media such as magnetic tapes and perforated tapes have been widely used for storing coded information in the form of magnetized spots or perforations. The storage media is theoretically divided into a plurality of longitudinal channels or tracks corresponding in number to the number of bits in the code being used to represent a character of data (as for example a six digit binary code requires six channels), and also into a multitude of storage zones each of which extends laterally across the storage media. Each storage zone is composed of a plurality of adjacent storage positions, one in each channel, each of which stores a bit of data expressed as the presence or absence of a given magnetic polarization or the presence or absence of a perforation. Each binary coded number stored in a storage zone of the storage media represents a character of data.

The processed data is generally stored in the storage media in groups of a fixed number of characters, hereinafter referred to as blocks of data, separated by spaces carrying no data. The arrangement of data within a block includes a predetermined number of successive groups of characters.

At the present time high speed printers, such as the presently available Eastman Kodak Printer, are capable of simultaneously printing a predetermined number of lines of data, corresponding to the predetermined number of successive groups of characters in a block of data, during each printing cycle. Thus, for example, if a block of data is composed of two hundred characters arranged into five groups of forty characters, the printer will simultaneously print out five lines of forty characters corresponding to the five groups of forty characters in the block of data.

Furthermore, a high speed printer of this type has certain characteristics such as, printing continuously, printing a predetermined number of characters at a time, and printing at a predetermined speed.

Hence, several problems arise in connection with the printing of data which is stored in serial block form in the storage unit of a data processor.

Firstly, since the data transmitted from the storage unit is transmitted in blocks separated by spaces containing no data, the data is transmitted in a discontinuous manner. Therefore, since the printer prints data continuously this data must be put into continuous form.

Secondly, since the data in each block occurs serially (that is, each group of characters to be printed follows the next), and since the printer prints in parallel (that is, a plurality of characters at a time), the form of the data must be changed from a serial to a parallel arrangement.

Thirdly, since the rate at which the data is read from the storage unit may be different from that at which the printer prints, it may require data rate converison.

Accordingly, an object of the present invention is to provide a transfer system for transferring data in digital form from the storage unit of a data processor to a high speed printer.

Another object of the invention is to provide a system for readily converting data in one form and at one rate to a second form at a different rate.

Still another object of the invention is to provide a system for arranging data while it is being transferred from one storage unit to another storage unit.

A further object of the invention is to provide apparatus for storing data in a predetermined order and reading out the stored data in a different predetermined order.

A still further object of the invention is to selectively store data in a predetermined arrangement such that it may read out in proper sequence.

In accordance with the present invention a data transfer system is provided for transferring serial blocks of data, each block consisting of a predetermined number of successive groups of characters, from the storage unit of a data processor to a high speed printer which prints each group of characters simultaneously and in parallel.

More particularly, the data transfer system includes: a main recirculation storage for storing blocks of data utilizing a magnetic storage drum as the main component; a first converter for converting parallel coded character signals read at one rate from the storage unit of the data processor to serial coded character signals at the drum rate for storing in the main recirculation storage; an intermediate storage device for intermediately storing the serial coded character signals until the proper storing spaces in the main recirculation storage appears, the groups of characters in each block of data being sequentially transferred from the intermediate storage device and stored in a predetermined sequence in the main recirculation storage such that the odd character signals of each group of characters are sequentially stored in increasing order in one portion of the main recirculation storage while the even character signals of each group of characters are sequentially stored in increasing order in the remaining portion of the main recirculation storage; a second converter responsive to each group of characters simultaneously and in parallel for converting the serial coded character signals in each group of data to parallel coded character signals; and a sampling control means associated with the second converter for simultaneously sampling each group of characters received by the second converter in a predetermined sequence at the printer rate such that the individual parallel coded character signals in each group of data are simultaneously sampled in increasing numerical order and transmitted to the printer.

The invention, including other objects, features and advantages, will be best understood by referring now to the detailed description, taken in connection with the accompanying drawings, in which:

Figs. 4a to 14a illustrate the logical symbols which are used to describe the logical diagrams of the various block symbols, while Figs. 4b to 14b illustrate the schematic circuits of the corresponding logical symbols.

Fig. 4a shows the logical symbol for a gate.

Figure 4A:
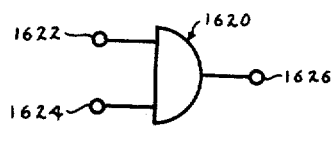
Figure 4B:
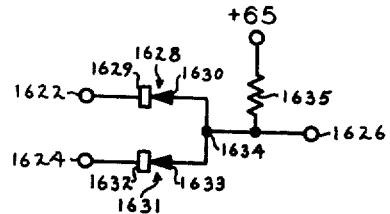

Fig. 4b schematically illustrates the circuit of a gate.

Figure 5A:
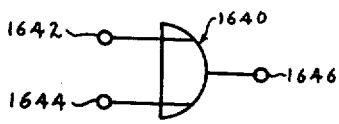

Fig. 5a shows the logical symbol for a buffer.

Figure 5B:
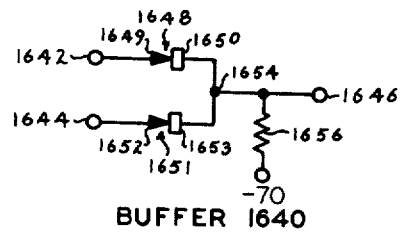

Fig. 5b schematically shows the circuit of a buffer.

Figure 6A:
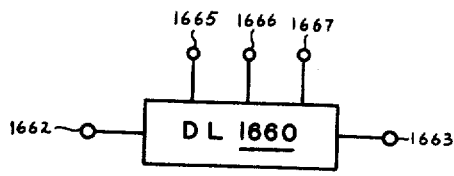

Fig. 6a shows the logical symbol for a delay line.

Figure 6B:
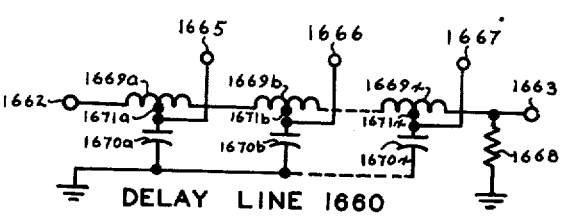

Fig. 6b illustrates the schematic circuitry of a delay line.

Fig. 7a illustrates the logical symbol for a pulse amplifier.

Fig. 7b is a schematic diagram of a pulse amplifier.

Fig. 8a shows the logical symbol for a D.C. amplifier.

Fig. 8b schematically illustrates the circuitry of a D.C. amplifier.

Fig. 9a illustrates the logical symbol for a drum reading amplifier.

Fig. 9b shows the schematic circuit of a drum reading amplifier.

Figure 10A:
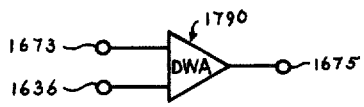

Fig. 10a shows the logical symbol for a drum writing amplifier.

Figure 10B:
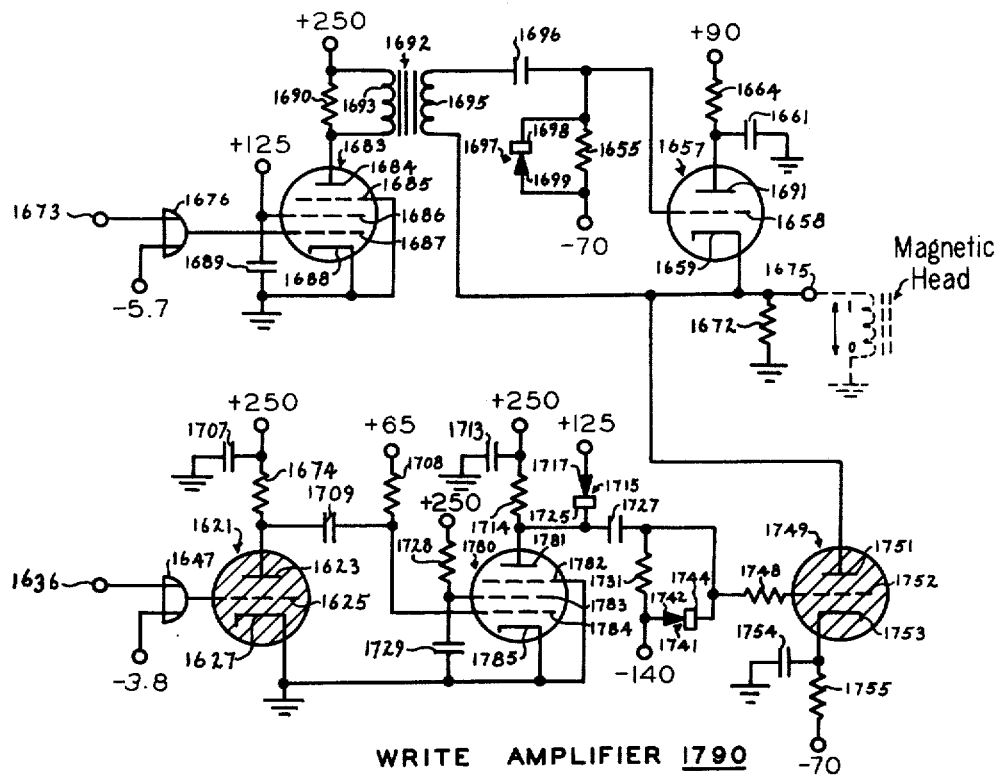

Fig. 10b illustrates the schematic circuitry of a drum writing amplifier.

Figure 11A:
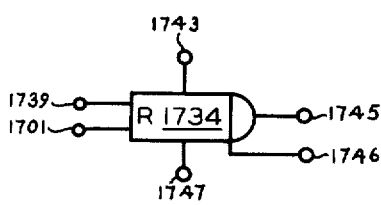

Fig. 11a illustrates the logical symbol of a reshaper.

Figure 11B:
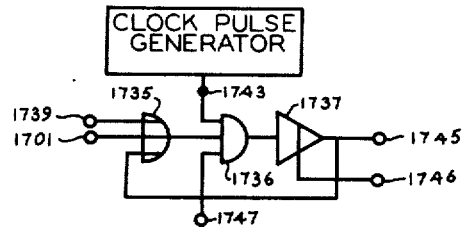

Fig. 11b illustrates the logical details of a reshaper.

Figure 12A:
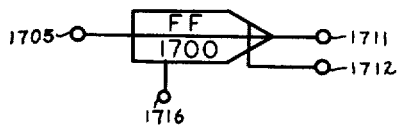

Fig. 12a shows the logical symbol for a set dominant flip flop.

Figure 12B:
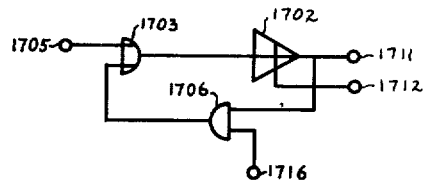

Fig. 12b shows the logical circuit of a set dominant flip flop.

Figure 13A:
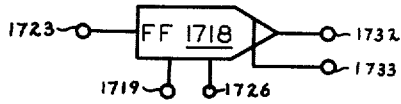

Fig. 13a illustrates the logical symbol of a reset dominant flip flop.

Figure 13B:
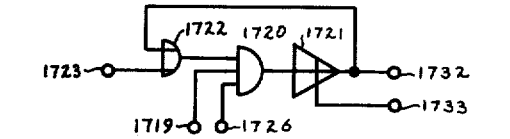

Fig. 13b illustrates the logical circuit of a reset dominant flip flop.

Figure 14A:
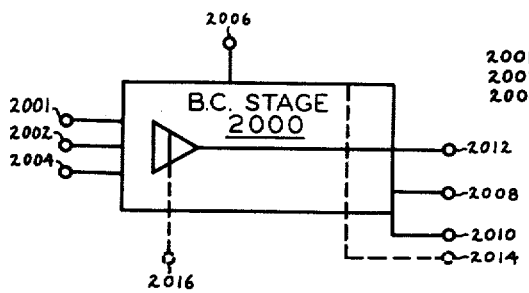

Fig. 14a illustrates the logical symbol of a binary counter stage.

Figure 14B:
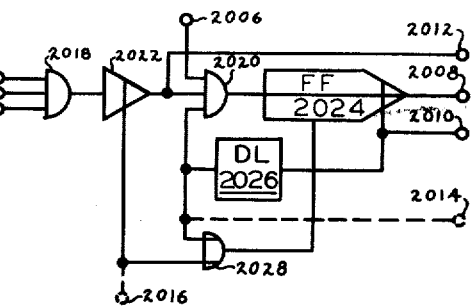

Fig. 14b shows the logical details of a binary counter stage.

Figure 15:
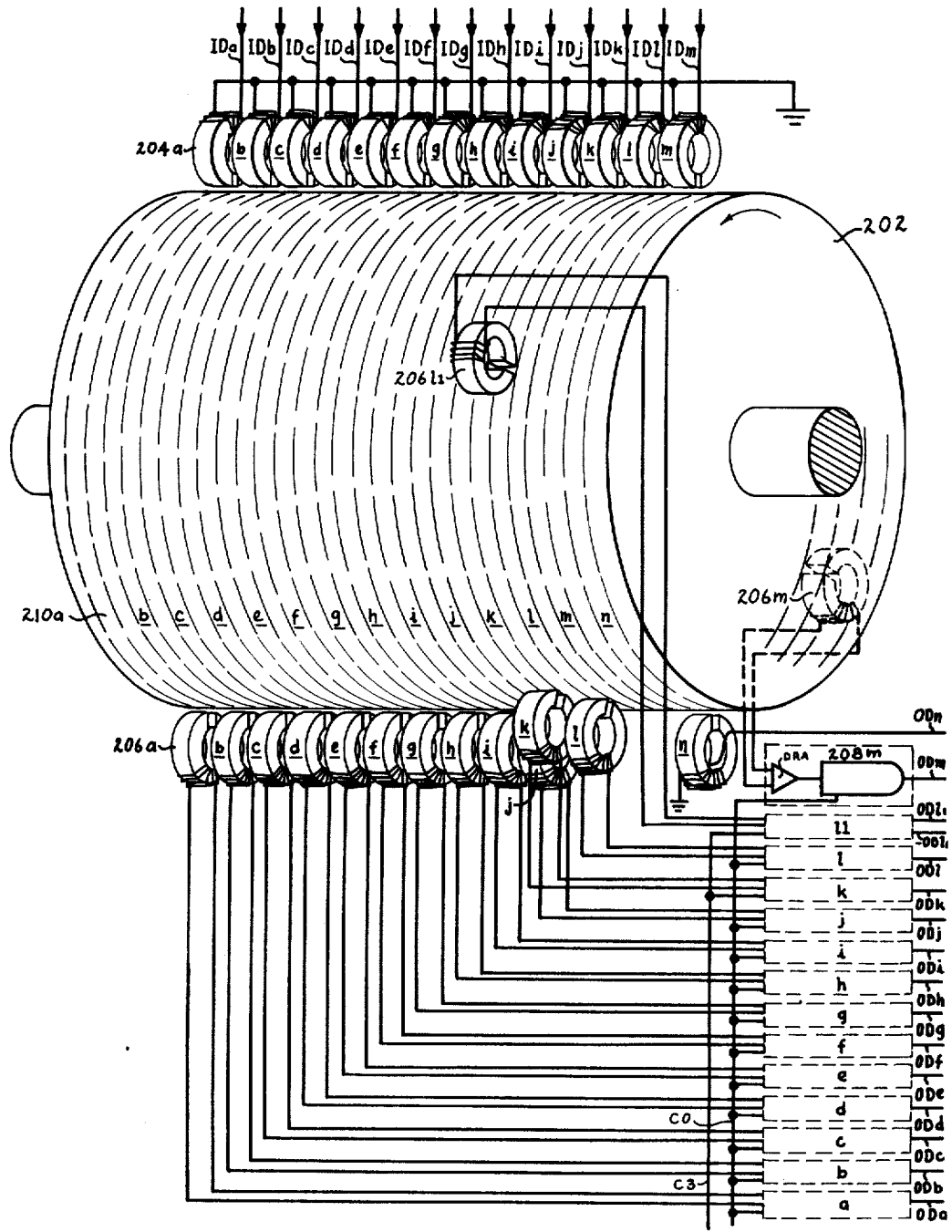

Fig. 15 illustrates the circuit of the drum storage unit.

Figure 16:
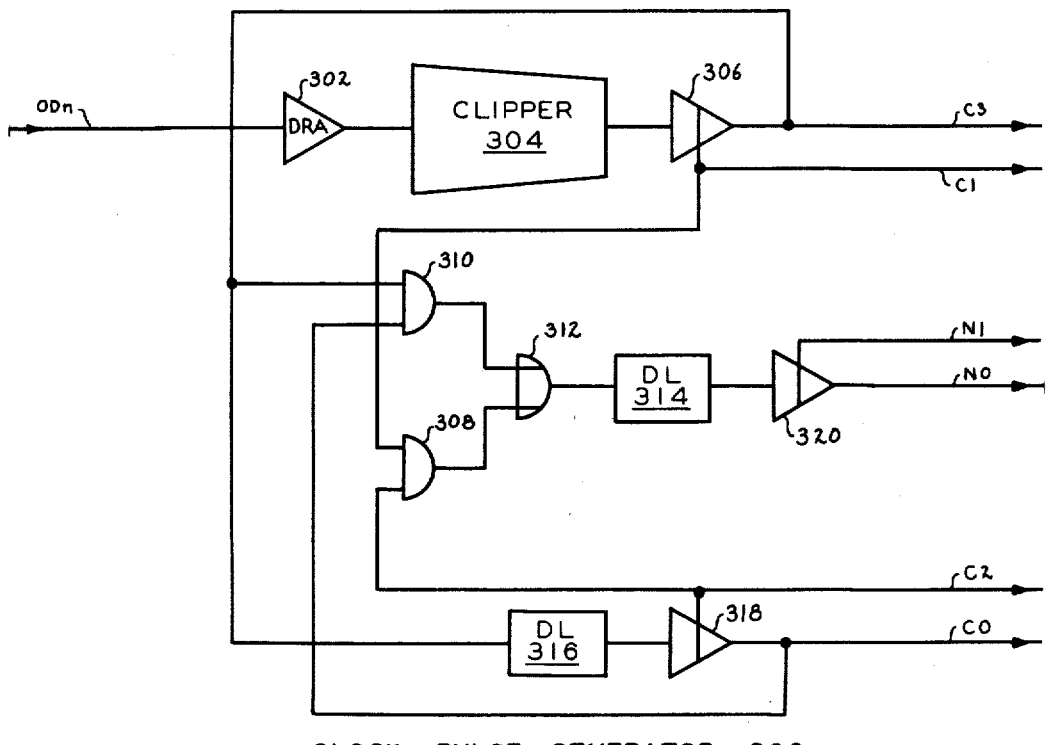

Fig. 16 shows the logical diagram of a clock pulse generator.

Figure 17:
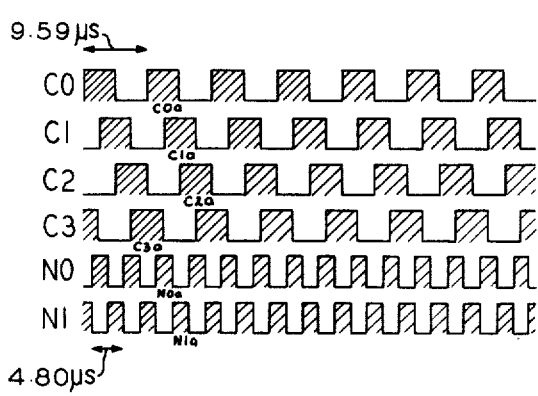

Fig. 17 is a time chart which illustrates the cyclical signals which are generated by the clock pulse generator.

Figure 18:
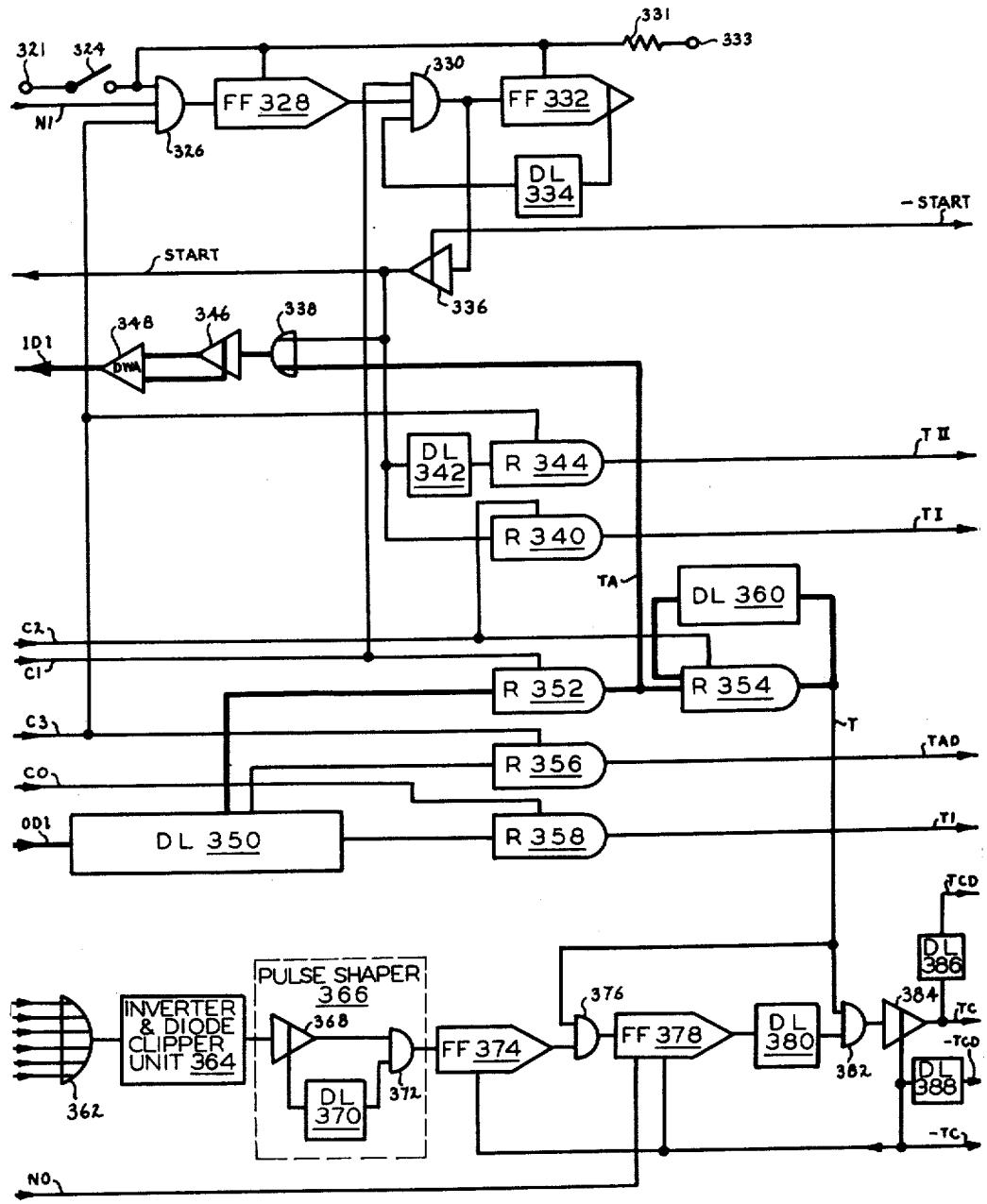

Fig. 18 illustrates the logical circuit of the timing pulse generator.

Figure 19:
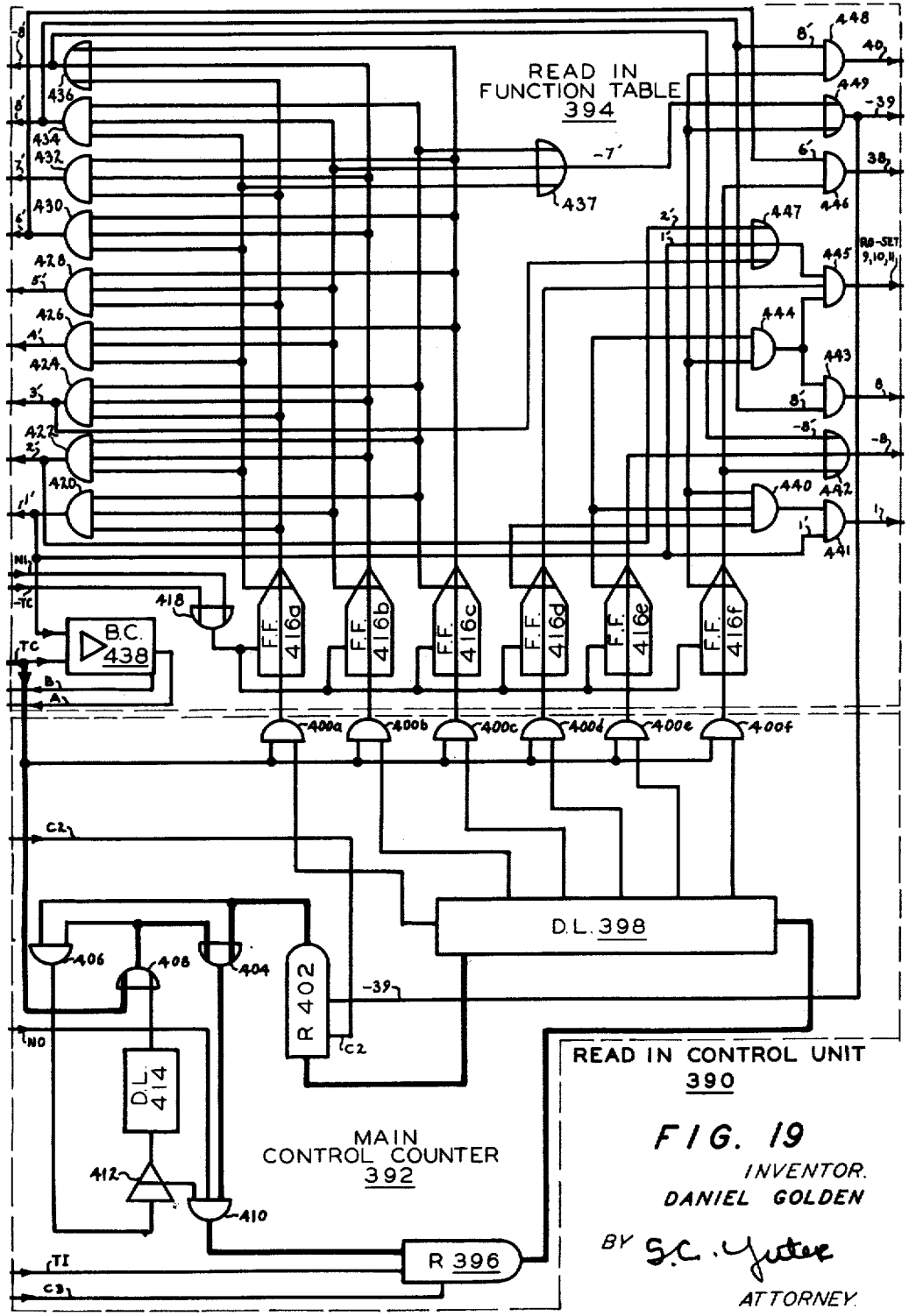

Fig. 19 shows the logical circuit of the read in control unit.

Figure 20:
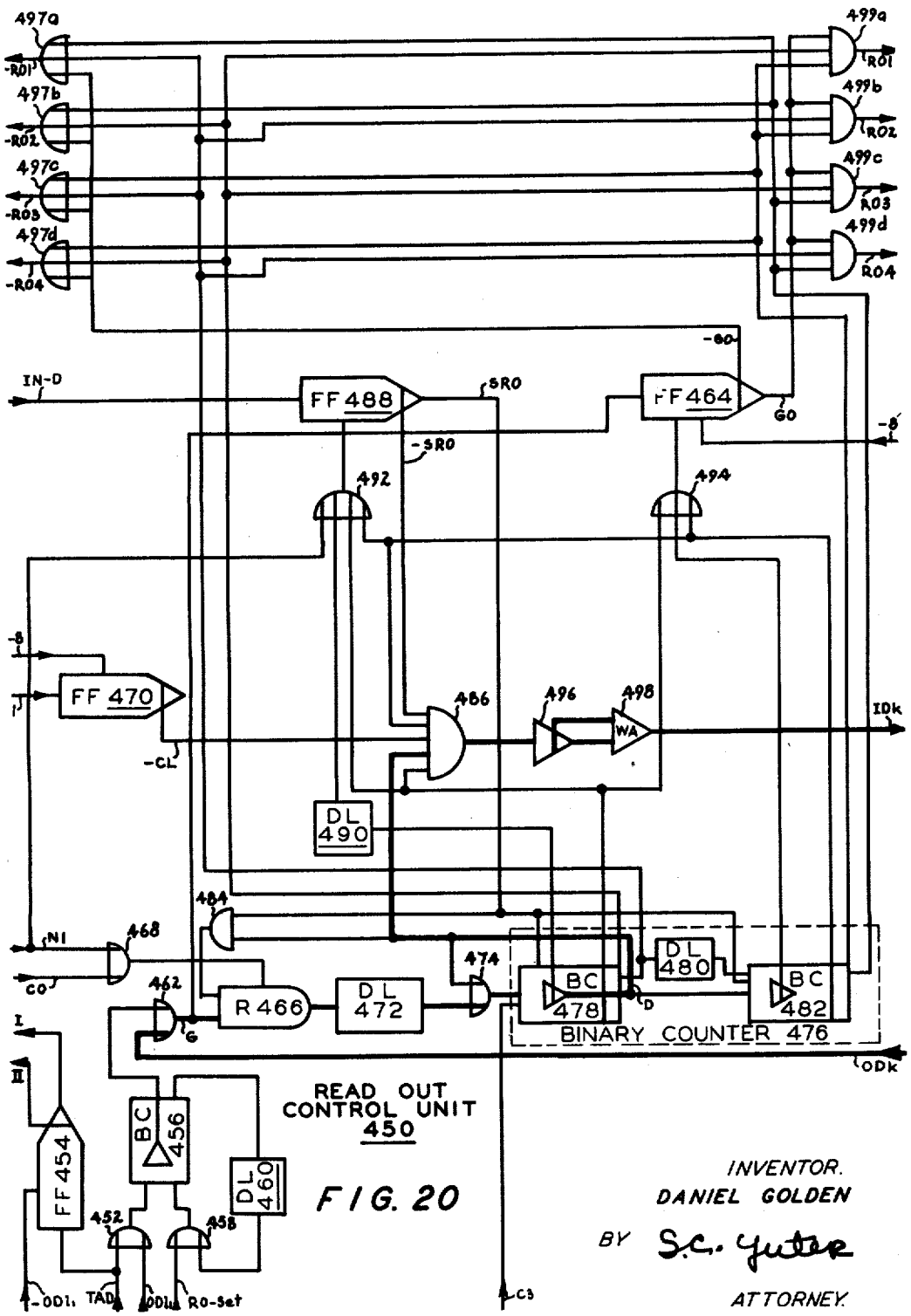

Fig. 20 illustrates the logical circuit of the read out control unit.

Figure 21:
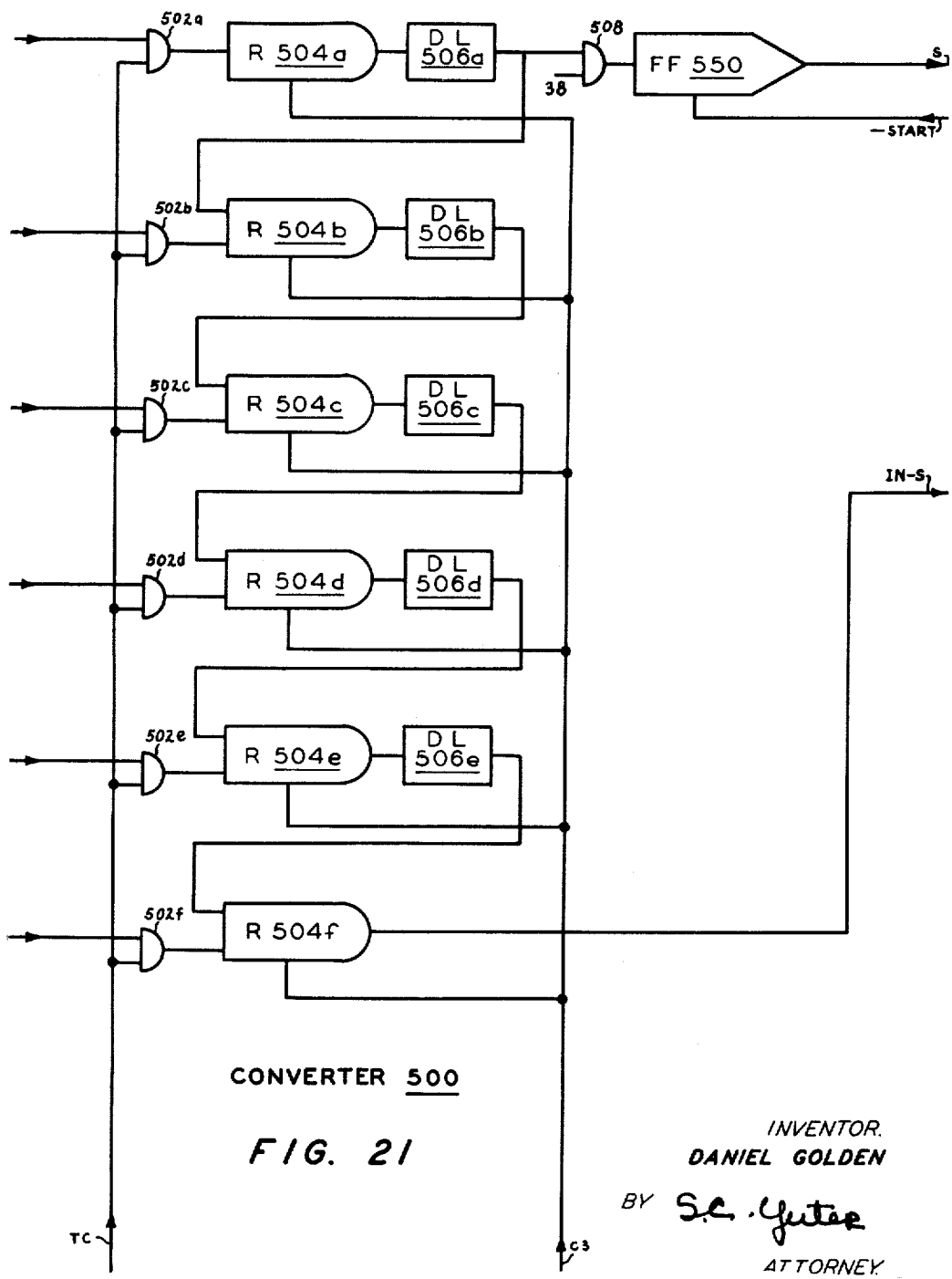

Fig. 21 shows the logical circuit of the parallel to serial converter.

Figure 22:
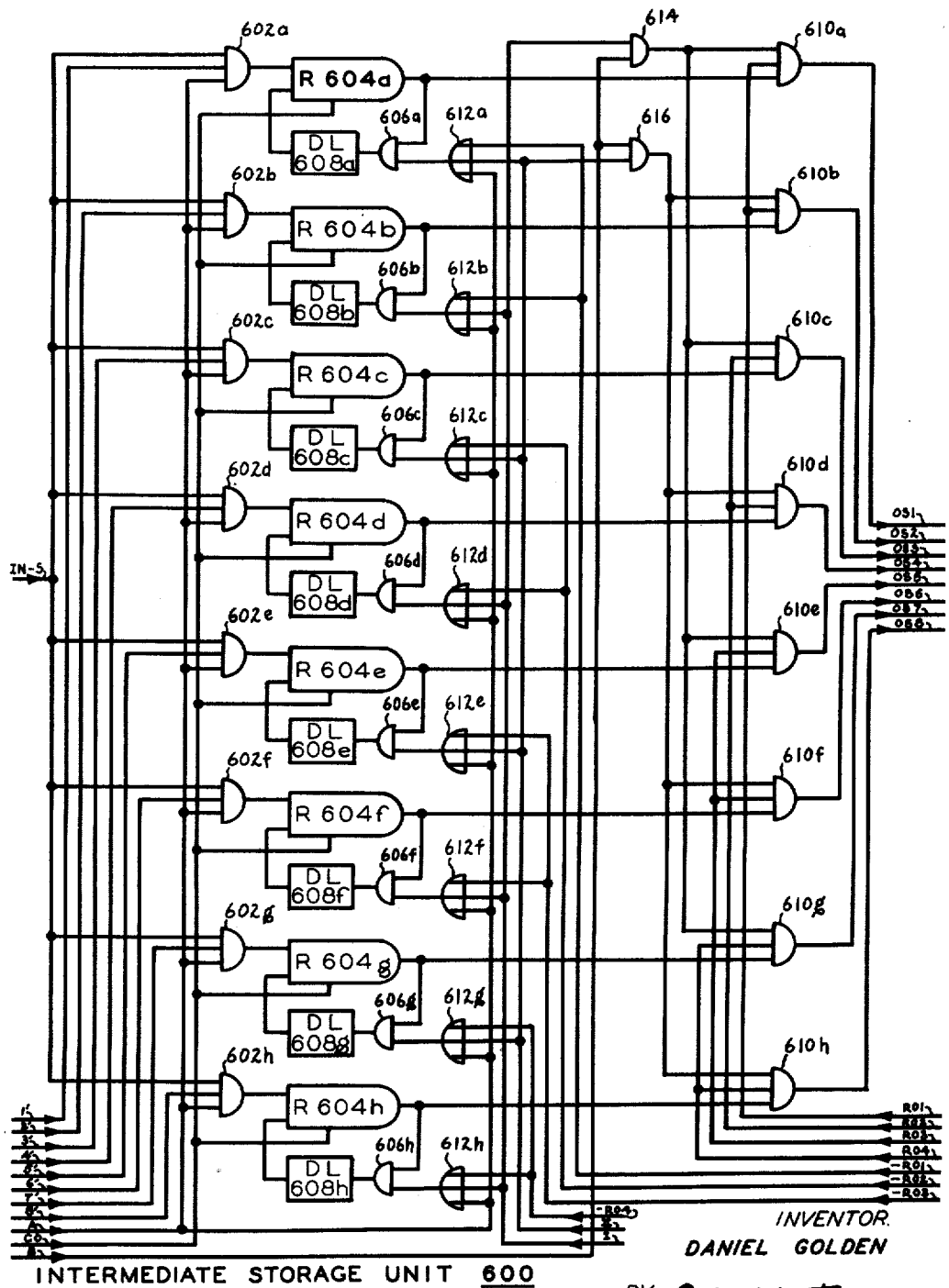

Fig. 22 shows the logical circuit of one intermediate storage unit.

Figure 23:
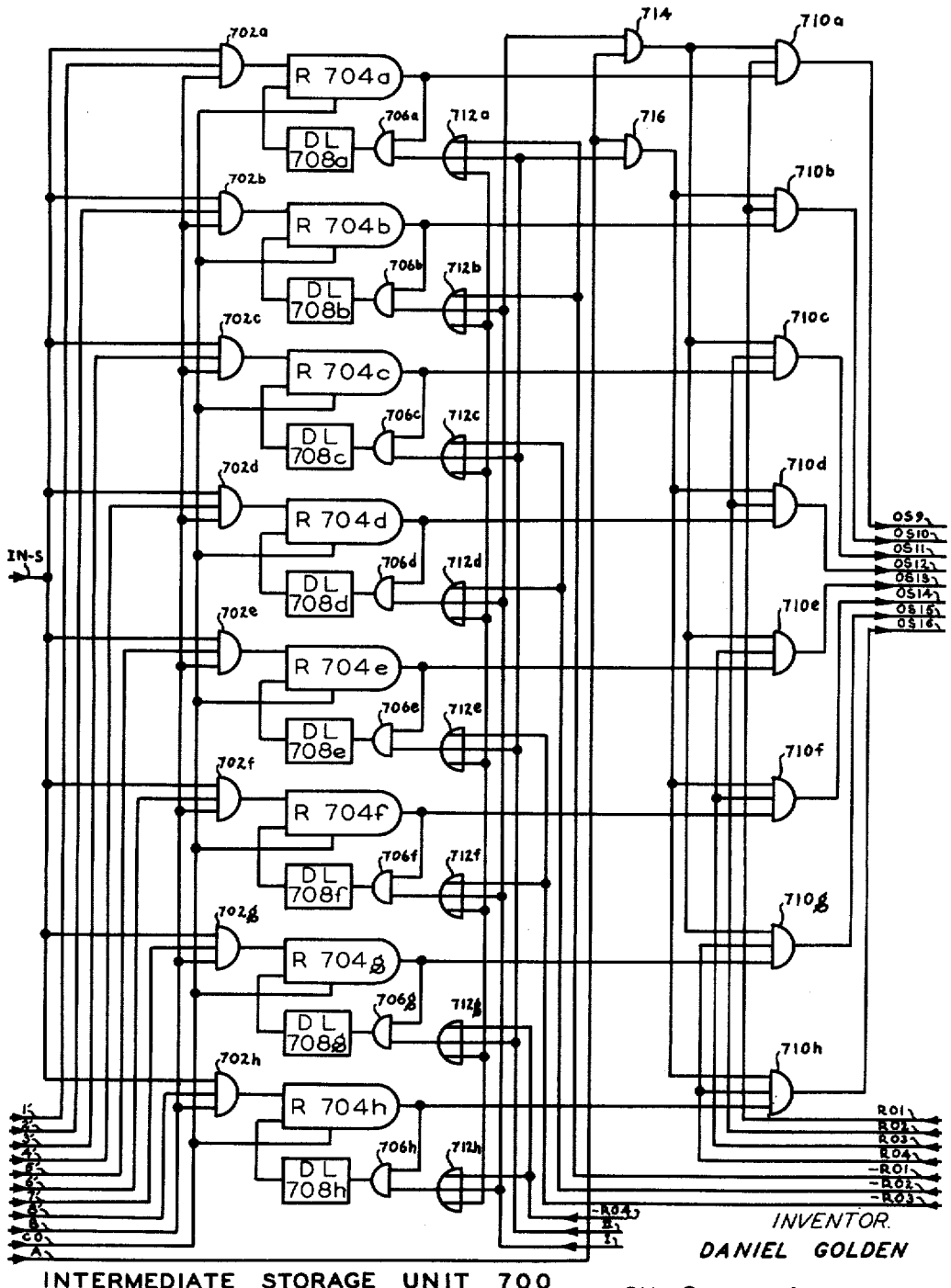

Fig. 23 shows the logical circuit of a second intermediate storage unit.

Figure 24:
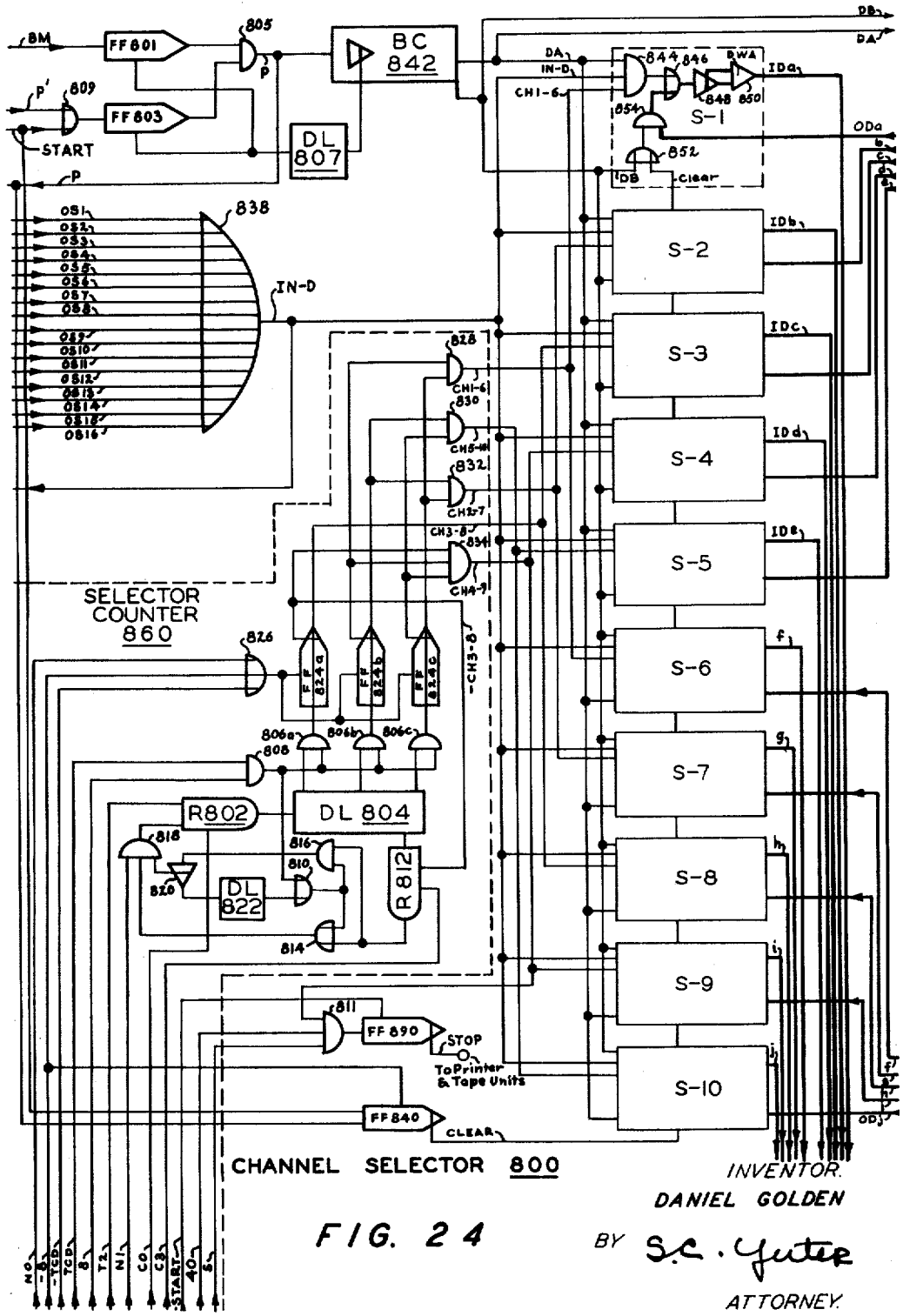

Fig. 24 illustrates the logical circuit of the channel selector.

Figure 25:
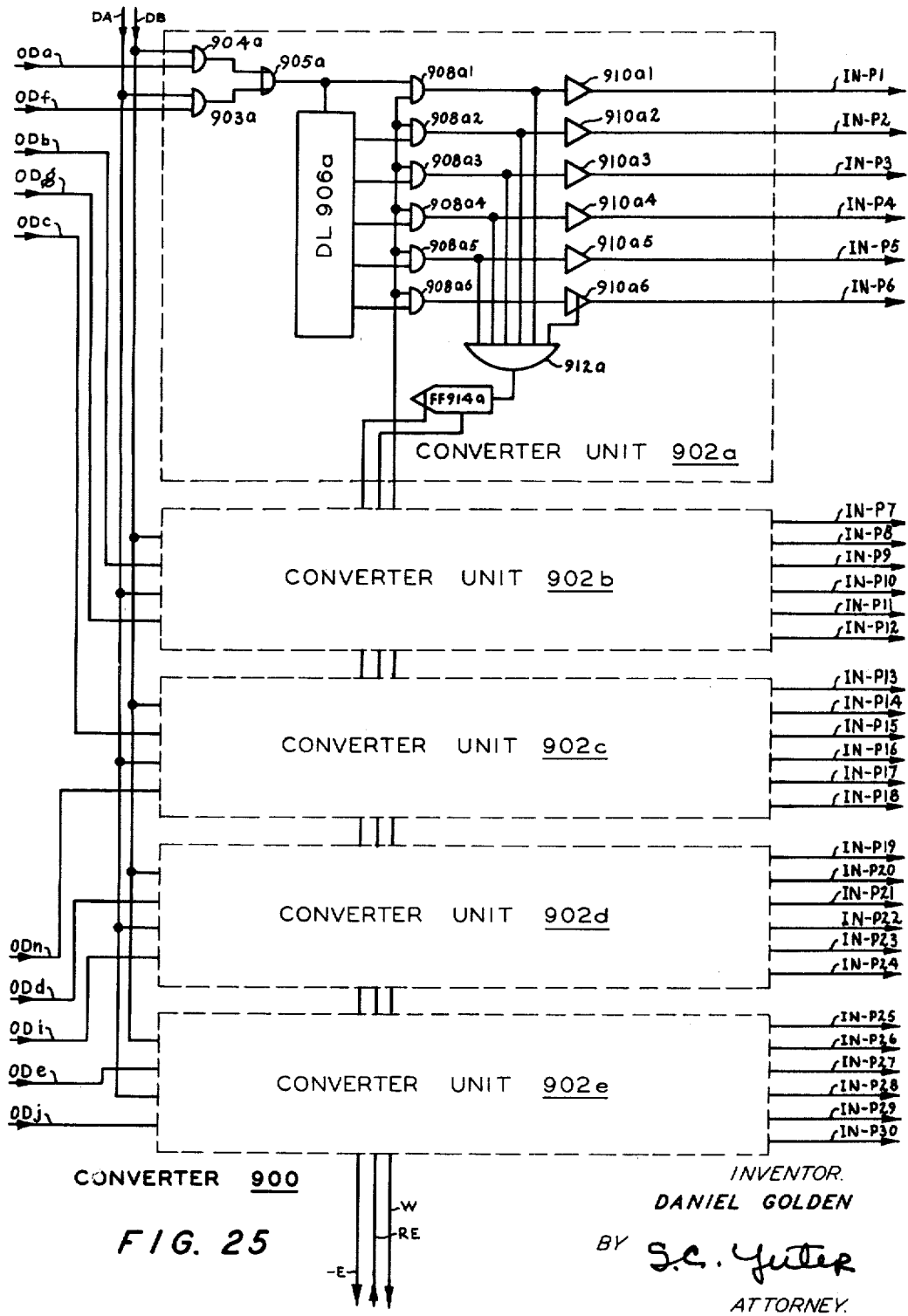

Fig. 25 shows the logical circuit of the serial to parallel converter.

Figure 26:
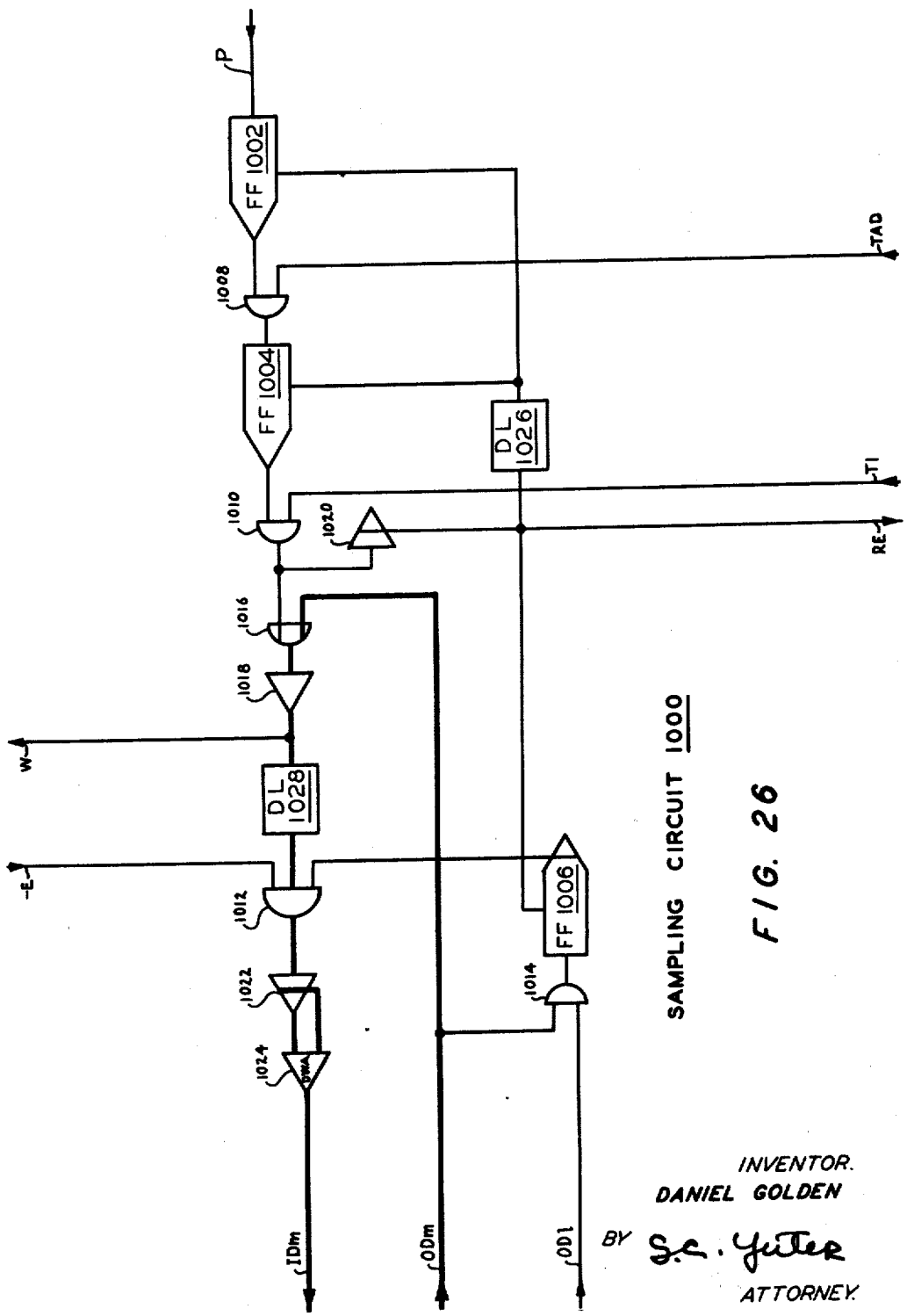

Fig. 26 illustrates the logical diagram of the sampling circuit.

Figure 27:
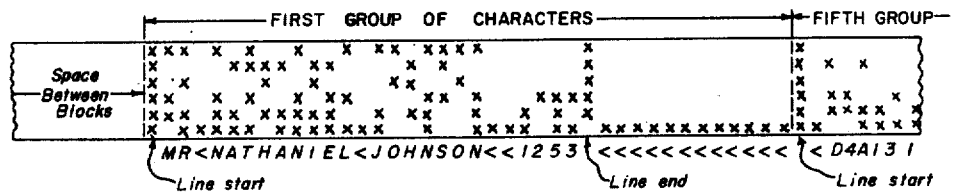

Fig. 27 shows a portion of a tape with a group of characters arranged for one line of a twenty-eight character length label.

Figure 28:
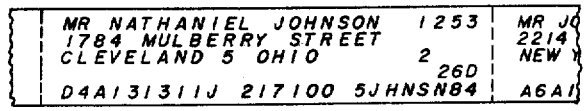

Fig. 28 shows a representative twenty-eight character length label.

Figure 29:
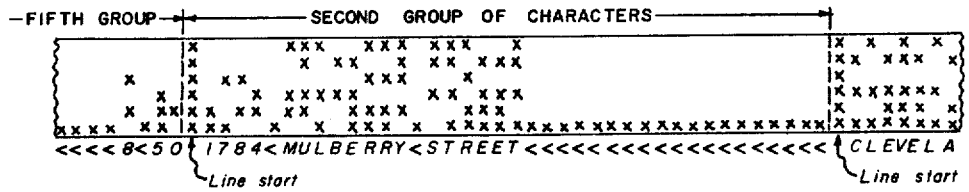

Fig. 29 shows a portion of a tape with a group of characters arranged for one line of a forty character length label.

Figure 30:

Fig. 30 shows a representative forty character length label.

Figure 31:
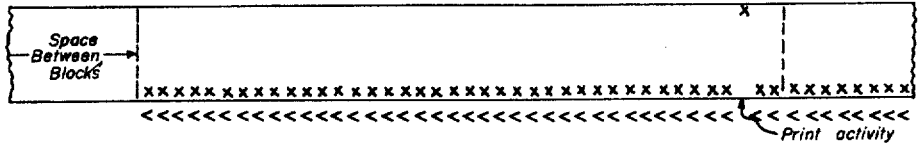

Fig. 31 shows a portion of a tape with a group of characters arranged for a printing termination.

Figure 32:
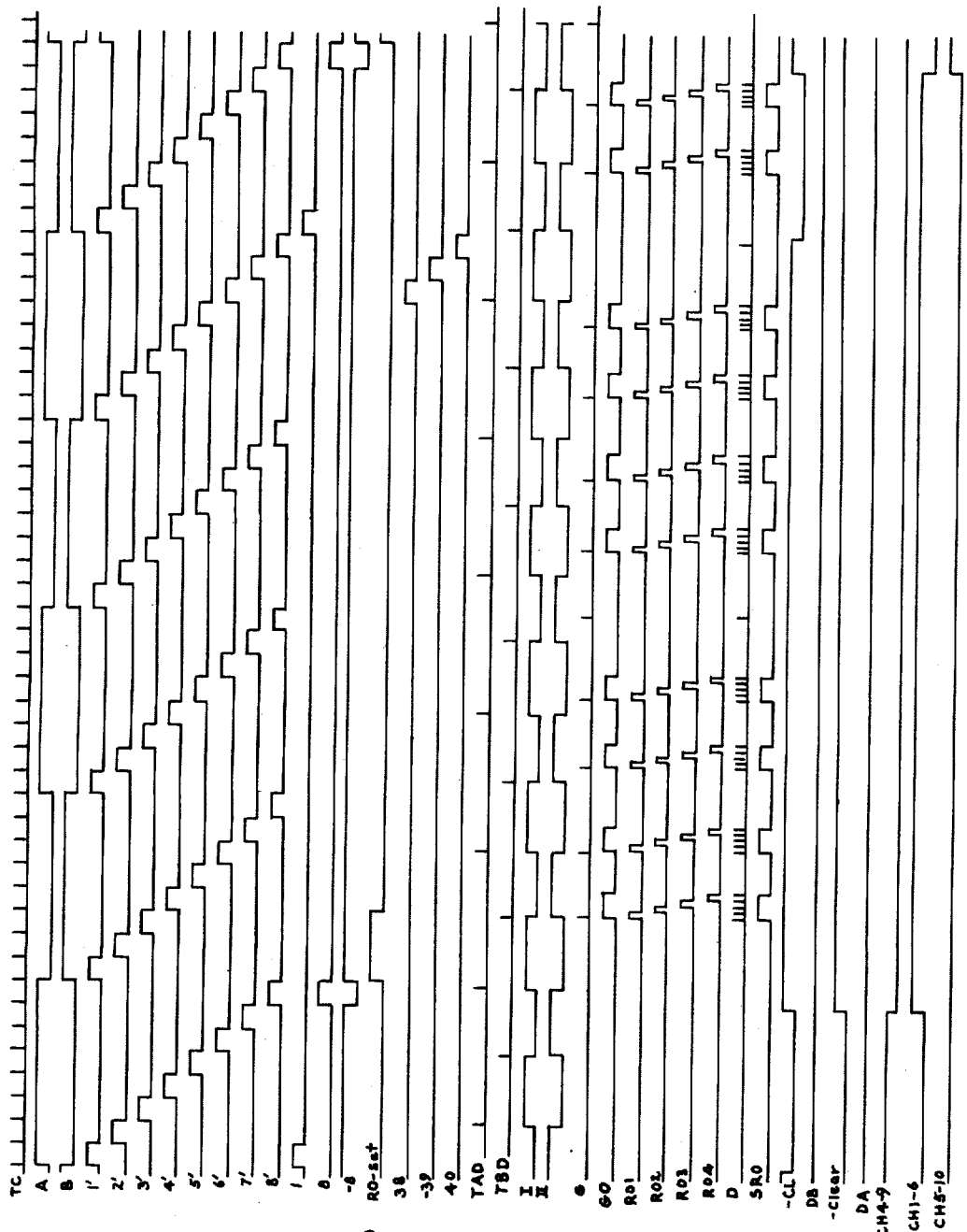

Fig. 32 is a time chart which illustrates, by way of example, some of the more important control signals used in the system for controlling the channeling and storing of a group of forty character signals perparatory to being printed out.

INTRODUCTION

The data transfer system of the present invention is required to transfer data from the storage unit of a data processor to a high speed printer. Consequently, the design of the data transfer system depends upon the nature of both the storage unit of the data processor and the high speed printer.

In the following description, the design requirements of the data transfer system is described by way of example with reference to magazine subscription label printing in which a magnetic tape unit is utilized as the storage unit of the data processor and the presently available Eastman Kodak High Speed Printer is utilized as the high speed printer. However, it should be understood that the principle of the invention is not limited to such units but is applicable to other similar units and depends upon the nature of data transfer desired. Further, the data may be solely numeric or solely alphabetic.

Data is recorded in the magnetic tape in six parallel channels. A coded signal recorded across the tape constitutes a single character.

The coded values of characters arbitrarily chosen for the system are as given in Table I.

*Table I*

| Character | Code | Character | Code |
|---|---|---|---|
| Space < | 000001 | L | 100101 |
| 0 | 000010 | M | 100110 |
| 1 | 000011 | N | 100111 |
| 2 | 000100 | O | 101000 |
| 3 | 000101 | P | 101001 |
| 4 | 000110 | Q | 101010 |
| 5 | 000111 | R | 101011 |
| 6 | 001000 | S | 110100 |
| 7 | 001001 | T | 110101 |
| 8 | 001010 | U | 110110 |
| 9 | 001011 | V | 110111 |
| A | 010011 | W | 111000 |
| B | 010100 | X | 111001 |
| C | 010101 | Y | 111010 |
| D | 010110 | Z | 111011 |
| E | 010111 | Print activity | 100000 |
| F | 011000 | & | 100001 |
| G | 011001 | - | 010001 |
| H | 011010 | / | 110011 |
| I | 011011 | Line start | 111111 |
| J | 100011 | Line end | 111110 |
| K | 100100 | | |

Figure 2:
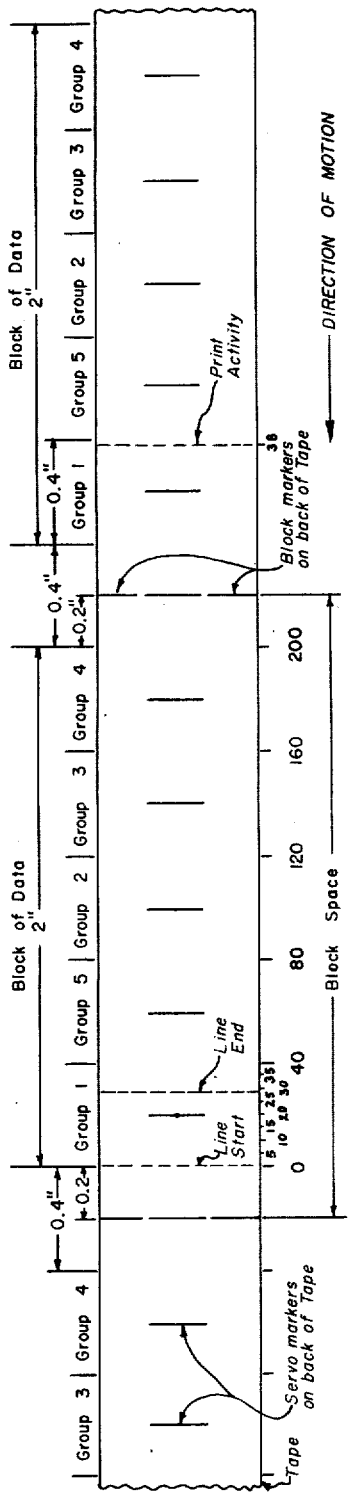
Fig. 2 is a diagram showing the arrangement of blocks of data on a tape.
Figure 3:
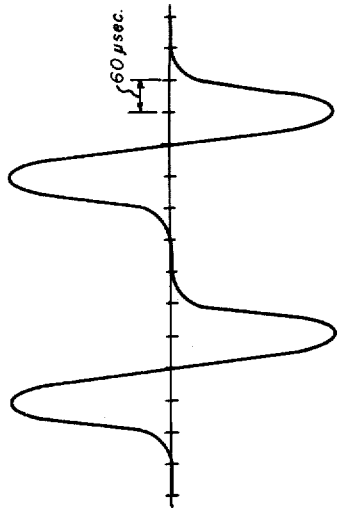
Fig. 3 shows the wave diagrams of the data signals read from the tape.

The data is stored in the tape in groups of two hundred characters referred to as blocks of data. The arrangement of blocks of data in the tape is shown in Fig. 2. The data within a block is divided into five groups of forty characters each, corresponding to the five lines of data to be printed out by the printer. Characters 1–40 correspond to the first printed line, characters 41–80 correspond to the fifth printed line, characters 81–120 correspond to the second printed line, characters 121–160 correspond to the third printed line, and characters 161–200 correspond to the fourth printed line.

A portion of the tape showing the first group of characters of a block of data arranged for a twenty-eight character length label is illustrated in Fig. 27. The twenty-eight character length label, in which the first line of data corresponds to the first group of characters shown in Fig. 27, is illustrated in Fig. 28.

A portion of the tape showing the second group of characters of a block of data arranged for a forty character length label is illustrated in Fig. 29. The forty character length label in which the second line of data corresponds to the second group of characters shown in Fig. 29 is illustrated in Fig. 30.

A block of data occupies two inches along the tape and successive blocks are separated by spaces carrying no data. Each separating space occupies four tenths of an inch along the tape. These spaces are required so as to provide sufficient time for stopping and starting of the tape by the tape unit.

There are two sets of transverse ink lines on the back of the tape (as shown in Fig. 2). Those of one set, referred to as block markers, occur every two and four tenth inches along the tape and are centered in the space between blocks of data. These markers are sensed by photoelectric means in the tape unit and are utilized in conjunction with the system when it is desired to stop the tape unit (as will be explained later). Those of the other set, referred to as servo marks, occur every four tenths of an inch along the tape and are sensed by other photoelectric means in the tape unit. The tape unit is equipped with a servo-mechanism which in response to synchronizing pulses (which occur midway in time between successive pulses from the photoelectric means associated with the servo marks on the tape as will be explained later) from the data transfer system runs the tape unit in synchronism with the system.

The tape moves at a speed of twenty-four inches per second and since the block space between block markers occupies two and four tenth inches along the tape, this block space (which includes a block of data) is read in one hundred milliseconds or at the rate of ten block spaces per second. The printer prints a twenty-eight character label in one hundred milliseconds or at a rate of ten per second.

Thus, since the same amount of time is required to read, arrange and store a block of data as is required to print a block of data (for a twenty-eight character label), the system can be arranged to read, arrange and store one block of data while another block of data, previously processed, is printed out by the printer. Therefore, the tape can be moved continuously and the printer can be operated continuously. In forty character labels, since the printer can only print twenty-eight characters by the time a block marker is reached, the tape unit must stop the tape whenever a block marker is sensed and start the tape again when the printer signals that it has completed printing the remaining characters of the forty character label.

The tape unit is so constituted as to start the tape moving in response to a control pulse (hereinafter referred to as a Start pulse) from the data transfer system, and may be set for either twenty-eight or forty character length labels.

When set for twenty-eight character length labels, the tape unit is set so as not to be responsive to the block marker signals which normally cause the tape unit to stop the movement of the tape. Consequently, the tape in the tape unit is moved continuously.

When set for forty character labels, the tape unit is set to stop the movement of the tape in response to each block marker signal and starts the tape moving in response to each control signal (hereinafter referred to as P' signals) received by the tape unit from the printer indicating that a forty character length label has been printed out.

The printer is so constituted as to be primed for operation by the Start pulse from the data transfer system and may be set for either twenty-eight character or forty character printing depending upon the type of label desired. The printer responds to five parallel coded character signals at a time, one from each group of characters of a block of data, and simultaneously prints the five characters represented by the signals.

Twenty-eight character length labels contain five printed lines of data, each line of which contains a maximum of twenty-six printed characters as shown in Fig. 28. Successive labels are separated by a space equivalent to two printed characters. Consequently, the space between the left hand margins of successive labels is equal to twenty-eight character spaces. The twenty-eight character length labels are printed on a roll of paper tape which moves continuously at a constant speed under the printing hammers of the printer.

Forty character labels contain five printed lines of data, each line of which contains a maximum of thirty-nine printed characters as shown in Fig. 31. Successive labels are separated by a space equivalent to one printed character. Consequently, the space between the left hand margins of successive labels is equal to forty character spaces. The forty character labels are printed on individual sheets of prepared forms which move under the printing hammers of the printer in succession.

The data transfer system in addition to starting both the tape unit and the printer must also stop both the tape unit and the printer after a predetermined number of labels have been printed. Consequently, in the block following the last block of data desired to be printed, a predetermined coded signal (hereinafter referred to as a printing activity character signal) is recorded in the thirty-eighth character position to indicate that it is desired to stop the movement of the tape at the end of the block in which it appears, and to stop the printer immediately before printing the block in which it appears. A portion of the tape showing the first group of characters of a block of data in which the printing activity character signal is recorded is illustrated in Fig. 31.

The data transfer system responds to the printing activity character signal by producing a control signal, hereinafter referred to as a Stop signal. The tape unit when set for twenty-eight character labels responds to the Stop signal and in conjunction with a block marker signal is effective to stop the tape at a time such that the tape reading equipment of the tape unit is positioned between a block marker and the first recorded character of the next block of data. The tape unit is started by the next Start pulse which again causes the tape to start moving. The tape remains moving until the next Stop signal is received by the tape unit, etc.

The tape unit when set for forty character labels responds to the Stop signal which, in conjunction with a block marker signal, stops the movement of the tape as before. However, a Stop signal also inhibits the transfer of a block marker signal from the tape unit and a P' signal from the printer. Consequently, since no P' signal is applied to the tape unit, the tape unit only responds to the next occurring Start pulse which again causes the tape unit to move the tape until the occurrence of either the next block marker signal or Stop signal, etc.

The data from the tape is transmitted in blocks separated by spaces carrying no data, each block containing the data for one label. Since the blocks are separated by spaces carrying no data, the data is read from the tape in a discontinuous manner. However, since the printer prints data continuously this data must be put into continuous form. Further, since the groups of data in each block occur serially (that is, each group of characters to be printed follows the next), and since the printer prints each group of data simultaneously and in parallel, the form of the data is changed from a serial to a parallel arrangement. In addition, since the rate at which data is read from the tape (twenty-four hundred characters per second) is different from the rate at which the printer prints (two hundred eighty characters per second), data rate conversion is required.

It can thus be seen that the data in each block of data must be operated upon to reconcile the foregoing difficulties before it can be transferred. This is most easily accomplished block by block, in such a manner that one block is operated upon and stored while a previously operated upon and stored block is transferred to the printer. Therefore, storage is required for two labels or blocks of data.

Since there are two hundred characters per block of data and six bits per character, twenty four hundred bits of storage are necessary to handle two blocks of data. Consequently, a magnetic storage drum is used as the basic component of the main storage unit.

Because the printer responds to five groups of characters of a block of data simultaneously and in parallel and the main storage unit must handle two blocks of data, the main storage unit includes ten parallel storage registers each of which stores a group of characters of a block of data. Each storage register includes a channel on the magnetic drum.

The conversion to parallel read out for the printer is accomplished by sequentially storing each group of characters of a block of data in five of the ten parallel storage registers of the main storage unit, and reading out five groups of characters of a block of data (previously stored in the other five of the ten parallel storage registers) simultaneously and in parallel for the printer.

Characters are serially read from the tape in parallel form, the six bits of a character occurring simultaneously. However, characters are serially stored in a storage register in serial form. Further, the rate at which characters are read from the tape is different from the rate at which they are stored in each of the storage registers. Consequently, a converter is employed to transform the parallel coded character signals received at the tape rate to serial coded character signals at the storage or drum rate.

A magnetic storage drum has a finite, though small, access time. Consequently, intermediate storage with immediate access is required to store the transformed character signals until the proper recording place in a channel of the drum appears.

Since the main storage unit must handle two blocks of data, a selector is required to channel the groups of characters of each block of data to selected storage registers of the main storage unit.

The printer responds to five parallel coded character signals at a time, one from each group of characters of a block of data. However, though five character signals, one from each group of characters of a block of data, are read out of the main storage unit at a time, they are each in serial form. Consequently, another converter is utilized to simultaneously convert the five serial coded character signals read out of the main storage unit to five parallel coded character signals for the printer.

The rate at which characters are stored in the main storage unit is different from that of the printer. Therefore, a data rate conversion is required which is accomplished by providing a sampling circuit to control the serial to parallel converter such that it samples each block of data received by the converter at the printer rate.

A control unit is employed to control and time the transfer of data from the magnetic tape to the high speed printer.

Figure 1:
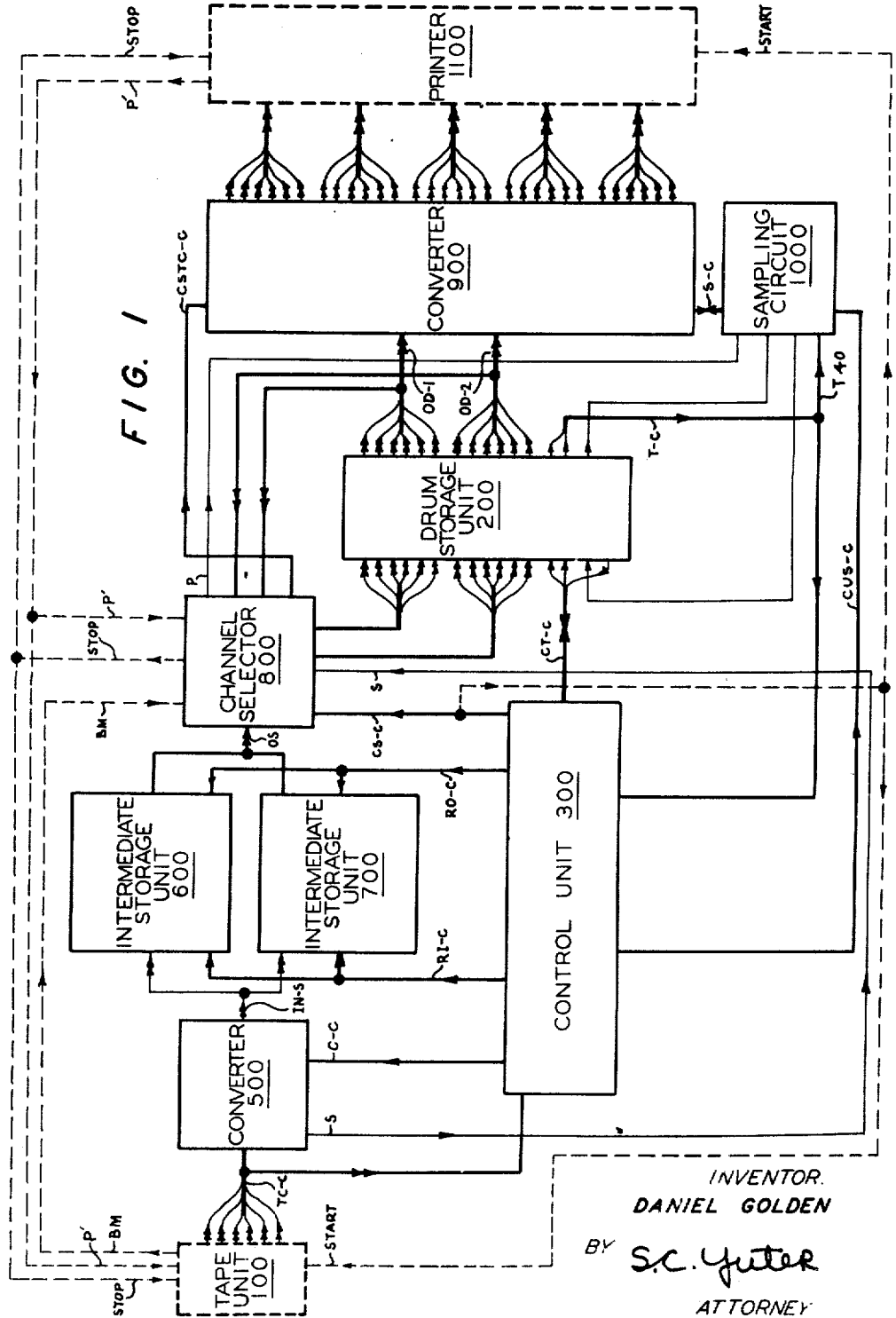
Fig. 1 is a block diagram of one embodiment of the data transfer system.

A block diagram of a data transfer system for transferring data from the tape unit 100 to the high speed printer 1100 in accordance with the preferred embodiment of the invention is shown in Fig. 1. The diagram of Fig. 1 has been simplified to facilitate understanding. The circuit connections between the blocks are intended primarily to show the routing of the data and control signals. The flow of data signals is indicated more particularly by double arrowheads while the flow of control signals is indicated by single arrowheads.

The data transfer system consists of a converter 500, intermediate storage units 600 and 700, a channel selector 800, a drum storage unit 200, a converter 900, a sampling circuit 1000 and a control unit 300, the details of each of which will be described later.

The tape unit 100 and printer 1100 are shown in dotted outline in Fig. 1. The control signal lines associated with each of these units are also shown in dotted form.

The general operation of the data transfer system shown in block form in Fig. 1 will now be described.

The control unit 300 initiates a Start pulse which is applied via the Start line of the CS–C cable to the tape unit 100 to cause the tape to start moving and to the printer 1100 to prime it for operation.

Character signals are serially read from the tape in parallel form, inverted and clipped by circuitry in the tape unit 100 and applied via the TC–C cable to the converter 500 and to the control unit 300 to initiate operation of the control unit 300.

The converter 500 functions to convert each parallel coded character signal received at the tape rate from the tape unit 100 to serial coded character signals at the drum rate and transfer them via the IN–S line to the intermediate storage units 600 and 700. The converter 500 operates under control of the control unit 300 via the C–C cable. The converter 500 also produces a positive signal on the S line whenever a printing activity character signal is sensed.

The intermediate storage units 600 and 700 are each composed of eight parallel storage registers. Each storage register is capable of storing a single character.

The intermediate storage units 600 and 700 have a cycle of operation in which eight serial coded character signals are sequentially read in to the storage registers of one of the intermediate storage units, while eight serial coded character signals previously stored in the storage registers of the other intermediate storage unit are sequentially read out in a predetermined sequence and transferred via the OS cable to the channel selector 800.

The intermediate storage units 600 and 700 operate under control of the control unit 300 via the RI–C cable and the RO–C cable.

The control unit 300 includes a read in control unit for alternately controlling the intermediate storage units 600 and 700 via the RI–C cable such that during every odd intermediate storage cycle the input of one of the intermediate storage units is opened to sequentially receive and store eight serial coded character signals while the input of the other intermediate storage unit is blocked. During every even intermediate storage cycle the input of the second mentioned intermediate storage unit is opened to sequentially receive and store eight serial coded character signals while the input of the first mentioned intermediate storage unit is blocked.

The control unit 300 further includes a read out control unit for alternately controlling the intermediate storage units 600 and 700 via the RO–C cable such that during every odd intermediate storage cycle the output of one of the intermediate storage units is opened to sequentially read out eight previously stored coded character signals in a predetermined sequence while the output of the other intermediate storage unit is blocked. During every even intermediate storage cycle the output of the second mentioned intermediate storage unit is opened to sequentially read out the eight previously stored coded character signals in a predetermined sequence while the output of the first mentioned intermediate storage unit is blocked.

The ten parallel storage registers of the main storage are recirculation registers, each of which includes a channel of the magnetic drum and circuitry in the channel selector 800. The channel selector 800 controls the entry of data into the recirculation registers and the clearing of data out of the recirculation registers. Each recirculation register has a capacity of forty-one characters. Therefore, each register is capable of storing the forty characters of a group and has a designated space for each character.

The recirculation storage has a cycle of operation in which the groups of characters of a block of data are sequentially channeled via the channel selector 800 to one group of five recirculation registers, while the groups of characters of another block of data previously stored in the other group of five recirculation registers are simultaneously read out and transferred via one of the OD cables to the converter 900.

The channel selector 800 operates under control of the control unit 300 via the CS–C cable. The channel selector 800 also responds to a block marker signal via the BM line from the tape unit 100 (indicating that a block of data has been read from the tape and stored in a group of five recirculation registers), and a P′ signal via the P′ line from the printer 1100 (indicating that a previously stored block of data in the other group of five recirculation registers has read out and printed by the printer 1100), to select and clear the five recirculation registers which contain the last block of data printed out and which are to be filled with the next block of data.

The channel selector 800 also, in response to the block marker signal and the P′ signal, produces a print signal P which is applied via the P line to initiate operation of the sampling circuit 1000, and produces control signals which are applied via the CSTC–C cable to the converter 900.

The channel selector 800 is effective during each recirculation storage cycle for sequentially opening a group of five recirculation registers such that each group of characters of a block of data is succeedingly stored in that group of recirculation registers. The read out control unit of the control unit 300 controls the read in of each group of characters to a selected recirculation register so that the odd characters of a group of characters are stored in one half of the selected recirculation register while the even characters of the group of characters are stored in the remaining half of the selected recirculation register.

As previously indicated each recirculation register is capable of storing forty-one characters. However, each group of characters includes only forty characters. Consequently, there is one character space in each recirculation register which is always empty. This is necessary due to the manner in which each group of characters is read out of the recirculation registers as will be explained later. Thus, for example, the first group of forty characters of each block of data is stored in the following manner: 1, 3, 5, 7, 9, 11, 13, 15, 17, 19, 21, 23, 25, 27, 29, 31, 33, 35, 37, 39, , 2, 4, 6, 8, 10, 12, 14, 16, 18, 20, 22, 24, 26, 28, 30, 32, 34, 36, 38, 40.

The control unit 300 also includes a clock pulse generator and a timing pulse generator which provide clock and timing pulses throughout the system. The outermost channel of the magnetic drum in the drum storage unit 200 has a signal permanently recorded therein, each pulse of which is equally spaced along the channel. The pulses are sensed and transferred via the CT–C cable to effect operation of the clock pulse generator. There are two other channels of the magnetic drum in the drum storage unit 200 which form part of timing recirculation registers. The timing recirculation registers include the CT–C cable circuitry in the control unit 300 and the T–C cable.

The converter 900 functions during each recirculation storage cycle to convert five serial coded character signals at a time, one from each group of characters of a block of data being read out of five recirculation registers, to parallel coded character signals for the printer 1100. The converter 900 operates under control of the sampling circuit 1000 via the S–C cable and the channel selector 800 via the CSTC–C cable.

As was previously indicated whenever the channel selector 800 responds to a block marker signal indicating that a block of data has been stored in a group of five recirculation registers and a P′ signal indicating that a block of data previously stored in the other group of five recirculation registers has been read out, a control signal is applied via the CSTC–C cable to the converter 900. This signal causes the converter 900 to respond only to the block of data just filled in the first mentioned group of five recirculation registers. Thus, for example, if the first group of five recirculation registers has completely stored a block of data, the groups of characters comprising the block are simultaneously read out via the OD–1 cable and applied to the converter 900 which is now primed to respond, while the next block of data is being stored in the other five recirculation registers. When the next block of data is completely stored in the second mentioned group of five recirculation registers another control signal is applied via the CSTC–C cable to prime the converter 900 to respond to the next block of data stored in the second mentioned group of five recirculation registers which is now read out via the OD–2 cable and applied to the converter 900.

The sampling circuit 1000 functions to control the converter 900 via the S–C cable so that it simultaneously samples the groups of characters of each block of data at the printer rate.

The sampling circuit 1000 operates under control of the channel selector 800 via the P line and the control unit 300 via the CUS–C cable, and includes a sampling recirculation register which uses the remaining channel of the magnetic drum in the drum storage unit 200.

As previously indicated whenever a block of data has been printed out and the next block of data is ready to be printed out, the block marker signal and P′ signal cause the channel selector 800 to signal the sampling circuit 1000 via the P line. The timing pulse generator in the control unit 300 next signals the sampling circuit 1000 via the CUS–C cable to produce a sampling pulse when the serial coded character signals are properly positioned in the converter 900 to be converted to parallel coded character signals.

The sampling circuit 1000, in addition to transferring the sampling pulse via the S–C cable to control the converter 900, injects the sampling pulse into the sampling recirculation register. The sampling pulse continuously recirculates about the sampling recirculation register, and the time period of the register is such that a sampling pulse is applied via the S–C cable to control the converter 900 at the printer rate.

Thus, for example, the first group of characters of each block of data is printed in the following manner: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40.

In twenty-eight character printing the twenty-eighth character of each block of data is specially coded. The converter 900 senses this coded character signal and applies a signal via the S–C cable to clear the sampling recirculation register of the sampling circuit 1000 and thereby terminate the sampling operation after twenty-eight characters of each group of characters have been printed out.

In forty character printing a signal is applied via the T40 line (after the fortieth sampling pulse has been applied to the converter 900) to clear the sampling recirculation register of the sampling circuit 1000 and thereby terminate the sampling operation after the fortieth character of each group of characters has been printed out.

As was previously indicated whenever it is desired to stop both the tape unit 100 and the printer 1100, a printing activity character signal is recorded in the thirty-eighth character position of the block of data next following the last block of data desired to be printed out. The Converter 500 responds to this signal by producing a signal and transferring it via the S line to prime the channel selector 800. When the channel selector 800 receives a control signal from the Control Unit 300 via the CS–C cable (indicating that the last character of the last block of data desired to be printed out has been printed) it produces a Stop signal which is applied to stop both the tape unit 100 and the printer 1100 until the next Start pulse.

DESCRIPTION OF SYMBOLS

The schematic equivalents of the symbols which are employed to simplify the detailed description of the system will next be described. It should be understood that the circuits described can be replaced by other circuits which perform similar functions. For convenient reference, all positive and negative supply buses will generally be identified with a number corresponding with their voltage.

GATE

The gates used in the system are of the "coincidence" type, each comprising a crystal diode network which functions to receive input signals via a plurality of input terminals and to pass a positive signal only when there is a coincidence of positive signals at the inputs thereof.

The symbol for a representative gate 1620, having two input terminals 1622 and 1624, is shown in Fig. 4a. Let it be assumed that the signal potential levels in the system are plus five volts (sometimes called positive signals) and minus ten volts (sometimes called negative signals). Consequently, the potentials of the signals which may exist at the input terminals 1622 and 1624 are thereby limited to these values.

If a potential of minus ten volts is present at one or both of the input terminals 1622 and 1624, a potential of minus ten volts will exist at the output terminal 1626. Therefore, if one of the input signals to the input terminals 1622 and 1624 is positive and the other signal is negative, the negative signal is passed and the positive signal is "blocked."

When there is a coincidence of positive signals at the two input terminals 1622 and 1624, a positive signal is transmitted from the output terminal 1626. In such case, it may be stated that a positive signal is "gated" or "passed" by the gate 1620. When all of the input signals to a gate except one are made positive, in preparation for passing a positive signal when the remaining input signal is made positive, the gate may be described as being "primed."

The schematic details of the gate 1620 are shown in Fig. 4b. Gate 1620 includes the crystal diodes 1628 and 1631. Each of the input terminals 1622 and 1624 is coupled to one of the crystal diodes 1628 and 1631. Crystal diode 1628 comprises the cathode 1629 and the anode 1630. Crystal diode 1631 comprises the anode 1633 and the cathode 1632. More particularly, the input terminals 1622 and 1624 are respectively coupled to the cathode 1629 of the crystal diode 1628 and the cathode 1632 of the crystal diode 1631. The anode 1630 of the crystal diode 1628 and the anode 1633 of the crystal diode 1631 are interconnected at the junction 1634. The junction 1634 of the anodes 1630 and 1633 is coupled via the resistor 1635 to the positive supply bus 65.

If negative potentials are simultaneously present at the input terminals 1622 and 1624, both of the crystal diodes 1628 and 1631 will conduct, since the positive supply bus 65 tends to make the anodes 1630 and 1633 more positive. The voltage at the junction 1634 will then be minus ten volts since, while conducting, the anodes 1630 and 1633 of the crystal diodes 1628 and 1631 assume the potential of the associated cathodes 1629 and 1632.

When a positive signal is fed only to the input terminal 1622, the cathode 1629 is raised to a positive five volts potential and is made more positive than the anode 1630, so that crystal diode 1628 stops conducting. However, the crystal diode 1631 remains conducting and as a result, the potential at the junction 1634 remains at the negative ten volts level. In a similar manner, when a positive signal is only present at the input terminal 1624, the voltage at the junction 1634 will not be changed.

When the signals present at both input terminals 1622 and 1624 are positive, the anodes 1630 and 1633 are raised to approximately the same potential as their associated cathodes 1629 and 1632 and the potential at the junction 1634 rises to a positive potential of five volts.

The potential which exists at the junction 1634 is transmitted from the gate 1620 via the connected output terminal 1626.

In the above described manner, the gate 1620 is frequently used as a switch to govern the passage of one signal by the presence of one or more signals which control the operation of the gate 1620.

It should be understood that the potentials of plus five volts and minus ten volts used for purposes of illustration are approximate, and the exact potentials will be affected in two ways. First, they will be affected by the value of the resistance 1635 and its relation to the impedances of the input circuits connected to the input terminals 1622 and 1624. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operation taking place in the system.

A clamping diode may be connected to the output terminal 1626 to prevent the terminal from becoming more negative than a predetermined voltage level to protect the diodes 1628 and 1631 against excessive back voltages and to provide the proper voltage levels for succeeding circuits.

BUFFER

The buffers used in the system are also known as "or" gates. Each buffer comprises a crystal diode network which functions to receive input signals via a plurality of input terminals and to pass a negative signal only when there is a coincidence of negative signals at the inputs thereof.

The symbol for a representative buffer 1640, having two input terminals 1642 and 1644, is shown in Fig. 5a. Since the assumed signal potential levels in the system are minus ten volts and plus five volts, either one of these potentials may exist at the input terminals 1642 and 1644.

If a positive potential of five volts exists at one or both of the input terminals 1642 or 1644, a positive potential of five volts will exist at the output terminal 1646. If a negative potential of ten volts is present at both of the input terminals 1642 and 1644, a negative potential of ten volts will be present at the output terminal 1646.

The schematic details of the buffer 1640 are shown in Fig. 5b. The buffer 1640 includes the two crystal diodes 1648 and 1651. The crystal diode 1648 comprises the anode 1649 and the cathode 1650. Crystal diode 1651 comprises the anode 1652 and the cathode 1653. The anode 1649 of the crystal diode 1648 is coupled to the input terminal 1642. The anode 1652 of the crystal diode 1651 is coupled to the input terminal 1644. The cathodes 1650 and 1653 of the crystal diodes 1648 and 1651, respectively, are joined at the junction 1654 which is coupled to the output terminal 1646, and via the resistor 1656 to the negative supply bus 70. The negative supply bus 70 tends to make the cathodes 1650 and 1653 more negative than the anodes 1649 and 1652, respectively, causing both crystal diodes 1648 and 1657 to conduct.

When negative ten volt signals are simultaneously present at input terminals 1642 and 1644, the crystal diodes 1648 and 1651 are conductive, and the potential at the cathodes 1650 and 1653 approaches the magnitude of the potential at the anodes 1649 and 1652. As a result, a negative potential of ten volts appears at the output terminal 1646.

If the potential at one of the input terminals 1642 or 1644 increases to plus five volts, the potential at the junction 1654 approaches the positive five volts level as this voltage is passed through the conducting crystal diode 1648 or 1651 to which the voltage is applied. The other crystal diode 1648 or 1651 stops conducting since its anode 1649 or 1652 becomes more negative than the junction 1654. As a result, a positive potential of five volts appears at the output terminal 1646.

If positive five volt signals are fed simultaneously to both input terminals 1642 and 1644, a positive potential of five volts appears at the output terminal 1646, since both crystal diodes 1648 and 1651 will remain conducting. Thus the buffer 1640 functions to pass the most positive signal received via the input terminals 1642 and 1644.

DELAY LINE

The symbol for a representative electrical delay line 1660 which is a lumped parameter type delay line and which functions to delay received pulses for discrete periods of time, is shown in Fig. 6a.

The delay line 1660 comprises the input terminal 1662, the output terminal 1663, and a plurality of taps 1665, 1666, and 1667. A pulse which is fed via the input terminal 1662 to the delay line 1660 will be delayed for an increasing number of pulse times before successively appearing at the taps 1665, 1666, and 1667. When the pulse reaches the output terminal 1663, the total delay provided by the delay line 1660 has been applied. In the text, the specific number of pulse-times delay which is encountered before a pulse travels from the input terminal to a tap of the delay line will be stated.

The delay line 1660 shown in Fig. 6b comprises a plurality of inductors 1669 connected in series, with the associated capacitors 1670 which couple a point 1671 on each inductor 1669 to ground. A signal is fed into the delay line 1660 at the input terminal 1662 and the maximum delay occurs at the output terminal 1663. The taps 1665, 1666, and 1667 are each connected to one of the points 1671 and provide varied delays. The delay line 1660 is terminated by a resistor 1668 in order to prevent reflections. Although in the delay line of Fig. 6b a tap is shown connected to each of the points 1671, it should be understood that in actual practice there are ordinarily several untapped points 1671 between successive taps.

PULSE AMPLIFIER

The symbol for a representative pulse amplifier is shown in Fig. 7a. When a positive pulse is fed to the pulse amplifier 1800 via the input terminal 1810, the pulse amplifier 1800 functions to transmit a positive pulse which swings from minus ten to plus five volts from its positive output terminal 1840, and a negative pulse which swings from plus five to minus ten volts from its negative output terminal 1822. At all other times, the pulse amplifier 1800 has a negative potential of ten volts at its positive output terminal 1840 and a positive potential of five volts at its negative output terminal 1822.

The detailed circuitry of the pulse amplifier 1800 is shown in Fig. 7b. The pulse amplifier 1800 includes the vacuum tube 1860, the pulse transformer 1804 and associated circuitry. The vacuum tube 1860 comprises the cathode 1862, the grid 1864 and the anode 1866. The pulse transformer comprises the primary winding 1802 and the secondary windings 1821 and 1824.

The crystal diode 1812 couples the grid 1864 of the vacuum tube 1860 to the input terminal 1810, the anode 1813 of the crystal diode 1812 being coupled to the input terminal 1810, and the cathode 1814 being coupled to the grid 1864. The negative supply bus 70 is coupled to the grid 1864 via the resistor 1808 and tends to make the crystal diode 1812 conductive. The grid 1864 and the cathode 1814 of the crystal diode 1812 are also coupled to the cathode 1816 of the crystal diode 1815, whose anode 1819 is coupled to the negative supply bus 5. The crystal diode 1815 clamps the grid 1864 at a potential of minus five volts thus preventing the voltage applied to the grid 1864 from becoming more negative than minus five volts.

When a voltage more positive than minus five volts is transmitted to the input terminal 1810, the crystal diode 1812 conducts and the voltage is applied to the grid 1864. Since the crystal diode 1815 clamps the grid 1864 and the cathode 1814 of the crystal diode 1812 at minus five volts, any voltage more negative than minus five volts will cause the crystal diode 1812 to become non-conductive, and that input voltage will be blocked at the crystal diode 1812. Thus, the clamping action of the crystal diode 1815 will not affect the circuitry which supplies the input voltage.

The cathode 1862 of the vacuum tube 1860 is connected to ground potential. The anode 1866 of the vacuum tube 1860 is coupled by the primary winding 1802 of the pulse transformer 1804 to the positive supply bus 250. The outer ends of the secondary windings 1821 and 1824 of the pulse transformer 1804 are coupled respectively to the positive output terminal 1840 and the negative output terminal 1822. The inner ends of the secondary windings 1821 and 1824 are coupled, respectively, to the negative supply bus 10 and the positive supply bus 5.

A positive pulse which is fed to the grid 1864 of the vacuum tube 1860 will be inverted at the primary winding 1802 of the pulse transformer 1804 which is wound to produce a positive pulse in the secondary winding 1821 and a negative pulse in the secondary winding 1824. These pulses respectively drive the positive output terminal 1840 up to a positive five volts potential and the negative output terminal 1822 down to a negative ten volts potential because of the circuit parameters.

When the vacuum tube 1860 is non-conducting, the negative ten volts potential is fed through the secondary winding 1821 and appears at the positive output terminal 1840. At the same time, the positive five volts potential is fed through the secondary winding 1824 to the negative output terminal 1822. These latter conditions are the normally existing conditions at the output terminals 1840 and 1822.

Hereinafter, the pulse amplifier may be referred to simply as an amplifier and the fact that the amplifier is a pulse amplifier will be apparent from the use of the symbol shown in Fig. 7a.

D.-C. AMPLIFIER

The symbol for a representative D.-C. amplifier 1870 is shown in Fig. 8a. When a positive signal is present at the input terminal 1872, a positive signal of five volts appears at the positive output terminal 1874 and a negative signal of ten volts is present at the negative output terminal 1876. If a negative potential is present at the input terminal 1872, the potentials at the output terminals 1876 and 1874 are reversed.

As shown in Fig. 8b, the D.-C. amplifier 1870 includes the gate 1806, the buffer 1878, the vacuum tube 1880, the transformer 1900, the full-wave rectifiers 1952 and 1954, and the filters 1956 and 1958.

The input terminal 1872 is connected to one input terminal of the gate 1806. The other input terminal of the gate 1806 is fed a one megacycle carrier signal from the signal generator 1807 which is a signal generator of known type. The megacycle carrier signal swings from minus ten to plus five volts.

One input terminal of the buffer 1878 is connected to the output terminal of the gate 1806. The other input terminal of the buffer 1878 is connected to the negative supply bus 5. The buffer 1878 couples the output of the gate 1806 to the control grid 1882 of the vacuum tube 1880.

The vacuum tube 1880 is a five element tube having a grounded cylindrical shield 1890, and includes the anode 1884 connected via the primary winding 1902 of the transformer 1900 to a positive supply bus 250. The vacuum tube 1880 also includes the suppressor grid 1892 which is connected to ground, the screen grid 1888 which is connected to the positive supply bus 125 and via the capacitor 1894 to ground, and the cathode 1886 which is grounded.

The anode 1884 of the vacuum tube 1880 is also connected via the coupling capacitor 1898 to the neon tube 1896 which is grounded. The capacitor 1908 is connected in parallel with the primary winding 1902 of the transformer 1900 to form the parallel tank circuit 1966 which is tuned to the frequency of the carrier signal.

The full-wave rectifier 1952 is connected to the secondary winding 1904 having its center tap 1962 connected to the negative supply bus 10. The full-wave rectifier 1952 includes the pair of crystal diodes 1912 and 1918. The anodes 1914 and 1920 of the crystal diodes 1912 and 1918 are respectively coupled to opposite ends of the secondary winding 1904 of the transformer 1900, and the cathodes 1916 and 1922 of the crystal diodes 1912 and 1918 are interconnected.

The full-wave rectifier 1954 is connected to the secondary winding 1906 having its center tap 1964 connected to the positive supply bus 5.

The full-wave rectifier 1954 includes the pair of crystal diodes 1924 and 1930. The cathodes 1926 and 1932 of the crystal diodes 1924 and 1930 are coupled to opposite ends of the secondary winding 1906, and the anodes 1928 and 1934 of the crystal diodes 1924 and 1930 are connected together.

The filter 1956 which couples the cathodes 1916 and 1922 of the crystal diodes 1912 and 1918 to the positive output terminal 1874 is a parallel tank circuit which includes the capacitor 1936 and the inductor 1938. The capacitor 1944 connects the positive output terminal 1874 to the negative supply bus 10. The positive output terminal 1874 is also coupled via the resistor 1948 to the negative supply bus 70.

The filter 1958, which couples the anodes 1928 and 1934 of the crystal diodes 1924 and 1930 to the negative output terminal 1876, is a parallel tank circuit which includes the capacitor 1940 and the inductor 1942. The capacitor 1946 connects the negative output terminal 1876 to the positive supply bus 5. The negative output terminal 1876 is also coupled by the resistor 1950 to the positive supply bus 65.

Initially, the crystal diodes 1912 and 1918 are in a conductive state such that the potential at the positive output terminal 1874 is approximately minus ten volts. Similarly, the crystal diodes 1924 and 1930 are initially in a conductive state such that the potential at the negative output terminal 1876 is approximately plus five volts.

When a signal is fed to the input terminal 1872 it is combined with the one megacycle carrier and fed to the buffer 1878. As previously noted, one input terminal of the buffer 1878 is connected to a negative five volts supply bus so that all signals at the output of the gate 1806 which are equal to or more positive than minus five volts will be passed by the buffer 1878. A signal passed by the buffer 1878 is applied to the control grid 1882 of the vacuum tube 1880. The signal is amplified by vacuum tube 1880 and appears across the parallel tank circuit 1966. The parallel tank circuit 1966 is tuned to the frequency of the incoming signal so that the maximum signal will be passed by the parallel tank circuit 1966 to the full-wave rectifiers 1952 and 1954.

The full-wave rectifier 1952 delivers a positive signal which is then filtered by the filter 1956 to appear as a positive direct-current potential of approximately five volts at the positive output terminal 1874. The full-wave rectifier 1954 delivers a negative signal which is then filtered by the filter 1958 to appear as a negative direct-current potential of approximately ten volts at the negative output terminal 1876.

Thus, if a positive signal is present at the input terminal 1872, the voltage at the positive output terminal 1874 is plus five volts, and the potential at the negative output terminal 1876 is minus ten volts. However, if no signal is present at the input terminal 1872, the voltage at the positive output terminal 1874 will be minus ten volts, and the potential at the negative output terminal 1876 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

In the description which follows, the D.-C. amplifier may at times be referred to simply as an amplifier, and the fact that the amplifier is a D.-C. amplifier will be apparent from the use of the symbol shown in Fig. 8a.

DRUM READING AMPLIFIER

The symbol for a representative drum-reading amplifier 1970 is shown in Fig. 9a. The drum-reading amplifier 1970 functions to amplify signals which are generated when a magnetic drum channel is fed past a magnetic head which is coupled to the input terminals 1972 and 1973. The amplified signals appear at the output terminal 1974.

As shown in Fig. 9b, the drum-reading amplifier 1970 includes the transformer 1976 and the vacuum tubes 1984 and 1842. The transformer 1976 comprises the primary winding 1978 connected to the input terminals 1972 and 1973, the secondary winding 1980 which couples the control grid 1988 of the vacuum tube 1984 to ground, and a core 1856 provided with an electrostatic shield which is connected to ground to prevent noise from being fed to the control grid 1988. The resistor 1982 is in parallel with the secondary winding 1980. The vacuum tube 1984 also includes the anode 1986 which is connected via the resistor 1994 to the positive supply bus 250, and the cathode 1990 connected via the resistor 1992 to ground.

The vacuum tube 1842 comprises the anode 1844 connected via the resistor 1850 to the positive supply bus 250, the control grid 1846 connected via the resistor 1894 to the negative supply bus 1, and the cathode 1848 connected to ground. The anode 1986 of the vacuum tube 1984 is coupled via the capacitor 1996 to the control grid 1846 of the vacuum tube 1842. The anode 1844 of the vacuum tube 1842 is connected via the capacitor 1852 to the output terminal 1974.

When a signal is read from a channel of the magnetic drum by the magnetic head it is applied to the primary winding 1978 of the transformer 1976, after normal transformer operation, the secondary winding 1980 of the transformer 1976 applies an amplified signal to the control grid 1988 of the vacuum tube 1984. The signal is amplified by vacuum tubes 1984 and 1842 to produce an amplified signal at the output terminal 1974.

DRUM WRITING AMPLIFIER

The symbol for a representative drum writing write amplifier 1790 is illustrated in Fig. 10a and includes the terminal 1673, the erase terminal 1636, and the output terminal 1675. The drum writing amplifier 1790 functions to reversibly energize the magnetic heads associated with the magnetic drum.

The drum writing amplifier 1790 as shown in Fig. 10b, is composed of two circuits connected to the erase terminal 1636 and the write terminal 1673, respectively, and terminates in a switching circuit arrangement which includes two triode vacuum tubes 1657 and 1749. These tubes are arranged such that during the write operation, triode 1657 is in a nonconductive state while triode 1749 is in a conductive state and current is caused to flow in one direction through the coil winding of the magnetic head, this condition being indicative of a zero and corresponding to erase.

When a one signal is to be recorded in the system, the conduction in the triode vacuum tubes 1657 and 1749 is switched such that triode vacuum tube 1657 is conductive and the triode vacuum tube 1749 is nonconductive and current is caused to flow in an opposite direction through the winding of the magnetic head to represent a one.

The circuit connected to the write terminal 1673 includes the buffer 1676. One input terminal of the buffer 1676 is connected to the write terminal 1673 and the other input terminal is connected to the negative supply bus —5.7. The output terminal of the buffer 1676 is connected to the control grid 1687 of the pentode 1683.

The pentode 1683 also includes the anode 1684 connected via the resistor 1690 to the positive supply bus 250, the suppressor grid 1685 connected to ground, the screen grid 1686 connected to the positive supply bus 125 and via the capacitor 1689 to ground, and the cathode 1688 connected to ground.

The primary winding 1693 of the transformer 1692 is connected across the resistor 1690, and the secondary winding 1695 is connected between the cathode 1659 of the triode vacuum tube 1657 and one terminal of the coupling capacitor 1696. The other terminal of the coupling capacitor 1696 is connected to a restorer circuit comprising the resistor 1655 and the crystal diode 1697. One end of the resistor 1655 is connected to the cathode 1698 of the crystal diode 1697 and to the control grid 1658 of the triode vacuum tube 1657, while the other end of the resistor 1655 is connected to the anode 1699 of the crystal diode 1697 and to the negative supply bus 70.

The circuit connected to the erase terminal 1636 includes the buffer 1647. One input terminal of the buffer 1647 is connected to the input terminal 1636 and the other input terminal is connected to a negative supply bus —3.8. The output terminal of the buffer 1647 is connected to the control grid 1625 of the triode vacuum tube 1621. The cathode 1627 of the triode 1621 is connected to ground and the anode 1623 is connected to one end of the coupling capacitor 1709 and the resistor 1674. The other end of the resistor 1674 is connected to the positive supply bus 250 and also via the capacitor 1707 to ground. The other end of the coupling capacitor 1709 is connected to the control grid 1784 of the pentode 1780 and via the biasing resistor 1708 to the positive supply bus 65.

The pentode 1780 comprises the cathode 1785 connected to ground, the control grid 1784, the screen grid 1783 connected via the resistor 1728 to the positive supply bus 250 and via the decoupling capacitor 1729 to ground, the suppressor grid 1782 connected to ground, and the anode 1781 connected to one end of the resistor 1714 and to one end of the coupling capacitor 1727 and to the cathode 1725 of the crystal diode 1715. The other end of the resistor 1714 is connected to the positive supply bus 250 and via the capacitor 1713 to ground.

The anode 1717 of the crystal diode 1715 is connected to the positive supply bus 125 such that the crystal diode 1715 functions to clamp the anode 1781 at a positive potential of one hundred twenty-five volts. The other end of the coupling capacitor 1727 is connected to one end of the resistor 1731, to the cathode 1744 of the crystal diode 1741, and via the grid resistor 1748 to the grid 1752 of the triode 1749. The other end of the resistor 1731 and the anode 1742 of crystal diode 1741 are interconnected and coupled to the negative supply bus 140. The crystal diode 1741 functions to clamp the grid 1752 of the triode vacuum tube 1749 to a negative potential of one hundred forty volts.

The triode vacuum tubes 1749 and 1657 are effectively connected in series. The cathode 1753 of the triode vacuum tube 1749 is connected via the resistor 1755 to the negative supply bus 70 and via the capacitor 1754 to ground; the anode 1751 is connected to the cathode 1659 of the triode vacuum tube 1657, to the output terminal 1675 and via the damping resistor 1672 to ground. The anode 1691 is connected via the resistor 1664 to the positive supply bus 90 and via the decoupling capacitor 1661 to ground.

Initially, when no information is being transmitted to the write terminal 1673 of the drum writing amplifier 1790 (such condition is hereinafter designated the normal or erase condition), the write terminal 1673 is at a negative potential of ten volts and the erase terminal 1636 is at a positive potential of five volts. The triode vacuum tube 1657 and the pentode vacuum tubes 1683 and 1780 are nonconductive and the triode vacuum tubes 1621 and 1749 are conductive. Therefore, electron current flows via the triode vacuum tube 1749 toward the output terminal 1675.

When a one signal is applied to the drum writing amplifier 1790, the write terminal 1673 is at a positive potential of five volts and the erase terminal 1636 is at a negative potential of ten volts.

The positive signal at the write terminal 1673 is passed by the buffer 1676 and is applied to the control grid 1687 of the pentode vacuum tube 1683 and causes the pentode vacuum tube 1683 to conduct. The negative drop in potential at the anode 1684 of the pentode vacuum tube 1683 is applied to the primary winding 1693 of the transformer 1692. The secondary winding 1695 therefore applies an inverted and amplified signal via the coupling capacitor 1696 to the grid 1658 of the triode vacuum tube 1657. At the same time, the negative signal at the erase terminal 1636 operates via buffer 1647 to cut off the triode vacuum tube 1621. The positive rise in potential at the anode 1623 of the triode vacuum tube 1621 is applied via the coupling capacitor 1709 to the control grid 1784 of the pentode vacuum tube 1780 and causes the pentode vacuum tube 1780 to conduct.

The anode 1781 of the pentode vacuum tube 1780 becomes less positive but is clamped to a positive potential of one hundred twenty-five volts by the crystal diode 1715. The negative swing in potential of the anode 1781 is applied via the coupling capacitor 1727 to the grid 1752 of the triode vacuum tube 1749.

Thus, when a one signal is applied to the drum writing amplifier 1790, a positive signal is applied to the triode vacuum tube 1657 and a negative signal is applied to the triode vacuum tube 1749 to interchange their conductive states so that the triode vacuum tube 1657 is conductive and the triode vacuum tube 1749 is nonconductive. Therefore, current flows to the output terminal 1675 through the triode vacuum tube 1657.

In summary, when a signal representing the binary digit zero is applied to the drum writing amplifier 1790, it causes current to flow from the output terminal 1675 whereas when a signal representing the binary digit one is applied to the drum writing amplifier 1790, it switches conduction in the triode vacuum tubes 1657 and 1749 and causes current to flow towards the output terminal 1675.

Since the output terminal 1675 is connected in the system to a magnetic head, the current will flow through the coil winding in one direction for a one and in the reverse direction for a zero. The recording of a zero corresponds to erase.

RESHAPER

A reshaper of the type used in the system is an electronic circuit which functions to reshape and retime positive pulses which have become poorly shaped and attenuated.

The symbol for a representative reshaper 1734 is illustrated in Fig. 11a and comprises one or more input terminals of which the input terminals 1701 and 1739 are shown, one retiming terminal 1743 which receives reshaping and retiming pulses (also designated clocking or C pulses), one positive output terminal 1745, one negative output terminal 1746, and may include one or more blocking terminals 1747 through which signals may be sent to make the reshaper 1734 inoperative.

Except when positive pulses are fed to the input terminals of the reshaper 1734, a negative potential of ten volts is present at the positive output terminal 1745 and a positive potential of five volts exists at the negative output terminal 1746.

When a pulse is fed to the reshaper 1734 via one of the input terminals 1701 or 1739, the pulse is reshaped by a clock pulse (received via the terminal 1743), which is timed to delay the reshaped pulse for one-quarter of a pulse time, and is then transmitted from the reshaper 1734 via the positive output terminal 1745. While the positive pulse is being transmitted from the positive output terminal 1745, a negative pulse is transmitted from the negative output terminal 1746.

The detailed circuitry of the reshaper 1734 is illustrated in Fig. 11b in which use is made of logical symbols previously described.

The reshaper 1734 comprises the buffer 1735, the gate 1736 and the amplifier 1737 in series. A positive pulse which is fed via one of the input terminals 1701 or 1739 of the buffer 1735 is passed to the gate 1736. Signals may also be fed via the blocking terminal 1747 to the gate 1736 and if the signal is negative, the gate 1736 is blocked and the reshaper 1734 is inoperative. The blocking terminal 1747 is generally absent and if present usually receives a positive signal.

A series of identical clock pulses which are generated in the clock pulse generator, as will later be described in detail, are transmitted to the gate 1736 via the clock terminal 1743. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 1736. Since in many cases the pulse to be reshaped is originally produced by a previous reshaper and thus has approximately the same width as a clock pulse, its center point will be one-quarter pulse time later than the leading edge of the clock pulse which previously reshaped it. Hence its leading edge after passing through the new reshaper will be one-quarter pulse time later than before, and on this basis it may be said that a reshaper introduces a one-quarter pulse time delay in the signals passing through it.

When the attenuated positive pulse reaches its full magnitude at the gate 1736, the coinciding clock pulse is gated through to the amplifier 1737 and is amplified and causes a positive pulse to be transmitted from the positive output terminal 1745, and a negative pulse to be transmitted from the negative output terminal 1746 at the same time.

The positive output terminal 1745 is also coupled to one input of the buffer 1735 so that a positive signal which appears at the positive output terminal 1745 is regenerative and will continue to exist until the clock pulse terminates at the gate 1736. This effectively permits the entire clock pulse to be gated through the gate 1736, even though the original pulse has decayed before the end of the clock pulse.

Stated more generally, a clock pulse is passed through the gate 1736 from the earliest coincidence of that clock pulse with the full magnitude of the attenuated pulse until the termination of that clock pulse. As a result, a clock pulse is substituted for the attenuated pulse in the system after a delay of one-quarter of a pulse time.

SET DOMINANT FLIP FLOP

A set dominant flip flop of the type used in the system is a bi-stable electronic circuit with two output terminals, one of which is maintained at one potential level and the other of which is maintained at a second potential level to indicate one stable state. Upon receipt of a signal of suitable magnitude as its input the potential levels of the two output terminals are interchanged to indicate a second stable state.

The symbol for a representative set dominant flip flop 1700 is illustrated in Fig. 12a. The set dominant flip flop 1700 comprises one or more input terminals of which the input terminal 1705 is illustrated, one or more reset terminals of which the reset terminal 1716 is shown, one positive output terminal 1711, and one negative output terminal 1712.

One stable state of the set dominant flip flop 1700 is the normal condition which is designated "reset" and exists when a negative potential of ten volts appears at the positive output terminal 1711 and a positive potential of five volts appears at the negative output terminal 1712. The second stable state is designated "set" and exists when a positive potential of five volts appears at the positive output terminal 1711 and a negative potential of ten volts appears at the negative output terminal 1712.

The set dominant flip flop 1700 is set when a positive input signal is received via its input terminal 1705, and this is true irrespective of any reset signal which may simultaneously be transmitted to the reset terminal 1716 of the set dominant flip flop 1700.

Once set, the set dominant flip flop remains set as long as positive signals are received via all the reset terminals such as 1716 even though the "setting" pulse or signal has terminated. When the signal received via any reset terminal such as 1716 becomes negative, the set dominant flip flop 1700 is reset unless a positive pulse or signal is simultaneously being received via the input terminal 1705.

Stated more generally, the set dominant flip flop 1700 is set by the receipt of a positive input signal at the input terminal 1705 and is reset by a coincidence of a negative input signal and a negative reset signal. After being reset, the set dominant flip flop 1700 remains reset until the above recited set conditions are fulfilled.

The detailed circuitry of the set dominant flip flop 1700 is illustrated in Fig. 12b employing some of the logical symbols previously described.

The set dominant flip flop 1700 comprises the buffer 1703, the D.-C. amplifier 1702 and the gate 1706.

The input terminal 1705 is the input terminal of the buffer 1703. A positive signal which is transmitted to the input terminal 1705 is passed through the buffer 1703 to the D.-C. amplifier 1702, and causes the D.-C. amplifier 1702 to generate a positive potential of five volts at its positive output terminal 1711 and a negative potential of ten volts at its negative output terminal 1712.

The gate 1706 couples the positive output terminal 1711 of the D.-C. amplifier 1702 to the buffer 1703. When a positive signal is present at the reset terminal 1716, the gate 1706 passes the positive signal to the buffer 1703. Thus a feedback path is provided which enables the positive potential of five volts to be maintained at the positive output terminal 1711 and which is blocked only when a negative signal causes the gate 1706 to be blocked.

It should be noted that a reset signal which causes the gate 1706 to be blocked will not prevent a set signal at the buffer 1703 from causing the D.-C. amplifier 1702 to generate a positive potential of five volts at its positive output terminal 1711 during the existence of the set signal.

In the text which follows, the set dominant flip flop may be referred to simply as a flip flop and the quality of being set dominant will be apparent from the use of the symbol shown in Fig. 12a.

RESET DOMINANT FLIP FLOP

A reset dominant flip flop of the type used in the system is a bi-stable electronic circuit with two output terminals, one of which is maintained at one potential level and the other of which is maintained at a second potential level to indicate one stable state. Upon the receipt of at least two signals of suitable magnitude the potential levels of the two output terminals are exchanged to indicate a second stable state.

The symbol for a representative reset dominant flip flop 1718 is illustrated in Fig. 13a. The reset dominant flip flop 1718 comprises one or more input terminals of which the input terminals 1723 is illustrated, one or more reset terminals of which the reset terminals 1719 and 1726 are illustrated, one positive output terminal 1732 and one negative output terminal 1733.

One stable state of the reset dominant flip flop 1718 is the normal condition which is designated "reset" and exists when a negative potential of ten volts appears at the positive output terminal 1732 and a positive potential of five volts appears at the negative output terminal 1733. The other stable state is designated "set" and exists when a positive potential of five volts appears at the positive output termial 1732 and a negative potential of ten volts appears at the negative output terminal 1733.

The reset dominant flip flop 1718 is set when a positive signal is received via its input terminal 1723, and positive signals are present at all of its reset terminals 1719 and 1726. Therefore, the reset dominant flip flop 1718 will not be set if a reset (negative) signal is present at any reset terminal.

Once set, the reset dominant flip flop 1718 remains set as long as positive signals are received via the reset terminals 1719 and 1726 even though the "setting" signal has terminated, and when the signal at one of the reset terminals 1719 and 1726 is negative, the reset dominant flip flop 1718 is then reset.

After being reset, the reset dominant flip flop 1718 remains reset until the above recited set conditions are fulfilled.

The detailed circuitry of the reset dominant flip flop 1718 is illustrated in Fig. 13b in which use is made of logical symbols previously described.

The reset dominant flip flop 1718 comprises the buffer 1722, the gate 1720 and the D.-C. amplifier 1721 in series. The input terminal 1723 is the input terminal of the buffer 1722.

The buffer 1722 is coupled to the gate 1720. The reset terminals 1719 and 1826 are also coupled to the gate 1720, as are any additional reset terminals. When the gate 1720 receives positive signals coincidentally from the buffer 1722 and the reset terminals 1719 and 1726, the gate 1720 passes a positive signal to the D.-C. amplifier 1721, and causes the D.-C. amplifier 1721 to generate a positive potential of five volts at its positive output terminal 1732 and a negative potential of ten volts at is negative output terminal 1733.

The positive output terminal 1732 is coupled directly to the buffer 1722 so that when a positive signal is generated at the positive output terminal 1732, it is regenerative. The positive signal will be maintained at the positive output terminal 1732 until the gate 1720 is blocked by a negative signal received via one of the reset terminals 1719 or 1726.

It should be noted that a negative signal at either or both of the reset terminals 1719 and 1726 will prevent a positive pulse or signal at the input terminal 1723 from setting the reset dominant flip flop 1718.

In the text which follows, the reset dominant flip flop may be referred to simply as a flip flop and the quality of being reset dominant will be apparent from the use of the symbol shown in Fig. 13a.

BINARY COUNTER STAGE

The symbol for a single stage binary counter 2000 which functions to count pulses is shown in Fig. 14a.

The stage 2000 includes the input terminals 2001, 2002 and 2004, the clear terminal 2006, the positive output terminal 2008, the negative output terminal 2010 and the positive control terminal 2012. The stage 2000 may also include the delayed negative output terminal 2014 and the negative control terminal 2016 (which are shown with solid lines when used in a logical diagram).

The stage 2000 may be in either of two stable states, hereinafter designated the first and second states. While in the second or reset state, the stage 2000 transmits minus ten volts from the positive output terminal 2008 and plus five volts from the negative output terminal 2010. While in the first state, the stage 2000 transmits plus five volts from the positive output terminal 2008 and minus ten volts from the negative output terminal 2010. The delayed negative output terminal 2014 transmits the same signal as the negative output terminal 2010 but the signal is delayed for three-quarters of a pulse period before transmission.

Whenever an input pulse is passed in to the stage 2000 a positive and negative pulse is transmitted from the positive and negative control terminals 2012 and 2016 irrespective of the state in which the stage 2000 is placed. Thus, if two of the input terminals 2001, 2002 and 2004 receive positive signals and the third terminal, say the input terminal 2002, receives a positive pulse, a positive pulse is transmitted via the positive control terminal 2012 and a negative pulse is transmitted via the negative control terminal 2016.

The stage 2000 can be reset to the second state by the transmission of a negative signal to the clear terminal 2006 which is otherwise normally maintained at a positive potential.

Assuming now that positive signals are received by the terminals 2001, 2004 and 2006, each input pulse received by the input terminal 2002 causes the stage 2000 to change state. Thus, under the conditions assumed and with the stage 2000 initially in the second or reset state, three successive input pulses causes the stage 2000 to be sequentially in the first, second and first states. If any of the terminals 2001, 2004 and 2006 are at a negative potential, the stage 2000 does not respond to any input pulses.

The logical details of the stage 2000 are illustrated in Fig. 14b and include the gates 2018 and 2020, the amplifier 2022, the flip flop 2024, the delay line 2026 and the buffer 2028. The delay line 2026 provides a delay of three-quarters of a pulse period.

The input terminals 2001, 2002 and 2004 are coupled to the gate 2018 whose output is connected to the amplifier 2022.

The positive output terminal of the amplifier 2022 is connected to the positive control terminal 2012 and to one input of the gate 2020. The negative output terminal of the amplifier 2022 is connected to the negative control terminal 2016 and to one input of the buffer 2028.

The clear terminal 2006 is connected to a second input of the gate 2020 whose output is coupled to the flip flop 2024. The positive output of the flip-flop 2024 is connected to the positive output terminal 2008, while the negative output thereof is connected to the negative output terminal 2010 and via the delay line 2026 to the remaining input of the gate 2020.

The output of the delay line 2026 is also coupled to the delayed negative output terminal 2014 and to the remaining input of the buffer 2028 whose output is connected to the reset terminal of the flip flop 2024.

When the flip flop 2024 is in the second or reset state, a positive signal appears at its negative output terminal and is fed via the delay line 2026 to one input of the gate 2020 and the buffer 2028. Assuming that the potentials at the input terminals 2001 and 2004 and the clear terminal 2006 are positive, the gates 2018 and 2020 are primed to receive a positive pulse. As a result, when a positive pulse is applied to the input terminal 2002 it passes through the gate 2018 to the amplifier 2022.

The amplifier 2022 transmits a positive pulse to the positive control terminal 2012 and to the gate 2020, and a negative pulse to the negative control terminal 2016 and to one input of the buffer 2028. The positive signal at the negative output of the flip flop 2024 is maintained for three-quarters of a pulse period after the flip flop 2024 is set to insure that the gate 2020 is not blocked until the flip flop 2024 is set. The amplifier 2022 also transmits a negative pulse to the buffer 2028, but does not affect the potential of the output of this buffer, since the other input of the buffer 2028 is being held positive by the signal from the delay line 2026. This signal remains positive for three-quarters of a pulse time after the flip flop 2024 is set, by which time the negative pulse has ended and the negative output of the amplifier 2022 is again positive. Hence during the sequence of events just described the output of the buffer 2028 remains positive at all times, and no negative signal appears at the reset terminal of the flip flop 2024 to interfere with its setting.

After the stage 2000 is set to its first state, the next positive pulse received by the stage 2000 causes a negative potential to be applied via the negative output terminal of the amplifier 2022 to the buffer 2028. Since the flip flop 2024 is set to its first state, a negative signal is maintained at its negative output terminal and is transmitted via the delay line 2026 to the buffer 2028. As both signals being fed to the buffer 2028 are negative, the buffer 2028 transmits a negative potential to the reset terminal of the flip flop 2024 which is thus reset. The negative signal from the delay line 2026 blocks the gate 2020, thus preventing the positive pulse from the amplifier 2022 from being applied to the flip-flop 2024 and interfering with its resetting even though positive and negative pulses are transmitted respectively to the positive and negative control terminals 2012 and 2016.

A negative signal thus appears at the positive output terminal 2008 and a positive signal appears at the negative input terminal 2010. The stage 2000 has been returned to its second or reset state.

It should be noted that the functions of the delay line 2026, in addition to providing a delayed negative output signal, include maintaining the signal from the negative output terminal 2010 at the input terminals of the gate 2020 and the buffer 2028 until the input pulse has terminated.

Thus, the stage 2000 functions to respond to an input pulse by transmitting positive and negative pulses from the positive and negative control terminals 2012 and 2016, respectively and by changing states so as to interchange the signals at the positive and negative output terminals 2008 and 2010. The signal which appears at the delayed negative output terminal 2014 is the same signal as appears at the negative output terminal 2010 except that the signal is delayed for a period of time determined by the parameters of the delay line 2026.

INTRODUCTION TO DETAILED DESCRIPTION

In the following sections, the details of the units which have been shown in block form in Fig. 1 are illustrated in Figs. 15 to 26. These units will be described in terms of the logical symbols heretofore described.

DRUM STORAGE UNIT

The drum storage unit 200 shown in Fig. 15 comprises a magnetic drum 202, the recording heads 204, the reading heads 206 and the amplifier and reshaper units 208.

The recording heads 204 are coupled to the drum input lines ID. The reading heads 206a to 206m are coupled via the amplifier and reshaper units 208a to 208m to the drum output lines ODa to ODm, respectively, while the reading head 206n is directly connected to the drum output line ODn. The C0 line is connected to the retiming terminal of each of the reshapers in the amplifier and reshaper units 208a to 208j, 208l and 208m, while the C3 line is connected to the retiming terminal of the reshapers in the amplifier and reshaper units 208k and 208l$_1$.

The magnetic drum 202 may be a bronze casting with a magnetizable surface coating, and is positioned by suitable support members and rotated by a suitable motor (not shown). The recording heads 204 and the reading heads 206 are also held in fixed predetermined positions by suitable support members (not shown).

The magnetic drum 202 is theoretically divided into fourteen parallel channels 210. Channels 210a to 210j are information channels; channels 210k to 210m are control pulse channels and channel 210n is a clock pulse channel.

Clock pulse channel 210n has permanently recorded in it a 104.2 kc. signal, each pulse of which is equally placed along the channel and has a period of approximately 9.6 microseconds (hereinafter referred to as a pulse period). Thus, a clock pulse is sensed by the reading head 206n once every pulse period.

The recording heads 204a to 204j, the information channels 210a to 210j, the reading heads 206a to 206j, the amplifier and reshaper units 208a to 208j and circuitry in the selector units S–1 to S–10 of the channel selector 800 (shown in heavy outline in Fig. 24) form ten information recirculation registers respectively. The recording heads 204a to 204j are so positioned with respect to the reading heads 206a to 206j such that, at the drum rate, the time period of an information recirculation register cycle is equal to two hundred and forty-six pulse periods (forty-one characters) or approximately 2.36 milliseconds.

The control pulse channel 210k is used in conjunction with the read out control unit 450 for controlling the read out of characters from the intermediate storage units 600 and 700 to a selected information recirculation register. The recording head 204k, the control pulse channel 210k, the reading head 206k, the amplifier and reshaper unit 208k and circuitry in the read out control unit 450 (shown in heavy outline in Fig. 20) form a read out control recirculation register. The recording head 204k is so positioned with respect to the reading head 206k such that, at the drum rate, the time period of a read out control recirculation register cycle is equal to two hundred and forty-six pulse periods (forty-one characters) or approximately 2.36 milliseconds.

The control pulse channel 210l operates in conjunction with the timing pulse generator 322 for producing cyclical pulses which are utilized for timing purposes. The recording head 204l, the control pulse channel 210l, the reading head 206l, the amplifier and reshaper unit 208l and circuitry in the timing pulse generator 322 (shown in heavy outline in Fig. 18) form a timing recirculation register. The recording head 204l is so positioned with respect to the reading head 206l such that, at the drum rate, the time period of a timing recirculation register cycle is equal to two hundred and forty-six pulse periods (forty-one characters) corresponding to the time period of an information recirculation register cycle. A single pulse is recorded at the recording head 204l at the start of a timing cycle and serves as a time reference for timing pulses hereinafter referred to as T pulses. The control pulse channel 210l has two reading heads 206l$_1$ and 206l associated with it which are so positioned with respect to the recording head 204l (the reading head 206l$_1$ being spaced one hundred twenty-six and one quarter pulse periods and the reading head 206l being spaced two hundred thirty-nine and one half pulse periods from the recording head 204l) as to initiate pulses which identify the beginning of each half of an information recirculation register cycle. (The pulses on the OD1₁ and —OD1₁ line will hereinafter be referred to as TBD and —TBD pulses.)

The control pulse channel 210m also operates in conjunction with the sampling unit 1000 for controlling the simultaneous read out of five characters from a selected group of five information recirculation registers. The recording head 204m, the control pulse channel 210m, the reading head 206m, the amplifier and reshaper unit 208m and circuitry in the sampling circuit 1000 (shown in heavy outline in Fig. 26) form a sampling recirculation register. The recording head 204m is so positioned with respect to the reading head 206m such that, at the drum rate, the time period of a sampling recirculation register cycle is equal to three hundred and seventy-two pulse periods (sixty-two characters) or approximately 3.57 milliseconds.

The magnetic drum 202 rotates continuously during system operation and provides storage for character and control pulses.

CLOCK PULSE GENERATOR

The clock pulse generator 300 shown in Fig. 16 receives pulses from the clock pulse channel 210n of the magnetic drum 202 and converts them into a plurality of cyclical pulses which are used throughout the system to retime and reshape other pulses.

The output pulses of the clock pulse generator 300 are shown as being conducted to output lines. However, it should be understood, that in the figures associated with the descriptions which follow, a terminal which is illustrated as carrying a particular clock pulse is connected to the corresponding output line of the clock pulse generator 300.

Pulses are sequentially received via the ODn line from the clock pulse channel 210n of the magnetic drum 202 and are applied to the amplifier 302 where they are amplified and fed to the clipper 304 (of known type) to be shaped into square-wave pulses. These square wave pulses are fed to and amplified by the amplifier 306.

The pulses which constitute the signal at the positive output of the amplifier 306 are hereinafter identified as C3 pulses. The positive swing portion of the pulses which constitute the signal at the negative output of the amplifier 306 are hereinafter designated C1 pulses. The C1 and C3 pulses are one hundred and eighty degrees out of phase (see Fig. 17). The C pulses determine the period of a pulse period which is 9.59 microseconds long.

The positive output of the amplifier 306 is fed through the delay line 316 where the pulses are delayed for one-quarter of a pulse period and are then fed to and amplified by the amplifier 318. The pulses which constitute the signal at the positive output of the amplifier 318 are hereinafter identified as C0 pulses. The positive swing portions of the pulses which constitute the signal at the negative output of the amplifier 318 are hereinafter designated C2 pulses. As were the C1 and C3 pulses, the C0 and C2 pulses are one hundred and eighty degrees out of phase with each other. Furthermore, the C0 pulses lag their originating C3 pulses by one-quarter of a pulse period or ninety degrees, and the C2 pulses lag their corresponding C1 pulses by one-quarter of a pulse period or ninety degrees. This phase relationship is shown in Fig. 17; for example C0a lags pulse C3a and pulse C2a lags pulse C1a.

The C0 and C3 pulses are transmitted to the gate 310. Since corresponding C0 and C3 pulses are ninety degrees out of phase and overlap each other for a quarter-pulse period, there is a signal output from the gate 310 of pulses having a width equal to one-half of the width of the C0 and C3 pulses. These narrow pulses begin at the earliest coincidence of a C0 and C3 pulse at the input terminals of the gate 310 and terminate when the C3 pulse terminates.

More particularly, the C3a pulse which is transmitted to the gate 310 will prime the gate 310 so that when the C0a pulse arrives one-quarter of a pulse period later it will start to be gated through. The termination of the C3a pulse one-quarter of a pulse period after the initiation of the narrowed pulse blocks the C0a pulse at the gate 310 and thereby terminates the narrow pulse.

In an identical manner, C1 and C2 pulses are transmitted to the gate 308 and form narrow pulses. The narrow pulses formed by C1 and C2, and by C0 and C3 occur alternately and are fed via the buffer 312 through the delay line 314 where they are delayed for one-eighth of a pulse period and are then fed to the amplifier 320.

The narrow pulses are amplified by the amplifier 320. Pulses from the positive output of the amplifier 320 are hereinafter identified as N0 pulses, and the positive swing portion of the pulses from the negative output of the amplifier 320 are hereinafter designated N1 pulses.

N0 and N1 are narrow pulses which are one hundred and eighty degrees out of phase with each other. This phase relationship is shown by the pulses N0a and N1a which are generated by the pulses C0a and C3a as is illustrated in Fig. 17. N0 and N1 are utilized as inputs to numerous gates and function to remove objectionable spikes from pulses circulating in the system by permitting these gates to pass signals only for the duration of the N pulses. It should be noted that the N0 pulse always occurs during the middle of the C0 and C2 pulses and that the N1 pulse always occurs during the middle of the C1 and C3 pulses.

C0, C1, C2 and C3 are clocking pulses which establish the basic timing of the system and which are also used for reshaping purposes.

TIMING PULSE GENERATOR

The timing pulse generator 322 shown in Fig. 18 in conjunction with the timing recirculation register produces a plurality of timing pulses which are used throughout the system for timing purposes and for initiating various operations.

A positive supply bus 321 is connected via an open push button switch 324 to a first input of the gate 326. The C3 and N1 lines are connected to the remaining inputs of the gate 326. The output of the gate 326 is connected to the flip flop 328, whose positive output is coupled to one input of the gate 330. The C1 line is connected to a second input of the gate 330. The output of the gate 330 is connected to the flip flop 332 whose negative output is coupled back via a one half pulse period delay line 334 to the remaining input of the gate 330. The terminal of the push button switch 324 connected to the first input of the gate 326 is also connected to the reset terminal of each of the flip flops 328 and 332 and via the resistor 331 to a negative supply bus 333. The magnitude of the potential at the positive supply bus 321 is sufficiently positive such that when the push button 324 is closed it will override the negative potential being applied to the reset terminals of the flip flops 328 and 332 and thereby prime the flip flops 328 and 332. The output of the gate 330 is also coupled to the amplifier 336.

The earliest coincidence of a C3 pulse and a N1 pulse after closure of the push button switch 324 will cause a positive pulse to set the flip flop 328 and thereby prime the gate 330 inasmuch as the negative output of the flip flop 332 is normally at a positive potential. Consequently, the C1 pulse (which occurs one half of a pulse period after the C3 pulse) next following the setting C3 pulse passes via the gate 330 and is applied to the amplifier 336 and to set the flip flop 332. One half of a pulse period later a negative signal is applied via the delay line 334 to block the gate 330 such that one and only one pulse is passed to the amplifier 336. The push button switch 324 then opens and the flip flops 328 and 332 are reset by a negative signal from the negative supply bus 333. The amplifier 336 produces a positive and negative pulse which are applied to the start and —start lines respectively.

The positive start pulse is applied to the tape unit and the printer to activate them, to the channel selector 800 (see Fig. 24) to initiate a clear operation, to the buffer 338 (see Fig. 18), the reshaper 340, and via the one quarter of a pulse period delay line 342 to the reshaper 344. The C2 line and the C3 line are connected to the retiming terminal of the respective reshapers 340 and 344.

The start pulse is reshaped and retimed with a C2 pulse in the reshaper 340 to provide a TI pulse on the TI line, while the delayed start pulse is reshaped and retimed with a C3 pulse in the reshaper 344 to provide a TII pulse on the TII line.

The buffer 338 is connected to the amplifier 346 whose positive and negative outputs are coupled to the drum writing amplifier 348. The output of the drum writing amplifier 348 is connected via the ID1 line to the recording head 2041 (see Fig. 15) associated with the control pulse channel 2101 of the magnetic drum 202.

The OD1 line is connected to the delay line 350 having a delay period equal to eleven and three quarter pulse periods. A tap at a delay point six pulse periods from the input of the delay line 350 is coupled to the reshaper 352 whose retiming terminal is connected to the C1 line. The output of the reshaper 352 is coupled via the TA line to one input of the reshaper 354 and to the remaining input of the buffer 338 to complete the timing recirculation register having the time period of two hundred and forty-six pulse periods (forty-one characters); the control pulse channel 2101 providing a two hundred and thirty-nine and one half pulse period delay; the reshaper in the amplifier and reshaper unit 2081 providing an inherent one quarter pulse period delay; the delay line 350 providing a six pulse period delay; and the reshaper 352 providing an inherent one quarter of a pulse period delay.

The output of the reshaper 354 is connected to the T line and is coupled back via the five and three quarter pulse period delay line 360 to the remaining input of the reshaper 354 to complete a six pulse period recirculation loop (hereinafter referred to as the T recirculation loop).

A tap at a delay point six and one half pulse periods from the input of the delay line 350 is coupled to the reshaper 356 whose retiming terminal is connected to the C3 line. The output of the reshaper 356 is connected to the TAD line.

The output of the delay line 350 is connected to the reshaper 358 whose retiming terminal is connected to the C0 line and whose positive output is coupled to the T1 line.

A positive start signal enters the timing recirculation register at the buffer 338. It is properly amplified by the amplifiers 346 and 348 and recorded by the recording head 2041 on the control pulse channel 2101 of the magnetic drum 202 (see Fig. 15). After one hundred twenty-six and one quarter pulse periods the recorded pulse is sensed by the reading head 2061$_1$, amplified and reshaped and retimed with a C3 pulse by the amplifier and reshaper unit 2081$_1$ to provide a TBD and a —TBD pulse on the OD1$_1$ and —OD1$_1$ lines respectively (see Fig. 15).

After two hundred thirty-nine and one half pulse periods the recorded pulse is also sensed by the reading head 2061, amplified and reshaped and retimed with a C0 pulse by the amplifier and reshaper unit 2081 to apply a positive pulse via the OD1 line (see Fig. 15) to the delay line 350 (see Fig. 18). After being delayed for six pulse periods the pulse is reshaped and retimed with a C1 pulse by the reshaper 352 to produce a TA pulse which is applied to the reshaper 354 and is also fed back to the buffer 338 to initiate the next cycle of the timing recirculation register. The TA pulse is also injected into the T recirculation loop to provide a T pulse on the T line every six pulse periods.

After being delayed six and one half pulse periods the pulse that was applied to the delay line 350 is reshaped and retimed with a C3 pulse at the reshaper 356 to provide a TAD pulse on the TAD line. After being delayed eleven and three quarter pulse periods the pulse that was applied to the delay line 350 is also reshaped and retimed with a C0 pulse at reshaper 358 to provide a T1 pulse on the T1 line.

The reading equipment of the tape unit is connected to a buffer 362 whose output is coupled to an inverter and diode clipper unit 364 (of known type). The diode clipper is connected to a pulse shaper 366 comprising the amplifier 368, the one half pulse period delay line 370 and the gate 372. The positive output of the amplifier 368 is connected to one input of the gate 372 while the negative output is connected via the delay line 370 to the remaining input of the gate 372.

The output of the pulse shaper 366 is coupled via the flip flop 374 to one input of the gate 376, while the T line is connected to the remaining input of the gate 376. The output of the gate 376 is connected via the flip flop 378 and the three quarters of a pulse period delay line 380 to one input of the gate 382, while the T line is connected to the remaining input of the gate 382. The output of the gate 382 is connected to the amplifier 384 whose positive output is connected to the TC line and whose negative output is connected to the —TC line. The TC line is coupled via the one quarter of a pulse period delay line 386 to the TCD line, while the —TC line is coupled to the reset terminal of each of the flip flops 374 and 378 and via the one quarter of a pulse period delay line 388 to the —TCD line. A second reset terminal of the flip flop 378 is connected to the N0 line.

The reading equipment of the tape unit is connected to the buffer 362 such that when a character signal is read by the reading equipment of the tape unit a pulse recorded in any of the six channels of a storage zone of the tape is passed via the buffer 362 to the inverter and diode clipper unit 364.

The pulses applied to the buffer 362 from the tape unit are non-synchronous pulses and consequently they must be synchronized with the Drum Storage Unit 200. The T pulses initiated by the pulse in the timing recirculation register serve as a source for the synchronous pulses.

The pulse passed by the buffer 362 is reshaped to give a narrow pulse. This occurs just at the start of the second half cycle of the tape pulse. The tape pulse is inverted and clipped so as to provide a positive square wave shaped pulse starting at the beginning of the second half cycle of the tape pulse and terminating at the end of the second half of the tape pulse.

This pulse is then applied to the pulse shaper 366 where the amplifier 368 provides an amplified positive and negative pulse. The negative pulse is delayed for one half a pulse period by the delay line 370 such that a narrow positive pulse starting at the beginning of the second half cycle of the tape pulse and lasting for one half a pulse period is passed by the gate 372.

This narrow pulse is used to set the flip flop 374, which in turn allows a T pulse to pass via the gate 376 to set the flip flop 378. Flip flop 378 is necessary to insure getting at least one full T pulse, inasmuch as the gate 376 may be fired by the flip flop 374 at a time when the T pulse is already being applied thereto.

The normally negative signal at the positive output of the flip flop 378 is maintained for three quarters of a pulse period (by the delay line 380) after the flip flop 378 is set. Consequently, the gate 382 is blocked in order to prevent a partial T pulse from passing therethrough. After the three quarters of a pulse period the gate 382 is primed by the set condition of the flip flop 378.

Upon the occurrence of the next T pulse (six pulse periods later) the gate 382 now being properly primed passes a complete T pulse to the amplifier 384 which initiates production of the TC, —TC, TCD and —TCD pulses. The —TC pulse is used to reset flip flops 374 and 378 so as to be prepared for the next character sensed at the buffer 362. The N0 pulse is also applied to a reset terminal of the flip flop 378 to prevent a resetting of the flip flop 378 by the second occurring T pulse.

Thus, the timing pulse generator 322 produces a plurality of timing pulses which are used throughout the system for timing purposes.

READ IN CONTROL UNIT

The read in control unit 390 shown in Fig. 19 is composed of the main control counter 392 and the read in function table 394. The read in control unit 390 receives a TC pulse for every character read from the tape unit and provides a plurality of D.-C. signals utilized for controlling the read in of characters to the intermediate storage units 600 and 700 and for initiating certain control operations.

The main control counter 392 is a synchronous counter which receives a TC pulse for every character read from the tape unit and produces six digit parallel coded combinations of pulses for each group of forty characters.

The TI line is connected to one input of the reshaper 396 whose retiming terminal is connected to the C3 line. The output of the reshaper 396 is connected to a five and three quarter pulse period delay line 398, which has a plurality of taps at the following delay points: three quarters of a pulse period; one and three quarter pulse periods; two and three quarter pulse periods; three and three quarter pulse periods; four and three quarter pulse periods; five and one half pulse periods and five and three quarter pulse periods. Each of these delay taps, except the five and one half delay tap, is connected to one input of each of the gates 400, the TC line being connected to the remaining input of each of the gates 400. The five and one half delay tap is connected to the reshaper 402 whose retiming terminal and blocking terminal are connected to the C2 line and —39 line respectively. The output of the reshaper 402 is connected to one input of the buffer 404 and the gate 406.

The TC line is connected to one input of the buffer 408 whose output is coupled to the remaining input of the buffer 404 and the gate 406. The output of the buffer 404 is connected to one input of the gate 410 while the N0 line is connected to a second input of the gate 410. The output of the gate 406 is connected to the amplifier 412 whose positive output is connected via a one pulse period delay line 414 to the remaining input of the buffer 408 and whose negative output is connected to the remaining input of the gate 410. The output of the gate 410 is coupled back to the remaining input of the reshaper 396.

A TI pulse initially enters the main control counter 392 at the reshaper 396 and circulates around the recirculation loop composed of the reshaper 396, the delay line 398, the reshaper 402, the buffer 404 and the gate 410. Inasmuch as there is an inherent quarter of a pulse period delay in each of the reshapers 396 and 402 and a five and one half pulse period delay in the delay line 398, the recirculation loop has a time period equal to six pulse periods.

The TI pulse circulates around the recirculation loop until the first pulse to be counted, namely, the TC pulse, is applied to the buffer 408. At this time the previously inserted TI pulse is at the output of the delay line 398 and consequently at one input of the gate 400a. Thus, the TC pulse being applied to the gates 400 will read out the signal 000001 indicating that one character has been read from the tape unit. Also at this time, the previously inserted TI pulse appears at one input to the gate 406 while the TC pulse appears at the other input. Thus, the TC pulse is passed via the gate 406 to the amplifier 412 which produces a negative signal to block the gate 410 thereby preventing the TC pulse, being applied via buffers 408 and 404, from filling the 2° position in the recirculation loop. The positive signal at the positive output of the amplifier 412 is delayed one pulse period in the delay line 414 before being applied to the buffer 408. Since it occurs one pulse period later, it passes through the buffer 404 and the now primed gate 410 to fill the 2' position in the recirculation loop.

The delayed TC pulse circulates around the recirculation loop until the second TC pulse is applied to the buffer 408. At this time the delayed TC pulse is at the four and three quarter delay tap of the delay line 398 and consequently at one input of the gate 400b. Thus, the TC pulse being applied to the gates 400 will read out the signal 000010 indicating that the second character has been read from the tape unit. Also at this time the gate 410 is not blocked and consequently the negative output of the pulse amplifier which is at a positive potential primes the gate 410 to pass pulses. Hence, the second TC pulse is passed via the buffers 408 and 404 and is applied via the gate 410 to the reshaper 396 to fill the 2° position in the recirculation loop. One pulse period later the delayed TC pulse appears at the buffer 404 and inasmuch as the gate 410 is still primed to pass pulses this delayed pulse is passed to the reshaper 396 to fill the 2' position in the recirculation loop. Therefore, when the third TC pulse comes along the signal gated out of the gates 400 will be 000011 indicating that the third character has been read from the tape unit.

By a similar process six digit parallel binary coded combinations of pulses will be produced for each group of forty characters read from the tape unit. After reading out the thirty-ninth character from the tape unit the reshaper 402 is blocked by a negative D.-C. signal on the —39 line for a sufficient period of time to clear the recirculation loop of the main control counter 392. Upon the occurrence of the fortieth character, the fortieth TC pulse is passed via the buffers 408 and 404 to enter and prime the recirculation loop of the main control counter 392 in preparation for the next group of forty characters.

The read in function table 394 shown in Fig. 19 responds to the parallel binary coded combinations of pulses produced by the main control counter 392 and provides a plurality of D.-C. signals utilized for controlling the read in of characters to the intermediate storage units 600 and 700, and for initiating certain control operations.

The outputs of the gates 400 are connected to a plurality of corresponding flip flops 416. The —TC line and the NI line are connected to the inputs of the buffer 418 whose output is connected to the reset terminal of each of the flip flops 416. The positive output of the flip flop 416a is connected to one input of each of the gates 420, 424, 428 and 432 and the buffer 436, while the negative output is connected to one input of each of the gates 422, 426, 430 and 434 and to one input of the buffer 437. The positive output of the flip flop 416b is connected to a second input of each of the gates 422, 424, 430 and 432 and to a second input of the buffer 436, while the negative output is connected to a second input of each of the gates 420, 426, 428 and 434 and to a second input of the buffer 437. The positive output of the flip flop 416c is connected to the remaining inputs of the gates 426, 428, 430, 432 and the buffer 436, while the negative output is connected to the remaining inputs of the gates 420, 422, 424 and 434 and the buffer 437.

The outputs of the gates 420, 422, 424, 426, 428, 430, 432 and 434, and the buffers 436 and 437 are connected to the 1' line, the 2' line, the 3' line, the 4' line, the 5' line, the 6' line, the 7' line, the 8' line, the —8' line and the −7′ line respectively. The 1′ line and the TC line are connected to the inputs of the A–B binary counter 438. The positive output of the counter 438 is connected to the A line while the negative output is connected to the B line.

The positive output of the flip flop 416d is connected to one input of the gate 445 while the negative output is connected to one input of the gate 440. The positive output of the flip flop 416e is connected to one input of the buffer 442, while the negative output is connected to a second input of the gate 440 and to one input of the gate 444. The positive output of the flip flop 416f is connected to a second input of the buffer 442 and to one input of the gate 446, while the negative output is connected to the remaining inputs of the gates 440 and 444 respectively, to one input of the gate 448 and to one input of the buffer 449.

The outputs of the gate 440 and the 1′ line are coupled to the inputs of the gate 441. The −8′ line is connected to the remaining input of the buffer 442. The 8′ line is connected to one input of the gate 443. The 1′, 2′ and 3′ lines are connected to the inputs of the buffer 447 whose output is connected to a second input of the gate 445. The output of the gate 444 is connected to the remaining inputs of the gates 443 and 445 respectively. The 6′ line and 8′ line are connected to the remaining inputs of the gates 446 and 448 respectively. The −7′ line is connected to the remaining input of the buffer 449. The outputs of the gates 441, 443, 445, 446 and 448 and the buffers 442 and 449 are connected to the 1 line, the 8 line, the RO-Set line, the 38 line, the 40 line, the −8 line and the −39 line respectively.

When the first parallel coded combination of pulses (corresponding to the first character and the binary number 000001) is applied to the flip flops 416 only the flip flop 416a is set. The negative output of each of the flip flops 416b and 416c are at a positive potential thereby priming the gate 420 such that when the flip flop 416a is set a positive D.-C. signal is passed via the gate 420 to the 1′ line. (This signal is utilized to open a first storage register in one of the intermediate storage units, for example unit 600, to read in the first character—see Fig. 22.)

At the same time the negative outputs of the flip flops 416d, 416e and 416f are at a positive D.-C. potential thereby passing via gate 440 a positive D.-C. priming signal to the gate 441 such that when the 1′ signal is produced it is passed via the gate 441 to the 1 line. (This signal is utilized in the read out control unit 450 to set the CL flip flop 470—see Fig. 20—and as a synchronizing pulse for the tape servo since it occurs midway between the servo marks on the tape.)

The TC pulse and the 1′ signal are also applied to set the A–B binary counter 438 and produce a positive D.-C. signal on the A line and a negative D.-C. signal on the B line. (These signals are utilized to control the read in and read out of characters to and from the intermediate storage units 600 and 700—see Figs. 22 and 23.

When the second parallel coded combination of pulses (corresponding to the second character and the binary number 000010) is applied to the flip flops 416, the flip flop 416a is reset (due to the −TC and NI pulses) and the flip flop 416b is set. The negative output of the flip flop 416c is at a positive D.-C. potential thereby priming the gate 422. The negative output and the positive output of the respective flip flops 416a and 416b are simultaneously changed to a positive D.-C. potential and applied to the gate 422, while the positive output of the flip flop 416a changes to a negative D.-C. potential and is applied to block the gate 420. Consequently, the positive D.-C. signal appearing on the 1′ line is extinguished and a positive D.-C. signal is applied via the gate 422 to the 2′ line. (This signal is utilized to open the second register in the intermediate storage unit 600 to read in the second character—see Fig. 22.)

When the third parallel coded combination of pulses (corresponding to the third character and the binary number 00011) is applied to the flip flops 416, the flip flop 416a is set and the flip flop 416b remains set. The positive output and the negative output of the respective flip flops 416b and 416c are at a positive D.-C. potential thereby priming the gate 424. The positive output of the flip flop 416a is changed to a positive D.-C. potential and applied to the gate 424, while the negative output of the flip flop 416a is changed to a negative D.-C. potential and applied to block the gate 422. Consequently, the positive D.-C. signal appearing on the 2′ line is extinguished and a positive D.-C. signal is applied via the gate 424 to the 3′ line. (This signal is utilized to open the third register in the intermediate storage unit 600 to read in the third character—see Fig. 22.)

When the fourth parallel coded combination of pulses (corresponding to the fourth character and the binary number 000100) is applied to the flip flops 416, the flip flop 416c is set and the flip flops 416a and 416b are reset. The negative outputs of the flip flops 416a and 416b and the positive output of the flip flop 416c are simultaneously changed to a positive D.-C. potential and applied to the gate 426, while the positive outputs of the flip flops 416a and 416b are changed to a negative D.-C. potential and applied to block the gate 424. Consequently, the positive D.-C. potential appearing on the 3′ line is extinguished and a positive D.-C. signal is applied via the gate 426 to the 4′ line. (This signal is utilized to open the fourth register in the intermediate storage unit 600 to read in the fourth character—see Fig. 22.)

When the fifth parallel coded combination of pulses (corresponding to the fifth character and the binary number 000101) is applied to the flip flops 416, the flip flop 416a is set and the flip flop 416c remains set. The negative output of the flip flop 416b and the positive output of the flip flop 416c are at a positive D.-C. potential thereby priming the gate 428. The positive output of the flop flop 416a is changed to a positive D.-C. potential and is applied to the gate 428, while the negative output of the flip flop 416a changes to a negative D.-C. potential and is applied to block the gate 426. Consequently, the positive D.-C. signal appearing on the 4′ line is extinguished and a positive D.-C. signal is applied via the gate 428 to the 5′ line. (This signal is utilized to open the fifth register in the intermediate storage unit 600 to read in the fifth character—see Fig. 22.)

When the sixth parallel coded combination of pulses (corresponding to the sixth character and the binary number 000110) is applied to the flip flops 416, the flip flop 416a is reset, the flip flop 416b is set and the flip flop 416c remains set. The positive output of the flip flop 416c is at apositive D.-C. potential thereby priming the gate 430. The negative output and the positive output of the respective flip flop 416a and 416b are simultaneously changed to a positive D.-C. potential and applied to the gate 430, while the negative output of the flip flop 416b is changed to a negative D.-C. potential and is applied to block the gate 428. Consequently, the positive D.-C. signal appearing on the 5′ line is extinguished and a positive D.-C. signal is applied via the gate 430 to the 6′ line. (This signal is utilized to open the sixth register in the intermediate storage unit 600 to read in the sixth character—see Fig. 22.)

When the seventh parallel coded combination of pulses (corresponding to the seventh character and the binary number 000111) is applied to the flip flops 416, the flip flop 416a is set and the flip flops 416b and 416c remain set. The positive outputs of the flip flops 416b and 416c are at a positive D.-C. potential thereby priming the gate 432. The positive output of the flip flop 416a is changed to a positive D.-C. potential and is applied to the gate 432, while the negative output of the flip flop 416a changes to a negative D.-C. potential and is applied to block the gate 430. Consequently, the positive D.-C. signal appearing on the 6' line is extinguished and a positive D.-C. signal is applied via the gate 432 to the 7' line. (This signal is utilized to open the seventh register in the intermediate storage unit 600 to read in the seventh character—see Fig. 22.)

When the eighth parallel coded combination of pulses (corresponding to the binary number 001000) is applied to the flip flops 416, the flip flops 416d is set and the flip flops 416a, 416b and 416c are reset. The negative outputs of the flip flops 416a, 416b and 416c change to a positive D.-C. signal and are applied to the gate 434, while the positive outputs of the flip flops 416b and 416c change to a negative D.-C. signal and are applied to the buffer 436 and to block the gate 432. Consequently, the positive D.-C. signal appearing on the 7' line is extinguished and a positive D.-C. signal is applied via the gate 434 to the 8' line (this signal being utilized to open the eighth register in the intermediate storage unit 600 to read in the eighth character—see Fig. 22) and a negative D.-C. signal is applied via the buffer 436 to the —8' line.

At the same time, the positive outputs of the flip flops 416e and 416f being at a negative D.-C. potential prime the buffer 442 such that when the negative D.-C. signal appears on the —8' line it is applied via the buffer 442 to the —8 line. (This signal is utilized in the read out control unit 450 to reset the C1 flip flop 470—see Fig. 20.) Also, the negative outputs of the flip flops 416e and 416f are at a positive D.-C. potential thereby applying a positive D.-C. signal via the gate 444 to the gate 445 and to prime the gate 443 such that when the positive D.-C. signal appears on the 8' line it is applied via the gate 443 to the 8 line (this signal being utilized in the channel selector unit 800 for channel switching—see Fig. 24). Further, since the positive output of the flip flop 416d is at a positive D.-C. potential it is applied to prime the gate 445.

At this time the first eight characters sequentially read from the tape unit have been stored in the intermediate storage unit 600 and certain control signals have been produced. Upon the occurrence of the ninth parallel coded combination of pulses (corresponding to the ninth character and the binary number 001001) a 1' signal is again produced (as previously described) causing the A-B binary counter to be set to its second state and produce a positive B signal and a negative A signal. Consequently, the intermediate storage unit 700 is opened for read in and blocked for read out and the intermediate storage unit 600 is blocked for read in and opened for read out (see Figs. 22 and 23). At the same time the 1' signal is passed via the buffer 447 and the gate 445 to the RO-Set line (the signal on this line being utilized in the read out control unit 450 to initiate a read out cycle). These next eight 1' to 8' signals (produced in a manner as previously described) cause the next eight characters (the ninth to the sixteenth character) to be read in to the intermediate storage unit 700.

Additionally, the successive tenth and eleventh parallel coded combinations of pulses cause the production of the 2' and 3' signals (in a manner as previously described) which are passed via the buffer 447 and the gate 445 to the RO-Set line to maintain a positive signal thereon.

In a similar manner every odd group of eight characters are sequentially caused to be read in to the intermediate storage unit 600 (while every even group of eight characters are sequentially caused to be read out of the intermediate storage unit 700) while every even group of eight characters are sequentially caused to be read in to the intermediate storage unit 700 (while every odd group of eight characters are sequentially caused to be read out of the intermediate storage unit 600).

When the thirty-eighth parallel coded combination of pulses (corresponding to the thirty-eighth character and the binary number 100110) is applied to the flip flops 416, the flip flop 416a is reset, the flip flop 416b is set and the flip flops 416c and 416f remain set. The positive output of the flip flop 416f is at a positive D.-C. potential thereby priming the gate 446. The output of the gate 439 is changed to a positive D.-C. potential (in the manner as previously described) and applied at 6' line to be passed via the gate 446 to the 38 line (the signal on the 38 line is utilized in the Converter 500—see Fig. 21—to set the S flip flop 550).

When the thirty-ninth parallel coded combination of pulses (corresponding to the thirty-ninth character and the binary number 100111) is applied to the flip flop 416 the flip flop 416a is set and the flip flops 416b, 416c and 416f remain set. The negative output of the flip flop 416f is at a negative D.-C. potential thereby priming the buffer 449. The output of the buffer 437 is changed to a negative D.-C. potential (in a manner as previously described and is applied via the —7' line to pass via the buffer 449 to the —39 line). The signal on the —39 line is utilized in the main control counter 392 to clear the recirculation loop in preparation for the start of a new counter cycle.

When the fortieth —TC pulse occurs it operates in conjunction with the NI pulse to apply a negative signal via the buffer 418 to reset the flip flops 416. Consequently, the negative output of the flip flop 416f is changed to a positive D.-C. potential and a positive D.-C. signal appears on the 8' line (in a manner as previously described) to pass a positive signal via the gate 448 to the 40 line. (The signal on the 40 line is utilized in the channel selector 800 to set the stop flip flop 890—see Fig. 24.)

Table II shows the occurrence of the control signals produced by the read-in control unit 390 during each complete forty character cycle hereinafter referred to as the read-in control cycle.

Table II

| Period | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|---|---|---|---|---|---|---|---|---|---|---|---|---|---|---|---|---|---|---|---|
| Line: | | | | | | | | | | | | | | | | | | | | | | | | | | | | | | | | | | | | | | | | |
| 1' | | | | | | | | | x | | | | | | | | x | | | | | | | | x | | | | | | | | x | | | | | | | |
| 2' | | x | | | | | | | | x | | | | | | | | x | | | | | | | | x | | | | | | | | x | | | | | | |
| 3' | | | x | | | | | | | | x | | | | | | | | x | | | | | | | | x | | | | | | | | x | | | | | |
| 4' | | | | x | | | | | | | | x | | | | | | | | x | | | | | | | | x | | | | | | | | x | | | | |
| 5' | | | | | x | | | | | | | | x | | | | | | | | x | | | | | | | | x | | | | | | | | x | | | |
| 6' | | | | | | x | | | | | | | | x | | | | | | | | x | | | | | | | | x | | | | | | | | x | | |
| 7' | | | | | | | x | | | | | | | | x | | | | | | | | x | | | | | | | | x | | | | | | | | x | |
| 8' | | | | | | | | x | | | | | | | | x | | | | | | | | x | | | | | | | | x | | | | | | | | x |
| —8' | | | | | | | | x | | | | | | | | x | | | | | | | | x | | | | | | | | x | | | | | | | | x |
| 1 | x | | | | | | | | | | | | | | | | | | | | | | | | | | | | | | | | | | | | | | | |
| 8 | | | | | | | | x | | | | | | | | | | | | | | | | | | | | | | | | | | | | | | | | |
| —8 | | | | | | | | x | | | | | | | | | | | | | | | | | | | | | | | | | | | | | | | | |
| RO-set | | | | | | | | | x | x | x | | | | | | | | | | | | | | | | | | | | | | | | | | | | | |
| 38 | | | | | | | | | | | | | | | | | | | | | | | | | | | | | | | | | | | | | | | x | |
| —39 | | | | | | | | | | | | | | | | | | | | | | | | | | | | | | | | | | | | | | | x | |
| 40 | | | | | | | | | | | | | | | | | | | | | | | | | | | | | | | | | | | | | | | | x |

READ OUT CONTROL UNIT

The read out control unit 450 shown in Fig. 20 receives timing and initiating signals and provides control signals for controlling the read out of characters from the Intermediate Storage Units to the proper spaces in each half of a selected information recirculation register.

The $OD1_1$ line is connected to one input of the buffer 452, while the TAD line is connected to the remaining input of the buffer 452 and to the input of the I–II flip flop 454. The positive output of the I–II flip flop 454 is connected to the I line, while the negative output is connected to the II line. The reset terminal of the I–II flip flop 454 is connected to the $-OD1_1$ line.

The output of the buffer 452 is coupled to one input of the single stage binary counter 456. The RO-Set line is connected to one input of the buffer 458 whose output is connected to the remaining input of the counter 456. The positive output of the counter 456 is coupled back via a three quarters of a pulse period delay line 460 to the remaining input of the buffer 458, while the positive control output of the counter 456 is coupled to one input of the buffer 462. The OD$k$ line is connected to the remaining input of the buffer 462.

The output of the buffer 462 is coupled via the G line to the GO flip flop 464 and to one input of the reshaper 466. The N1 and CO lines are connected to the inputs of the buffer 468 whose output is connected to the re-timing terminal of the reshaper 466. The output of the reshaper 466 is coupled via the five and one half pulse period delay line 472 to one input of the buffer 474. The output of the buffer 474 is connected to one input of the two stage binary counter 476 while the C3 line is connected to the remaining input of the binary counter 476.

The binary counter 476 comprises the binary counter stage 478, a three quarters of a pulse period delay line 480 and the binary counter stage 482. The positive control output of the stage 478 is coupled via the D line to the remaining input of the buffer 474, to one input of each of the gates 484 and 486 and to one input of the stage 482. The positive output of the stage 478 is connected to one input of each of the gates 499$b$ and 499$d$, to one input of each of the buffers 497$a$ and 497$c$ and via delay line 480 to a second input of the stage 482.

The IN–D line is connected to the SRO flip flop 488 whose positive output is connected to the SRO line while its negative output is connected via the —SRO line to a second input of the gate 486. The SRO line is connected to the clear terminal of the stage 478 and to the remaining inputs of the stage 482 and the gate 484. The output of the gate 484 is coupled back to the remaining input of the reshaper 466.

The coupled reshaper 466, delay line 472, buffer 474, stage 478 and gate 484 form a character delay recirculation register. Since there is a delay of five and one half pulse periods in the delay line 472, an inherent delay of one quarter of a pulse period in the reshaper 466 and a delay of one quarter of a pulse period at the input of the binary counter 476 (due to the C3 pulse) the time period of the character delay recirculation register is equal to six pulse periods (corresponding to the period of a character).

The negative control output of the stage 478 is connected via a one quarter of a pulse period delay line 490 to one input of the buffer 492. The delayed negative output of the stage 478 is connected to a third input of the gate 486, to one input of the buffer 494 and to a second input of the buffer 492.

The negative output of the stage 478 is connected to one input of each of the gates 499$a$ and 499$c$ and to one input of each of the buffers 497$b$ and 497$d$.

The negative control output of the stage 482 is connected to a second input of the buffer 494. The delayed negative output of the stage 482 is connected to a fourth input of the gate 486, to a third input of the buffer 492 and to the remaining input of the buffer 494. The N1 line is connected to the remaining input of the buffer 492.

The negative output of the stage 482 is connected to a second input of each of the gates 499$a$ and 499$b$ and to a second input of each of the buffers 497$c$ and 497$d$.

The positive output of the stage 482 is connected to a second input of each of the buffers 497$a$ and 497$b$ and to a second input of each of the gates 499$c$ and 499$d$.

The positive output of the GO flip flop 464 is connected to the remaining inputs of each of the gates 499 while the negative output is connected to the remaining inputs of each of the buffers 497. The output of the buffer 494 and the —8′ line are connected to the reset terminals of the GO flip flop 464, while the output of the buffer 492 is connected to the reset terminal of the SRO flip flop 488.

The 1 line is connected to the input of the CL flip flop 470 whose negative output is connected via the —CL line to the remaining input of the gate 486. The reset terminal of the CL flip flop 470 is connected to the —8 line. The output of the gate 486 is connected to the amplifier 496 whose positive and negative outputs are coupled via the drum writing amplifier 498 to the ID$k$ line.

The reading head 206$k$ (see Fig. 15) associated with the control pulse channel 210$k$ of the magnetic drum 202 is so positioned with respect to the recording head 204$k$ that the portion of the control pulse channel 210$k$ between the two heads has a time period equal to two hundred and thirty-nine and three quarter pulse periods.

The coupled buffer 462, reshaper 466, relay line 472, buffer 474, stage 478 of the binary counter 476, D line, gate 486, amplifier 496, drum writing amplifier 498, ID$k$ line, recording head 204$k$, control pulse channel 210$k$, reading head 206$k$, amplifier and reshaper unit 208$k$ and the OD$k$ line form a read out control recirculation register. Since there is an inherent delay of one quarter of a pulse period in the reshaper 466, a delay of five and one half pulse periods in the delay line 472, a delay of one quater of a pulse period in the stage 478 (due to the C3 pulse), a delay of two hundred thirty-nine and three quarter pulse periods in control pulse channel 210$k$ and an inherent delay of one quarter of a pulse period in the reshaper of the amplifier and reshaper unit 208$k$, the time period of a read out control recirculation register cycle is two hundred and forty-six pulse periods (forty-one characters).

The TAD and TBD pulses which appear on the TAD and $OD1_1$ lines, respectively, are cyclical pulses continuously produced by the timing pulse generator 322. Thus, one TAD pulse and one TBD pulse is produced every information recirculation register cycle (two hundred forty-six pulse periods).

The RO-Set signal which appears on the RO-Set line is an initiating signal produced by the read in control Unit 390. Thus, one RO-Set signal is produced every read in control cycle (forty character cycle) and only after one of the intermediate storage units has been filled with characters and is, therefore, ready to read out to a selected information recirculation register.

The RO-Set signal produced by the read in control unit 390 lasts for a period long enough to allow one TAD pulse (TAD plus one quarter of a pulse period identifying the beginning of one half of each information recirculation register) and one TBD pulse (TBD plus one quarter of a pulse period identifying the beginning of the other half of each information recirculation register) to enter the read out control unit 450.

The RO-Set signal lasts for a period of approximately one and two tenth milliseconds. A TAD pulse is produced aproximately one and fifteen hundredth milliseconds (120 pulse periods) after a TBD pulse, and the TBD pulse next following the TAD pulse is produced approximately one and two tenth milliseconds (126 pulse periods) after the TAD pulse. Since a TAD or TBD pulse may occur at any time during the period of the RO-Set signal, one or two TAD or one or two TBD pulses may occur during the period of RO-Set signal. To insure passage of at least one TAD pulse and one TBD pulse per group of forty characters, and no more than one TAD and one TBD pulse the binary counter stage 456 and the delay line 460 are provided.

The RO-Set signal primes the counter 456 such that if a TAD pulse is first to occur during the period of the RO-Set signal it is passed via the buffer 452 to set the counter 456 to one state. After three quarters of a pulse period the positive output of the counter 456 passes a positive D.-C. signal via the buffer 458 to maintain a priming input to the counter 456 so that it may respond to the next following TBD pulse even after termination of the RO-Set signal. When the TBD pulse is applied to the buffer 458 it is passed to the primed counter 456 to set the counter 456 to its second state. The positive output of the counter 456 now changes to a negative D.-C. signal which is delayed three quarters of a pulse period (long enough to insure passage of the TBD pulse) by the delay line 460 before being applied to block the counter 456 from responding to any further TAD or TBD pulses after RO Set disappears until the next RO-Set signal is provided.

The TAD pulse additionally sets the I–II flip flop 454 to produce a positive D.-C. signal I identifying the first half of an information recirculation register cycle. The —TBD pulse (on the —OD1₁ line) which is produced one hundred twenty-six pulse periods later resets the I–II flip flop 454 to produce a positive D.-C. signal II identifying the second half of an information recirculation register cycle.

Now, consider the TAD pulse for the moment, since the action of the TBD pulse is identical for the other half of the selected information recirculation register. The two stages of the binary counter 476 are in a cleared condition (indicating a count of 00) and the negative outputs thereof are at a positive potential thereby priming the gate 499a, while the positive outputs thereof are at a negative potential thereby priming the buffer 497a.

When the TAD pulse entered the read out control unit 450 it set the counter 456 and via the buffer 462 caused the production of an aG pulse on the G line, which was applied to set the GO flip flop 464 (to initiate four read out signals sequentially, each one of which is for one of the first four odd characters to be read out from a previously filled intermediate storage unit) and to the reshaper 466 to enter the character delay recirculation loop. The GO flip flop 464 now being set produces a positive D.-C. signal which is passed via the gate 499a to the ROI line and a negative D.-C. signal which is passed via the buffer 497a to the —ROI line. (The ROI signal is utilized to read out the first odd character— the first character—stored in the filled intermediate storage unit and transfer it via the channel selector 800 to be stored in the proper space of a selected information recirculation register, while at the same time the —ROI signal is utilized to clear the first register of the Intermediate Storage Unit in which the first character was stored—see Fig. 22).

The SRO flip flop 448 responds to the presence or absence of pulses, representing the first character, on the IN-D line (see Figs. 20 and 24). If nothing is read out from an Intermediate Storage Unit the SRO flip flop 488 is not set and the normally negative D.-C. signal at the positive output of the SRO flip flop 488 is applied via the SRO line to the gate 484, to the clear terminal of the stage 478 and to an input terminal of the stage 482. Consequently, the character delay recirculation loop is blocked at the gate 484, the stage 478 is prevented from setting and the stage 482 is blocked. The G pulse after being delayed six pulse periods in the character delay recirculation register is applied to the counter 476. However, since a negative signal is maintained at the clear terminal of the stage 478 the delayed G pulse does not set the stage 478 but merely passes via the positive control output of the stage 478 to the D line. Since the gate 484 is blocked the delayed G pulse does not enter the character delay recirculation register but since, at this time, all the inputs to the gate 486 are positive (the delayed negative outputs of the stages 478 and 482, the negative output of the SRO flip flop 488 and the negative output of the CL flip flop 470) the delayed G pulse is passed by the gate 486 and inserted in the read out control recirculation register.

If, however, a character is read out from an intermediate storage unit the SRO flip flop 488 is set and a positive D.-C. signal at the positive output of the SRO flip flop 488 is applied via the SRO line to prime the binary counter 476 and the gate 484 while a negative D.-C. signal at the negative output is applied via the —SRO line to the gate 486 to thereby block the read out control recirculation register.

Assuming that the first character has been read out from a filled intermediate storage unit the first delayed G pulse enters the counter 476 and sets the stage 478 to its first state. The positive control output of the stage 476 produces a positive pulse which is applied, via the D line, to the gate 484 where it is inserted into the character delay recirculation register and to one input of the stage 482. The stage 478 after being set applies a positive pulse via the delay line 480 to another input of the stage 482. However, this pulse is delayed for three quarters of a pulse period before it is applied to the stage 482, by which time the positive pulse at the positive control output has terminated and the stage 482 is blocked and remains in a cleared condition. Consequently, the counter 476 stands at a count of 10.

The GO flip flop 464 still being in a set condition and the stage 482 being in a cleared condition prime the gate 499b and the buffer 497b. When the stage 478 is set to its first state the positive output thereof changes to a positive D.-C. signal which is passed via the gate 499b to the RO2 line, while the negative output at the stage 478 simultaneously changes to a negative D.-C. signal which is passed via the buffer 497b to the —RO2 line. The negative signal at the negative output of the stage 478 and the positive signal at the positive output of the stage 478 block the gate 499a and buffer 497a respectively. Thus, after six pulse periods (corresponding to the period of the first odd character) the ROI and —ROI signals are terminated and the RO2 and —RO2 signals are initiated causing the second odd character (the third character stored in the filled intermediate storage unit to be transferred via the channel selector 800 to the proper space in the selected information recirculation register, while the register of the intermediate storage unit in which the second odd character is stored is being cleared.

The first delayed G pulse is delayed a second time for six pulse periods (long enough to insure that the second odd character has been read out of the filled intermediate storage unit) by the character delay recirculation register before reentering the counter 476 to set the stage 478 to its second state.

When the stage 478 is set to its second state by the second delayed G pulse, the positive output thereof changes from a positive D.-C. signal to a negative D.-C. signal. The negative D.-C. signal at the positive output of the stage 478 is delayed for three quarters of a pulse period by the delay into 480 before being applied to the stage 482. Hence, the stage 482 remains primed for three quarters of a pulse period after the stage 478 is set to its second state. The positive control output of the stage 478 produces a positive pulse when it is set to its second state which is applied via the D line to set the stage 482 to its first state and to insert, via the gate 484, the second delayed G pulse into the character delay recirculation register. Consequently, since the stage 478 is set to its second state and the stage 482 is set to its first state, the counter 476 stands at a count of 01.

The GO flip flop 464 still being in a set condition primes the gate 499c and the buffer 497c. The positive output of the stage 482 and the negative output of the stage 478 simultaneously change to a positive D.-C. signal which is passed via the gate 499c to the RO3 line, while the positive output of the stage 478 and the negative output of the stage 482 simultaneously change to a negative D.-C. signal which is passed via the buffer 497c to the —RO3 line.

The negative D.-C. signal at the negative output of the stage 482 and the positive D.-C. signal at the negative output of the stage 478 blocks the gate 499b and the buffer 497b respectively. Three quarters of a pulse period after the stage 482 is set to its first state a negative D.-C. signal is applied via the delayed negative output of the stage 482 to one input of each of the buffers 492 and 494.

Thus, after another six pulse periods (corresponding to the period of the second odd character) the RO2 and —RO2 signals terminate and the RO3 and —RO3 signals are initiated causing the third odd character (the fifth character) stored in the filled intermediate storage unit to be transferred via the channel selector 800 to the proper space in the selected information recirculation register, while the register of the intermediate storage unit in which the third odd character is stored is being cleared.

The second delayed G pulse is delayed a third time for six pulse periods (long enough to insure that the third odd character has been read out of the filled intermediate storage unit) by the character delay recirculation register before re-entering the counter 476 to set the stage 478 to its first state. When the stage 478 is set to its first state by the third delayed G pulse the positive output thereof changes from a negative D.-C. signal to a positive D.-C. signal. The positive D.-C. signal at the positive output of the stage 478 is delayed for three quarters of a pulse period by the delay line 480 before being applied to the stage 482. Hence, the stage 482 remains blocked for three quarters of a pulse period after the stage 478 is set to its first state. A positive pulse is produced at the positive control output of the stage 478 which is applied via the D line to the stage 482. The positive pulse has no effect on the stage 482 as it is blocked for a longer period than that of the positive pulse on the D line and, therefore, the stage 482 remains set in its first state. Consequently, since the stages 478 and 482 are set to their first state, the counter 476 stands at a count of 11.

The GO flip flop 464 still being in a set condition and the stage 482 still being set to its first state prime the gate 499d and the buffer 497d. The positive output of the stage 478 changes to a positive D.-C. signal which is passed via the gate 499d to the RO4 line, while the negative output of the stage 478 simultaneously changes to a negative D.-C. signal which is passed via the buffer 497d to the —RO4 line. The negative D.-C. signal at the negative output of the stage 478 and the positive D.-C. signal at the positive output of the stage 482 blocks the gate 499c and the buffer 497c respectively. Three quarters of a pulse period after the stage 478 is set to its first state a negative D.-C. signal is applied via the delayed negative output of the stage 478 to a second input of each of the buffers 492 and 494.

Thus, after another six pulse periods (corresponding to the period of the third odd character) the RO3 and —RO3 signals terminate and the RO4 and —RO4 signals are initiated causing the fourth odd character (the seventh character) stored in the filled Intermediate Storage Unit to be transferred via the Channel Selector 800 to the proper space in the selected information recirculation register while the register of the Intermediate Storage Unit in which the fourth odd character is stored is being cleared.

The third delayed G pulse is delayed a fourth time for six pulse periods (long enough to insure that the fourth odd character has been read out of the filled intermediate storage unit) by the character delay recirculation register before re-entering the counter 476 to set the stage 478 to its second state. When the stage 478 is set to its second state by the fourth delayed G pulse the positive output thereof changes from a positive D.-C. signal to a negative D.-C. signal. This negative signal is delayed for three quarters of a pulse period by the delay line 480 before being applied to the stage 482. Hence, the stage 482 remains primed for three quarters of a pulse period after the stage 478 is set to its second state. The positive control output of the stage 478 produces a positive pulse which is applied via the D line to set the stage 482 to its second state and to insert, via the gate 484, the fourth delayed G pulse into the character delay recirculation register. Consequently, since the stages 478 and 482 are set to their second state, the counter 476 is in a cleared condition and stands at a count of 00.

When the stage 482 is set to its second state a negative pulse is applied via the negative control output of the stage 482 to the buffer 494. Since the delayed negative outputs of the stages 478 and 482 maintain negative D.-C. signals at the remaining inputs of the buffer 494 for three quarters of a pulse period after the stages 478 and 482 are set to their second state, the negative pulse produced at the negative control output of the stage 482 is passed via the buffer 494 to reset the GO flip flop 464 and terminate the read out operation by blocking the gates 499 and the buffers 497 (thereby terminating the RO4 and —RO4 signals).

One quarter of a pulse period after the stage 478 is set to its second state, a negative pulse produced at the negative control output of the stage 478 is applied from the delay line 490 to prime the buffer 492 inasmuch as the delayed negative outputs of the stages 478 and 482 maintain negative signal at two other inputs of the buffer 492 for three quarters of a pulse period after the stages 478 and 482 are set to their second state. One eighth of a pulse period later a narrow negative N1 pulse is passed via the remaining input of the buffer 492 to reset the SRO flip flop 488 causing a negative D.-C. signal to be produced on the SRO line and a positive D.-C. signal to be produced on the —SRO line.

The negative signal on the SRO line is applied to the gate 484, the clear terminal of the stage 478 and to an input terminal of the stage 482. Consequently, the character delay recirculation register is blocked at the gate 484, the stage 478 is prevented from setting and the stage 482 is blocked so that it will not respond to any pulses.

The positive signal on the —SRO line is applied to prime the gate 486 inasmuch as a positive signal is present at each of the delayed negative outputs of the stage 478 and 482 and at the negative output (—CL line) of the CL flip flop 470.

Since the fourth delayed G pulse is applied via the D line to one input of the gate 484 for three eighths of a pulse period before the SRO flip flop 488 applied the negative signal to the other input of the gate 484, a narrowed fourth delayed G pulse is passed by the gate 484 to enter the character delay recirculation register. The narrowed pulse is reshaped, retimed and delayed a fifth time for six pulse periods of the character delay recirculation register.

Since a negative signal is maintained at the clear terminal of the stage 478 the fifth delayed G pulse does not set the stage 478 but merely passes via the positive control output of the stage 478 to the D line. Since the gate 484 and the stage 482 are blocked by the negative signal on the SRO line, the fifth delayed G pulse cannot enter the character delay recirculation register or set the stage 482. However, since the gate 486 is primed, the fifth delayed G pulse is passed via the gate 486 to enter the read out control recirculation register where it is delayed for an additional time period corresponding to two hundred and forty pulse periods before being applied to the G line again.

Thus, the fourth delayed G pulse is delayed for a total time period equal to two hundred and forty-six pulse periods (the time period of the read out control recirculation register) which corresponds to the time period of an information recirculation loop.

At this time the first, third, fifth and seventh characters of a forty character group have been read out from the filled intermediate storage unit to the proper spaces in the selected information recirculation register. The binary counter 476 has been cleared and the GO flip flop 464 and the SRO flip flop 488 have been reset. Consequently, the read out control unit 450 is now prepared to receive a TBD pulse which initiates another similar read out cycle for controlling the transfer of the second, fourth, sixth and eighth characters to the proper spaces in the second half of the selected information recirculation register.

Now, the fourth delayed G pulse in the first odd character store operation (previously described) after having been delayed for a time period equal to a complete information recirculation register cycle produces a G pulse corresponding to the space in the information recirculation register for storing the next odd character, namely, the ninth character. Thus, a second odd character store operation is initiated to store the ninth, eleventh, thirteenth and fifteenth characters at the proper spaces in the selected information recirculation register.

The fourth delayed G pulse, in the first even store operation, after having been delayed for a time period equal to a complete information recirculation register cycle produces a G pulse corresponding to the space in the information recirculation register for storing the next even character, namely, the tenth character. Thus, a second odd character store operation is initiated to store the tenth, twelfth, fourteenth and sixteenth characters at the proper spaces in the selected information recirculation register. In similar fashion half of the selected information recirculation register is filled with the odd characters of a forty character group, while the other half is filled with the even characters of a forty character group.

When a group of forty characters has been completely read from the intermediate storage units 600 and 700 and stored in the selected information recirculation register a new information recirculation register is selected to store the next group of forty characters. Therefore, the complete read out control cycle must start over again. When the read in control unit 390 (see Fig. 19) produces the next 1 signal it is applied to set the CL flip flop 470 (see Fig. 20) which applies a negative D.-C. signal via the —CL line to block the gate 486 and clear the read out control recirculation register in preparation for the new read out control cycle. When the read in control unit 390 (see Fig. 19) produces the next —8 signal (after a period long enough to insure that the read out control recirculation register is cleared) it is applied to reset the CL flip flop 470 (see Fig. 20), and apply a positive D.-C. signal via the —CL line to be used to positively condition the gate 486 in preparation for the new read out control cycle.

The read out control unit 450 is now prepared to receive the next pair of TAD and TBD pulses and the RO-Set signal to initiate the new read out control cycle.

PARALLEL TO SERIAL AND TAPE TO DRUM FREQUENCY CONVERTER

The converter 500 shown in Fig. 21 receives characters at the tape rate, each character being composed of a parallel coded combination of signals, from the six parallel channels of the tape and converts them into serial coded combinations of pulses at the drum rate, each serial coded combination of pulses representing a character. The converter 500 also responds to a predetermined coded character signal and produces a signal (on the S line) which initiates the production of a control signal to stop the tape unit 100 and the printer 1100.

The tape unit 100 is coupled to one input of each of the six gates 502 corresponding to the six channels of the tape. The TC line is connected to the remaining input of each of the gates 502.

The output of the gate 502a is coupled to the input of the reshaper 504a, while the outputs of the gates 502b to 502f are coupled to one input of the corresponding reshapers 504b to 504f. The C3 line is connected to the retiming terminal of each of the reshapers 504.

The output of each of the reshapers 504a, 504b, 504c, 504d and 504e is connected to each of corresponding three-quarters of a pulse period delay lines 506a, 506b, 506c, 506d and 506e while the output of the reshaper 504f is connected to the IN-S line.

The output of the delay line 506a is connected to one input of the gate 508 and to the remaining input of the reshaper 504b. The 38 line is connected to the remaining input of the gate 508 whose output is connected to the input of the S flip flop 550. The —Start line is connected to the reset terminal of the S flip flop 550.

The output of each of the delay lines 506b, 506c, 506d and 506e is connected to the remaining input of each of the reshapers 504c, 504d, 504e and 504f respectively.

The positive half cycle of a signal applied to any one of the gates 502 is used to gate a TC pulse to the corresponding reshaper 504 where it is reshaped and retimed with a C3 pulse. Each TC pulse after being reshaped and retimed is delayed for three-quarters of a pulse period (except the TC pulse passed by the gate 502f) by the delay lines 506. Consequently, since there is a one-quarter of a pulse period delay inherent in each reshaper 504 and three-quarters of a pulse period delay in each delay line 506, each TC pulse passed by the gates 502a, 502b, 502c, 502d and 502e is delayed one pulse period before passing to the subsequent reshaper.

To further illustrate, assume that a parallel coded combination of signals corresponding to the binary number 100101 is applied to the gates 502.

The signal applied to the gate 502f gates a TC pulse to the reshaper 504f where it is reshaped and delayed for one-quarter of a pulse period before being applied to the IN-S line so as to correspond to the $2^0$ position.

The signal applied to the gate 502d gates a TC pulse through the reshaper 504d and delay line 506d where it is reshaped and delayed for one pulse period before being applied to the reshaper 504e. The one pulse delayed TC pulse is then passed via the reshaper 504e and delay line 506e where it is reshaped and delayed for an additional pulse period before being applied to the reshaper 504f. The two pulse delayed TC pulse is then passed via the reshaper 504f where it is reshaped and delayed for an additional one-quarter of a pulse period before being applied to the IN-S line so as to correspond to the $2^2$ position.

Likewise, the signal applied to the gate 502a gates a TC pulse similarly through the reshapers 504 and delay lines 506 such that the TC pulse is delayed for a sufficient period of time before being applied to the IN-S line so as to correspond to the $2^5$ position. Thus, a serial coded combination of pulses corresponding to the binary number 100101 is produced on the IN-S line. Furthermore, the serial coded pulses are produced one pulse period apart at the clock pulse rate (or drum rate).

In all printing operations, the printing activity code, which is the thirty-eighth character of each block of characters read from the tape, must be examined. If this character has a one in the most significant bit position (1 - - - - -) a TC signal is passed via the reshaper 504*a* and delay line 506*a* to the gate 508. Inasmuch as a positive D.-C. signal is applied via the 38 line to the other input of the gate 508, corresponding in time to the thirty-eighth character, the delayed TC pulse is passed via the gate 508 to set the S flip flop 550 and produce a positive D.-C. signal on the S line. This signal functions to initiate a stop signal (see Fig. 24) which is applied to stop the tape unit 100 and printer 1100 at the end of that block, when the block marker is read by the photoelectric means of the tape unit 100. Consequently, the block of data in which the print activity code appeared will not be printed out by the printer 1100.

When next the tape unit 100 and printer 1100 are started by a Start pulse, a —Start pulse is applied to reset the S flip flop 550 in preparation for the next printing activity character.

Thus, the converter 500 functions to convert parallel coded character signals at the tape rate to serial coded character signals at the drum rate and to produce a signal which initiates the stopping of both the tape unit 100 and the printer 1100.

INTERMEDIATE STORAGE UNITS

The intermediate storage units 600 and 700 shown in Figs. 22 and 23 are each composed of eight storage registers each one of which is capable of storing a single character. The intermediate storage units 600 and 700 function during each odd intermediate storage cycle in such a manner that when a group of eight data characters are being sequentially read in to the intermediate storage unit 600 from the converter 500 (under control of the read in control unit 390) a group of eight previously stored data characters are being sequentially read out from the intermediate storage unit 700 (under control of the read control units 390 and 450) and applied via the channel selector 800 to a selected information recirculation register. The intermediate storage units 600 and 700 reverse functions during each even intermediate storage cycle such that characters are sequentially read in to the intermediate storage unit 700 while characters are being sequentially read out from the intermediate storage unit 600.

The intermediate storage unit 600 is composed of eight storage registers each of which includes an input gate 602, a one character recirculation loop (composed of the reshaper 604, the gate 606 and the delay line 608), an output gate 610 and a control buffer 612. A control gate 614 is coupled to all of the odd storage registers while a control gate 616 is coupled to all of the even storage registers.

The IN–S line and the A line are connected to a pair of inputs of each of the input gates 602. The 1' to 8' lines are respectively connected to the remaining input of each of the input gates 602.

The outputs of the input gates 602 are connected to one input of the reshapers 604 respectively. The outputs of the reshapers 604 are connected to one input of the gates 606 respectively. The outputs of the gates 606 are coupled back via the corresponding five and three-quarter pulse period delay lines 608 to the remaining inputs of the reshapers 604 respectively. The CO line is connected to the retiming terminal of each of the reshapers 604.

The A line is connected to one input of each of the control buffers 612. The —RO2 line is connected to a second input of each of the control buffers 612*a* and 612*b*; the —RO2 line is connected to a second input of each of the control buffers 612*c* and 612*d*; the —RO3 line is connected to a second input of each of the control buffers 612*e* and 612*f*; the —RO4 line is connected to a second input of each of the control buffers 612*g* and 612*h*. The I line is connected to the remaining input of each of the control buffers 612*b*, 612*d*, 612*f* and 612*h*, while the II line is connected to the remaining input of each of the control buffers 612*a*, 612*c*, 612*e* and 612*g*. The outputs of the control buffers 612 are connected to the remaining inputs of the gates 606 respectively.

The B line and the I line are connected to the inputs of the control gate 614 whose output is connected to one input of of each of the output gates 610*a*, 610*c*, 610*e* and 610*g*. The B line and the II line are connected to the inputs of the control gate 616 whose output is connected to one input of each of the gates 610*b*, 610*d*, 610*f* and 610*h*. The RO1 line is connected to a second input of each of the output gates 610*a* and 610*b*; the RO2 line is connected to a second input of each of the output gates 610*c* and 610*d*; the RO3 line is connected to a second input of each of the output gates 610*e* and 610*f*; the RO4 line is connected to a second input of each of the output gates 610*g* and 610*h*. The outputs of the reshapers 604 are connected to the remaining inputs of the output gates 610 respectively. The output gates 610 are respectively connected to the OS1 to OS8 lines.

The intermediate storage unit 700 is composed of eight storage registers each of which includes an input gate 702, a one character recirculation loop (composed of the reshaper 704, the gate 706 and the delay line 708), an output gate 710 and a control buffer 712. A control gate 714 is coupled to all of the odd storage registers while a control gate 716 is coupled to all of the even storage registers.

The IN–S line and the B line are connected to a pair of inputs of each of the input gates 702. The 1' to 8' lines are respectively connected to the remaining input of each of the input gates 702.

The outputs of the input gates 702 are connected to one input of the reshapers 704 respectively. The outputs of the reshapers 704 are connected to one input of the gates 706 respectively. The outputs of the gates 706 are coupled back via the corresponding five and three-quarter pulse periods delay lines 708 to the remaining inputs of the reshapers 704 respectively. The CO line is connected to the retiming terminal of each of the reshapers 704. The B line is connected to one input of each of the control buffers 712. The —RO1 line is connected to a second input of each of the control buffers 712*a* and 712*b*; the —RO2 line is connected to a second input of each of the control buffers 712*c* and 712*d*; the —RO3 line is connected to a second input of each of the control buffers 712*e* and 712*f*; the —RO4 line is connected to a second input of each of the control buffers 712*g* and 712*h*. The I line is connected to the remaining input of each of the control buffers 712*b*, 712*d*, 712*f* and 712*h*, while the II line is connected to the remaining input of each of the control buffers 712*a*, 712*c*, 712*e* and 712*g*. The outputs of the control buffers 712 are connected to the remaining inputs of the gates 706 respectively.

The A line and the I line are connected to the inputs of the control gate 714 whose output is connected to one input of each of the output gates 710*a*, 710*c*, 710*e* and 710*g*. The A line and the II line are connected to the inputs of the control gate 716 whose output is connected to one input of each of the gates 710*b*, 710*d*, 710*f* and 710*h*. The RO1 line is connected to a second input of each of the output gates 710*a* and 710*b*; the RO2 line is connected to a second input of each of the output gates 710*c* and 710*d*; the RO3 line is connected to a second input of each of the output gates 710*e* and 710*f*; the RO4 line is connected to a second input of each of the output gates 710*g* and 710*h*. The outputs of the reshaper 704 are connected to the remaining inputs of the output gates 710 respectively. The output gates 710 are respectively connected to the OS9 to the OS16 lines.

The A and B signals are initiated at the start of an intermediate storage cycle and last for a complete intermediate storage cycle before being switched. Thus, assume that a positive D.-C. signal exists on the A line and a negative D.-C. signal exists on the B line. Consequently, the positive A signal is applied to prime the input gates 602 to read in characters from the converter 500 and via buffers 612 to prime the recirculation registers to store the characters read in, while the negative B signal is maintained via the control gates 614 and 616 to block the output gates 610 and prevent characters from being read out.

When the first character is transmitted by the converter 500 to the intermediate storage unit 600 a positive 1' signal is applied from the read in control unit 390 to open the input gate 602a such that the first character may be stored in the first storage register of the intermediate storage unit 600.

When the second character is transmitted by the converter 500 to the intermediate storage unit 600 the positive 1' signal is terminated thereby closing the input gate 602a and a positive 2' signal is applied from the read in control unit 390 to open the input gate 602b such that the second character may be stored in the second storage register of the intermediate storage unit 600.

When the third character is transmitted by the converter 500 to the intermediate storage unit 600 the positive 2' signal is terminated thereby closing the input gate 602b and a positive 3' signal is applied from the read in control unit 390 to open the input gate 602c such that the third character may be stored in the third storage register of the intermediate storage unit 600. In a similar manner the remaining characters of a group of eight characters are sequentially stored in the remaining storage registers of the intermediate storage unit 600.

During the time that a group of eight characters are being sequentially read in to the intermediate storage unit 600 a group of eight characters must be sequentially read out of the intermediate storage unit 700 so that during the next intermediate storage cycle a group of eight characters can be read in to the intermediate storage unit 700 while the previously stored group of eight characters in the intermediate storage unit 600 can be read out.

Reading from the intermediate storage unit 700 to the selected information recirculation register is a function of the information recirculation register position at the time the intermediate storage unit 700 is ready to read out. An intermediate storage unit, when filled, cannot be read out to the selected information recirculation register until the proper place to store the characters is reached. Since the odd numbered characters and the even numbered characters are stored in separate halves of the selected information recirculation register, signals (the I and II signals) identifying the two halves must be provided. It is also necessary to furnish signals (the A and B signals) to distinguish between the intermediate storage unit to be filled and the intermediate storage unit to be emptied and to furnish signals (the RO1, RO2, RO3 and RO4 signals) to indicate the proper spaces to record in each half of the selected information recirculation register.

At the start of the intermediate storage cycle it was assumed that a positive D.-C. signal existed on the A line and a negative D.-C. signal existed on the B line. Let it also be assumed that the intermediate storage unit 700 is filled with eight characters and is ready to read out. Hence, the positive A signal is applied to prime the control gates 714 and 716 while the negative B signal is applied to block the input gates 702 thereby preventing characters from being read into the intermediate storage unit 700.

A quarter of a pulse period before the beginning of the first half of an information recirculation register cycle the timing pulse generator 322 produces a TAD pulse in a manner as previously described, to set the I–II flip flop 454 (see Fig. 20) thereby producing a positive I signal and a negative II signal and initiating a read out operation to sequentially produce the RO1 to RO4 signals.

The positive I signal produced by the read out control unit 450 is passed via the primed control gate 714 (see Fig. 23) to prime the odd output gates 710a, 710c, 710e and 710g.

The RO1 signal opens the first odd output gate 710a such that the first odd character stored in the first storage register of the intermediate storage unit 700 may be passed via the output gate 710a to the OS1 line (to be stored in the first space in the first half of the selected information recirculation register). The negative B, II and —RO1 signals are applied to the control buffer 712a which in turn applies a negative signal to block the gate 706a and thereby clear the first storage register of the intermediate storage unit 700 at the same time that the first odd character is being read out.

When the proper space to store the second odd character in the information recirculation register is reached the positive RO1 signal is terminated thereby closing the first odd output gate 710a and a positive RO2 signal is produced to open the second odd output gate 710c such that the second odd character stored in the third storage register of the intermediate storage unit 700 may be passed via the output gate 710c to the OS2 line (to be stored in the second space in the first half of the selected information recirculation register). The negative B, II and —RO2 signals are applied to the control buffer 712c which in turn applies a negative signal to block the gate 706c and thereby clear the third storage register of the intermediate storage unit 700 at the same time that the second odd character is being read out.

When the proper space to store the third odd character in the information recirculation register is reached the positive RO2 signal is terminated thereby closing the second odd output gate 710c and a positive RO3 signal is produced to open the third odd output gate 710e such that the third odd character stored in the fifth storage register of the intermediate storage unit 700 may be passed via the output gate 710e to the OS5 line (to be stored in the third space in the first half of the selected information recirculation register). The negative B, II and —RO3 signals are applied to the control buffer 712e which in turn applies a negative signal to block the gate 706e and thereby clear the fifth storage register of the intermediate storage unit 700 at the same time that the third odd character is being read out.

When the proper space to store the fourth odd character in the information recirculation register is reached the positive RO3 signal is terminated thereby closing the third odd output gate 710e and a positive RO4 signal is produced to open the fourth odd output gate 710g such that the fourth odd character stored in the seventh storage register of the intermediate storage unit 700 may be passed via the output gate 710g to the OS7 line (to be stored in the fourth space in the first half of the selected information recirculation register). The negative B, II and —RO4 signals are applied to the control buffer 712g which in turn applies a negative signal to block the gate 706g thereby clearing the seventh storage register of the intermediate storage unit 700 at the same time that the fourth odd character is being read out.

Thus, at this time, the first four odd characters have been sequentially read out of the intermediate storage unit 700 to the proper spaces in the first half of the selected information recirculation register and the first four odd storage registers have been cleared in preparation to read in another group of four characters. A quarter of a pulse period before the beginning of the second half of an information recirculation register cycle the timing pulse generator 322 produces a TBD and —TBD pulse, in a manner as previously described, initiating another read out operation by sequentially producing the RO1 to RO4 signals and causing the I–II flip flop to be reset (see Fig. 20) thereby producing a negative I signal and a positive II signal.

The positive II signal produced by the read out control unit 450 is passed via the primed control gate 716 (see Fig. 23) to prime the even output gates 710b, 710d, 710f and 710h, while the negative I signal causes a negative signal to be passed via the control gate 714 to block the odd output gates 710a, 710c, 710e and 710g.

The RO1 signal opens the first even output gate 710b such that the first even character stored in the second storage register of the intermediate storage unit 700 may be passed via the output gate 710b to the OS2 line (to be stored in the first space in the second half of the selected information recirculation register). The negative B, I and —RO1 signals are applied to the control buffer 712b which in turn applies a negative signal to block the gate 706b and thereby clear the second storage register of the intermediate storage unit 700 at the same time that the first even character is being read out.

When the proper space to store the second even character in the information recirculation register is reached the positive RO1 signal is terminated thereby closing the first even output gate 710b and a positive RO2 signal is produced to open the second even output gate 710d such that the second even character stored in the fourth storage register of the intermediate storage unit 700 may be passed via the output gate 710d to the OS4 line (to be stored in the second space in the second half of the selected information recirculation register). The negative B, I and —RO2 signals are applied to the control buffer 712d which in turn applies a negative signal to block the gate 706d and thereby clear the fourth storage register of the intermediate storage unit 700 at the same time that the second even character is being read out.

When the proper space to store the third even character in the informaiton recirculation register is reached the positive RO2 signal is terminated thereby closing the second even output gate 710d and a positive RO3 signal is produced to open the third even output gate 710f such that the third even character stored in the sixth storage register of the intermediate storage unit 700 may be passed via the output gate 710f to the OS6 line (to be stored in the third space in the second half of the selected information recirculation register). The negative B, I and —RO3 signals are applied to the control buffer 712f which in turn applies a negative signal to block the gate 706f and thereby clear the sixth storage register of the intermediate storage unit 700 at the same time that the third even character is being read out.

When the proper space to store the fourth even character in the information recirculation register is reached the positive RO3 signal is terminated thereby closing the third even output gate 710f and a positive RO4 signal is produced to open the fourth even output gate 710h such that the fourth even character stored in the eighth storage register of the intermediate storage unit 700 may be passed via the output gate 710h to the OS8 line (to be stored in the fourth space in the second half of the selected information recirculation register). The negative B, I and —RO4 signals are applied to the control buffer 712h which in turn applies a negative signal to block the gate 706h and thereby clear the eighth storage register of the intermediate storage unit 700 at the same time that the fourth even character is being read out.

At the termination of this intermediate storage cycle a 1' signal is produced to set the A–B binary counter 438 (see Fig. 19) to its second state thereby producing a positive D.-C. signal on the B line and a negative D.-C. signal on the A line. Consequently, during the next intermediate storage cycle the functions of the intermediate storage units 600 and 700 are reversed such that a group of eight characters are sequentially read in to the cleared intermediate storage unit 700 from the converter 500, while the group of eight characters previously stored in the intermediate storage unit 600 is read out to the proper spaces in each half of the selected information recirculation register.

In a similar manner all of the odd characters are stored in the first half of the selected information recirculation register while all of the even characters are stored in the second half of the selected information recirculation register. When the selected information recirculation register is completely filled with a group of forty characters the channel selector 800 selects a new information recirculation register to be filled (in a manner as previously described) with the next group of forty characters.

CHANNEL SELECTOR

The channel selector 800 shown in Fig. 24 receives character signals from the intermediate storage units 600 and 700 and control signals from the tape unit 100, printer 1100 and the control unit 300 and transfers each group of forty character signals received to a selected information recirculation register, initiates the read out of a previously stored block of data and produces a control signal which stops both the tape unit 100 and the printer 1100.

The T2 line is connected to one input of the reshaper 802 whose retiming terminal is connected to the CO line. The output of the reshaper 802 is connected to the delay line 804 (having a delay period equal to two and three quarter pulse periods) which has taps at the following delay points: three quarters of a pulse period; one and three quarter pulse periods; two and one half pulse periods and two and three quarter pulse periods. Each of these delay taps except the two and one half delay tap is connected to one input of each of the gates 806 respectively. The 8 and TCD lines are connected to the inputs of the gate 808 whose output is connected to one input of the buffer 810 and to the remaining inputs of the gates 806. The two and one half delay tap of the delay line 804 is connected to a reshaper 812 whose retiming and reset terminals are respectively connected to the C3 line and the —CH3–8 line. The output of the reshaper 812 is connected to one input of the buffer 814 and the gate 816. The output of the buffer 810 is coupled to the remaining inputs of the buffer 814 and the gate 816. The output of the buffer 814 is connected to one input of the gate 818, while the NI line is connected to a second input of the gate 818. The output of the gate 816 is connected to the amplifier 820 whose positive output is connected via a one pulse period delay line 822 to the remaining input of the buffer 810 and whose negative output is connected to the remaining input of the gate 818. The output of the gate 818 is coupled back to the remaining input of the reshaper 802.

The outputs of the gates 806 are connected to the corresponding flip flops 824. The —8, NO and —TCD lines are connected to the inputs of the buffer 826 whose output is connected to the reset terminal of each of the flip flops 824. The positive output of the flip flop 824a is connected to the CH3–8 line while the negative output is connected to one input of the gate 834 and to the —CH3–8 line. The positive output of the flip flop 824b is connected to a first input of each of the gates 830 and 832, while the negative output is connected to a second input of the gate 834 and a first input of the gate 828. The positive output of the flip flop 824c is connected to the remaining inputs of the gate 828 and the gate 832, while the negative output is connected to the remaining inputs of the gates 830 and 834 respectively.

The output of the gate 828 is connected to the CH1–6 line; the output of the gate 830 is connected to the CH5–10 line; the output of the gate 832 is connected to the CH2–7 line and the output of the gate 834 is connected to the CH4–9 line. The circuitry described above comprises a selector counter 860 which is similar to the main control counter 392 (see Fig. 19).

The CH1–6 line is connected to one input of each of the selector units S–1 and S–6; the CH5–10 line is connected to one input of each of the selector units S–5 and S–10; the CH2–7 line is connected to one input of each of the selector units S–2 and S–7; the CH4–9 line is connected to one input of each of the selector units S–4 and S–9 and the CH3–8 line is connected to one input of each of the selector units S–3 and S–8. The OS1 to OS16 lines are connected to the inputs of the buffer 838 whose output is connected via the IN–D line to a second input of each of the selector units S–1 to S–10.

The BM line is connected to the flip flop 801 whose positive output is coupled to one input of the gate 805. The P' line is connected to one input of the buffer 809 while the Start line is connected to one input of the Clear flip flop 840 and to the remaining input of the buffer 809. The output of the buffer 809 is connected to the flip flop 803 whose positive output is coupled to the remaining input of the gate 805. The output of the gate 805 is connected via the P line to the remaining input of the Clear flip flop 840, to the input of the single stage binary counter 842 and to the sampling circuit 1000 (see Fig. 26). The negative control output of the counter 842 is connected via the delay line 807 (having a delay period equal to one half of a pulse period) to the reset terminals of the flip flops 801 and 803. The positive output and the negative output of the counter 842 are connected via the DA line and DB line, respectively, to a third and fourth input of each of the selector units S–1 to S–10.

The 40, CH4–9 and S lines are connected to the inputs of the gate 811 whose output is coupled to the Stop flip flop 890. The —Start line is connected to the reset terminal of the Stop flip flop 890 while the —8 line is connected to the reset terminal of the Clear flip flop 840. The negative output of the Stop flip flop 890 is connected to the Stop line (which is coupled to the printer 1100 and tape unit 100 and is used to stop the printer and tape unit). The negative output of the Clear flip flop 840 is connected via the clear line to a fifth input of each of the selector units S–1 to S–10. The OD$a$ to OD$j$ lines are connected to the remaining inputs of the selector units S–1 to S–10 respectively.

Since the circuitry of each of the selector units is identical only that associated with the first information recirculation register is described in detail. The DA, IN–D, and the CH1–6 lines are connected to the inputs of the input gate 844 whose output is connected to one input of the buffer 846. The output of the buffer 846 is connected to the amplifier 848 whose positive and negative outputs are coupled to the drum writing amplifier 850. The output of the drum writing amplifier 850 is connected via the ID$a$ line to the recording head 204$a$ associated with the information channel 210$a$ of the magnetic drum 202 (see Fig. 15). The DB and —Clear lines are connected to the inputs of the control buffer 852 whose output is coupled to one input of the gate 854. The OD$a$ line (coming from the reading head 206$a$ via the amplifier and reshaper unit 210$a$—see Fig. 15) is connected to the remaining input of the gate 854 whose output is connected to the remaining input of the buffer 846.

The selector counter 860 operates in a similar fashion as the main control counter 392 to sequentially provide positive D.-C. signals on the CH1–6 line; the CH5–10 line; the CH2–7 line; the CH3–8 line; and the CH4–9 line. The sequential stepping from line to line is controlled by a positive signal on the 8 line which occurs once for every group of forty characters.

Let it be assumed that the counter 842 is in its reset state. Consequently, a positive signal is maintained on the DB line and a negative signal is maintained on the DA line.

When the operation of the data transfer system is initiated a Start pulse is produced (in a manner as previously described) which is applied to set the Clear flip flop 804 and thereby produce a negative D.-C. signal on the —Clear line and to set the flip flop 803 and thereby prime the gate 805. The negative signals on the DA and —Clear lines are passed via the control buffers 852, in each of the selector units S–6 to S–10, to block the gates 854 thereby clearing the second group of five information recirculation registers in preparation for receiving the first block of data.

When the first positive signal is produced on the 8 line (just before the time that one of the intermediate storage units is prepared to read out) the selector counter 860 terminates the positive signal on the CH4–9 line and produces a positive D.-C. signal on the CH1–6 line which remains positive during the storing of the first group of forty characters in the first information recirculation register. At the same time a negative signal is produced on the —8 line to reset the Clear flip flop 840 (in preparation for a P signal). The signal on the —Clear line changes to a positive D.-C. signal which is passed via the control buffers 852, in each of the selector units S–6 to S–10, to prime the gates 854 which in turn primes the second group of five information recirculation registers to receive the first block of data.

The positive signals appearing on the DB and CH1–6 lines prime the input gate 844 of the selector unit S–6 such that the first group of forty characters may be passed via the IN–D line, the input gate 844 and the buffer 846 to be stored in the proper spaces of the first information recirculation register of the second group of registers in a manner as previously described.

Upon the occurrence of the next positive signal on the 8 line the selector counter 860 terminates the positive signal on the CH1–6 line and produces a positive D.-C. signal on the CH5–10 line. Consequently, the selector unit S–6 is blocked while the selector unit S–10 is opened to channel the next group of forty characters to the proper spaces in the fifth information recirculation register of the second group of registers.

Upon the occurrence of the third positive signal on the 8 line the selector counter 860 terminates the positive signal on the CH5–10 line and produces a positive D.-C. signal on the CH2–7 line. Consequently the selector unit S–10 is blocked while the selector unit S–7 is opened to channel the next group of forty characters to the proper spaces in the second information recirculation register of the second group of registers.

Upon the occurrence of the fourth positive signal on the 8 line the selector counter 860 terminates the positive signal on the CH2–7 line and produces a positive D.-C. signal on the CH3–8 line and a negative signal on the —CH3–8 line. Consequently, the selector unit S–7 is blocked while the selector unit S–8 is opened to channel the next group of forty characters to the proper spaces in the third information recirculation register of the second group of registers and the reshaper 812 is blocked to clear the recirculation loop of the selector counter 860.

Upon the occurrence of the fifth positive signal on the 8 line the recirculation loop of the selector counter 860 is again primed and the combination of negative signals on the —TCD, —8 and No lines cause the buffer 826 to pass a negative signal to reset the flip flops 824 thereby terminating the positive signal on the CH3–8 line and producing a positive signal on the CH4–9 line. Consequently, the selector unit S–8 is blocked while the selector unit S–9 is opened to channel the final group of forty characters of the first block of two hundred characters to the proper spaces in the fourth information recirculation register of the second group of registers.

Thus, a block of data comprising two hundred characters is sequentially stored in groups of forty characters in each of the second group of five information recirculation registers. Upon the occurrence of a positive pulse on the BM line (which occurs after each block of data is read to the data transfer system) it is applied to set the flip flop 801 and thereby pass a positive signal to the P line.

The positive signal on the P line is applied to the sampling circuit 1000 (see Fig. 24) to initiate read out of the first block of data from the second group of information recirculation registers, to the counter 842 and to the Clear flip flop 840.

The negative control output of the counter 842 applies a negative pulse (which is delayed long enough to insure setting of the counter 842) to reset the flip flops 801 and 803 in preparation for the next positive pulses on the BM and P' lines. The counter 842 is set to its first state such that a positive D.-C. signal and a negative D.-C. signal appear on the DA and DB lines, respectively. The clear flip flop 840 is again set to produce a negative D.-C. signal on the −Clear line. The negative signals appearing on the DA and −Clear lines are passed via the control buffers 852 in each of the selector units S–1 to S–5 to block the gates 854 in each of the selector units S–1 to S–5, thereby clearing the first group of five information recirculation registers in preparation for receiving the next block of data. The positive signal appearing on the DA line now primes the selector units S–1 to S–5 such that the selector counter 860 sequentially channels the next block of data, in groups of forty characters, to the first group of five information recirculation registers in a manner as previously described.

Thus, the second block of data is sequentially stored in the first group of five information recirculation registers at the same time that the first block of data is being read out, in parallel form, from the second group of five information recirculation registers.

Upon completion of printing the first block of data and of reading in the second block of data positive signals are applied via the P' and BM lines (in twenty-eight character printing these signals occur at approximately the same time while in forty character printing the signal on the BM line occurs first in time) causing the production of a positive pulse on the P line to initiate a new cycle of the channel selector 800 in a manner as previously described.

Hence, the two groups of selector units S–1 to S–5 and S–6 to S–10 reverse functions for each block of data.

It should be noted that when it is desired to stop both the tape unit 100 and printer 1100, the converter 500 senses a printing activity code and produces a positive signal on the S line (see Fig. 21) which is applied to one input of the gate 811 (see Fig. 24). When the last group of forty characters, of the block of data in which the printing activity character signal appeared, is stored in one of the two groups of information recirculation registers a positive signal is applied via the CH4–9 line to a second input of the gate 811. Finally when the fortieth character signal of that last group of forty characters is stored in a selected information recirculation register a positive signal is applied via the 40 line (from the read in control Unit 390—see Fig. 19) and the gate 811 to set the Stop flip flop 890.

The Stop flip flop 890 produces a negative signal on the Stop line which is applied to stop the tape unit 100 and the printer 1100 and is effective in the tape unit 100 and printer 1100 to inhibit the transfer of positive pulses on the BM and P' lines to the channel selector 800. Consequently, since the BM and P' pulses are inhibited no positive pulse is produced on the P line thereby preventing the sampling circuit 1000 (see Fig. 26) from reading out the block of data in which the printing activity character appeared from the group of information recirculation registers in which it is stored. Therefore, the printer 1100 will not print out this block of data. Further, the selector units will not be switched so that the next block of data will be read into the same group of information recirculation registers as was the block of data in which the printing activity character appeared. However, the next Start pulse which renders the tape unit 100 and printer 1100 effective also is applied to set the Clear flip flop 840 causing the group of information recirculation registers in which the block of data containing the printing activity character is stored to be cleared before the next block of data is stored therein in a manner as previously described. At the same time a negative pulse is applied via the −Start line to reset the Stop flip flop in preparation for the next time it is desired to stop both the tape unit 100 and the printer 1100.

Thus, the channel selector 800 functions to channel blocks of data into the information recirculation registers, to produce a control signal which initiates read out of blocks of data from the information recirculation registers and a control signal which stops the operation of the tape unit 100 and the printer 1100.

By way of an example of how a group of forty character signals are channeled from the tape to the first information recirculation register a time chart illustrating some of the more important control signals produced by the drum storage unit 200 (TBD), the timing pulse generator 322 (TC, TAD), the read in control unit 390 (1', 2', 3', 4', 5', 6', 7', 8', 1, 8, −8, RO-Set, 38, −39, 40, A, B), the read out control unit (I, II, G, GO, RO1, RO2, RO3, RO4, D, SRO, −CL) and the channel selector 800 (DB, DA, −Clear, CH4–9, CH1–6, CH5–10) during a representative transfer operation is shown in Fig. 32.

SERIAL TO PARALLEL CONVERTER UNIT

The converter 900 shown in Fig. 25 is composed of a group of converter units 902 corresponding to the two groups of information recirculation registers. During every odd conversion cycle the converter units 902 simultaneously receive character signals from the first group of information recirculation registers, while during every even conversion cycle the converter units 902 simultaneously receive character signals from the second group of information recirculation registers.

Each of the character signals received by the converter 900 consists of pulses and absences of pulses serially arranged in six pulse periods to represent a character. The converter 900 functions to convert each character signal received from a serial to parallel form and simultaneously transmit the pulses which represent five characters (the first character in each of the five groups of forty characters of a block of data) via the IN–P lines to the printer 1100.

The converter 900 includes five converter units 902*a* to 902*e*. Each converter unit 902 operates on one and only one character signal at a given time. The converter units 902 are primed for operation by the mutually exclusive DA and DB signals which are produced by the channel selector 800 (see Fig. 24).

Each converter unit 902 includes the gates 903 and 904, the buffer 905, the delay line 906 (having a delay period equal to five pulse periods), the gates 908 and the amplifiers 910 and transmits signals via the IN–P lines to the printer 1100. The converter unit 902*a* additionally transmit signals via the gate 912 to the E flip flops 914.

Since the circuitry of each of the converter units 902 is similar except for the gate 912 and the E flip flop 914 only that of the converter unit 902*a* is described in detail. The DB and OD*a* lines are coupled to the inputs of the gate 904*a* whose output is connected to one input of the buffer 905*a*. The DA and OD*f* lines are coupled to the inputs of the gate 903*a* whose output is connected to the remaining input of the buffer 905*a*. The output of the buffer 905*a* is connected to the delay line 906*a* and to one input of the gate 908*a*1. The delay line 906*a* has a plurality of taps at the following delay points: one pulse period; two pulse periods; three pulse periods; four pulse periods and five pulse periods. Each of these taps is connected to one input of each of the gates 908*a*. The W line is connected to the remaining inputs of each of the gates 908*a*.

The output of the gate 908*a*1 is connected to the amplifier 910*a*1 and to one input of the gate 912*a*; the output of the gate 908*a*2 is connected to the amplifier 910*a*2 and to a second input of the gate 912*a*; the output of the gate 908a3 is connected to the input of the amplifier 910a3 and to a third input of the gate 912a; the output of the gate 908a4 is connected to the amplifier 910a4 and to a fourth input of the gate 912a and the output of the gate 908a5 is connected to the amplifier 910a5 and to a fifth input of the gate 912a. The output of the gate 908a6 is connected to the amplifier 910a6 whose negative output is coupled to the remaining input of the gate 912a. The output of the gate 912a is connected to the E flip flop 914a whose reset terminal is connected to the RE line. The negative output of the E flip flop 914a is connected to the —E line. The output of the amplifiers 910a are connected to the IN–P1 to IN–P6 lines.

After the first block of data is completely stored in the second group of information recirculation registers, in a manner as previously described, a positive pulse is applied via the P line to set the binary counter 842 (see Fig. 24) to its first state thereby producing a positive signal on the DA line and a negative signal on the DB line. The positive signal on the DA line primes the gates 903 while the negative signal on the DB line blocks the gates 904 in the converter units 902.

Therefore, the groups of character signals of the first block of data are simultaneously read out of the second group of information recirculation registers via the OD*f*, OD*g*, OD*h*, OD*i* and OD*j* lines and passed via the primed gates 903 and buffers 905 to the delay lines 906.

After five pulse periods (corresponding to the delay period of the delay lines 906) a positive pulse is applied via the W line to simultaneously open the gates 908 in each of the converter units 902 to pass the character signals, in parallel form (corresponding to the first character in each group of forty characters of the first block of data) to the amplifiers 910. The character signals are amplified and passed via the IN–P lines to the printer 1100.

More particularly and by way of example, if the first character signal received by the primed gate 903a corresponds to the binary number 110101, the bit 1 corresponding to the $2^0$ position is delayed by the delay line 906a and arrives at the gate 908a6 five pulse periods after it passed through the gate 903a and the buffer 905a; the bit 0 corresponding to the $2^1$ position is delayed by the delay line 906a and arrives at the gate 908a5 five pulse periods after the first bit passed through the gate 903a and the buffer 905a. In a similar manner each of the succeeding bits arrives at its associated gate 908a five pulse periods after the first bit passed through the gate 903a and the buffer 905a. Thus, when the positive pulse is applied to the W line the character signal corresponding to the binary number 110101 is simultaneously being applied to the gates 908a1 to 908a6 and are thereby passed through to the associated amplifiers 910a1 to 910a6.

When the second character signal of each group of forty characters simultaneously arrives at the gates 908 in each of the converter units 902, a second positive signal is applied via the W line to pass these character signals, in parallel form, via the gates 908 to the amplifiers 910 where they are amplified and passed via the IN–P lines to the printer 1100 to be printed out.

In a similar manner each information recirculation register of the second group of information recirculation registers is simultaneously read out in a precessing manner to the printer 1100.

Upon completion of a conversion cycle another P signal is produced to set the binary counter 842 (see Fig. 24) to its second or reset state producing a positive signal on the DB line and a negative signal on the DA line. The positive signal on the DB line primes the gates 904 while the negative signal on the DA line blocks the gates 903 in the converter units 902. Therefore, the converter units 902 are now prepared to read out the stored second block of data from the first group of information recirculation registers and convert them to the proper form for the printer 1100, in a manner as previously described.

In twenty-eight character printing, the twenty-eighth character of a block of data is always coded corresponding to the binary number 111110. Accordingly, when this code is passed to the converter units 902a a positive pulse is passed via the associated gate 912a to set the E flip flop 914a and apply a negative signal via the —E line to the sampling circuit 1000 (see Fig. 26) where it is used to terminate any further positive pulses on the W line.

Thus, the converter 900 functions to convert each group of of forty character signals from a serial to a parallel arrangement and transmit them to the printer 1100.

SAMPLING CIRCUIT

The sampling circuit 1000 shown in Fig. 26 functions to produce a series of precisely timed pulses at the the printer rate which are used to sample character signals being applied to the converter 900.

The sampling circuit 1000 comprises the flip flops 1002, 1004 and 1006, the gates 1008, 1010, 1012, and 1014, the buffer 1016, the amplifiers 1018, 1020, and 1022, the drum writing amplifier 1024, and the delay lines 1026 and 1028.

The P line is connected to the input of the flip flop 1002 whose positive output is coupled to one input of the gate 1008. The output of the gate 1008 is connected to the flip flop 1004. The TAD line is connected to the remaining input of the gate 1008.

The positive output of the flip flop 1004 is connected to one input of the gate 1010 whose output is coupled to one input of the buffer 1016 and to the amplifier 1020. The T1 line is connected to the remaining input of the gate 1010.

The negative output of the amplifier 1020 is connected to the RE line which is coupled via the delay line 1026 (having a delay period equal to one-half of a pulse period) to the reset terminals of each of the flip flops 1002 and 1004.

The OD*m* line is connected to one input of the gate 1014 and to the remaining input of the buffer 1016 whose output is coupled to the amplifier 1018.

The positive output of the amplifier 1018 is coupled to the W line as well as to the delay line 1028 (having a delay period equal to one-quarter of a pulse period). The W line is the chief output line of the sampling circuit 1000.

The OD*l* line is connected to the remaining input of the gate 1014. The output of the gate 1014 is coupled to the flip flop 1006 whose reset terminal is connected to the RE line.

The output of the delay line 1028, the negative output of the flip flop 1006 and the —E line is connected to the input of the gate 1012 whose output is connected to the amplifier 1022. The positive and negative outputs of the amplifier 1022 are connected to the drum writing amplifier 1024 whose output is coupled to the ID*m* line.

At the start of a conversion cycle of the converter 900 a positive pulse is applied to the P line indicating that a printing operation is to be commenced. The positive pulse on the P line sets the flip flop 1002 which produces a positive D.-C. signal to prime the gate 1008. The gate 1008 passes the next TAD pulse, produced by the timing pulse generator 322, to set the flip flop 1004 which produces a positive D.-C. signal to prime the gate 1010. As previously indicated the beginning of an information recirculation register cycle occurs one-quarter of a pulse period after the TAD pulse. Consequently, at that time, the first character signal in each of the second group of five information recirculation registers is simultaneously applied to the gates 903 of the five converter units 902 of the converter 900 (see Fig. 25).

The gate 1010 passes the next T1 pulse, which occurs five pulse periods after the beginning of an information recirculation register cycle, to the amplifier 1020 and the buffer 1016 where it enters the sampling recirculation register (shown in heavy outline). The pulse is amplified by the amplifier 1018 and passed to the W line and to the delay line 1028. Since the positive signal on the W line occurs five and one-quarter pulse periods after the TAD pulse it is properly timed to sample the first character signal in each of the second group of five information recirculation registers which at this time is being simultaneously applied to the gates 908 of the converter units 902 (see Fig. 25).

The pulse in the sampling recirculation register is delayed for one-quarter of a pulse period by the delay line 1028 before being transmitted to the gate 1012. As previously indicated other inputs to the gate 1012 are received via the —E line and from the negative output of the flip flop 1006. Since these lines are normally positive the delayed pulse passes through the gate 1012 to the amplifier 1022 and from the amplifier 1022 through the drum writing amplifier 1024 to the ID*n* line (which is connected to the recording head 204*n* associated with the control pulse channel 210*n* of the magnetic drum 202—see Fig. 15).

The T1 pulse which passed via the gate 1010 to the amplifier 1020 causes a negative pulse to be applied via the negative output of the amplifier 1020 to the RE line. This negative pulse is used to reset the E flip flop 912*a* in the converter 900 (see Fig. 25) and after being delayed for one-half of a pulse period by the delay line 1026 to reset the flip flops 1002 and 1004 in preparation for the next positive pulse on the P line. Two flip flops are used in conjunction with the P line to insure that one and only one T1 pulse is gated into the sampling recirculation register.

As previously indicated each group of forty characters stored in an information recirculation register occupies forty of the forty one character spaces within a register. Thus, for example, the first group of forty characters is stored in the first information recirculation register in the following manner:

1, 3, 5, 7, 9, 11, 13, 15, 17, 19, 21, 23, 25, 27, 29, 31, 33 ,35, 37, 39,  , 2, 4, 6, 8, 10, 12, 14, 16, 18, 20, 22, 24, 26, 28, 30, 32, 34, 36, 38, 40.

A cycle of the sampling recirculation register has a time period equal to three hundred and seventy-two pulse periods (sixty-two characters) or 3.57 milliseconds (which corresponds approximately to one and a half cycles of an information recirculation register). Consequently, after being delayed 3.57 milliseconds the first pulse which entered the sampling recirculation register again appears at the W line. At the same, the second character signal in each group of forty characters of the first block of data is simultaneously being applied to the gates 908 in the converter units 902 where they are sampled by the second pulse appearing on the W line.

In a similar manner each character signal in each group of forty characters of the first block of data is simultaneously sampled by the succeeding pulses on the W line.

When the fortieth character signal in each group of forty characters of the first block of data is sampled the fortieth pulse in the sampling recirculation register is applied via the OD*m* line to the gate 1014. At the same time a pulse which occurs at time T40 is applied via the OD1 line to the gate 1014 where it is passed to set the flip flop 1006.

The negative output of the flip flop 1006 produces a negative D.-C. signal which is applied to block the gate 1012 and thereby clear the sampling recirculation register.

The next sequential P pulse sets the flip flop 1002 and, in a manner as previously described, enables the next occurring TAD pulse to pass through the gate 1008 and set the flip flop 1004. The setting of the flip flop 1004 primes the gate 1010 to pass the next occurring T1 pulse. This pulse then enters the sampling recirculation register at the buffer 1016 and is applied to the amplifier 1020 whereupon the potential at the negative output of the amplifier 1020 becomes negative and resets the flip flop 1006 causing a positive signal to appear at the negative output of the flip flop 1006 and prime the gate 1012 for the passage of the delayed T1 pulse.

The sampling cycle, as previously described, is again repeated to produce a series of timed pulses on the W line utilized to simultaneously sample, in a precessing fashion, each character signal in each group of forty characters of the second block of data.

In twenty-eight character printing, after the twenty-eighth character is sampled a negative D.-C. signal is applied from the converter 900 (see Fig. 25) via the —E line to block the gate 1012 thereby clearing the sampling recirculation register and preventing any further sampling till the next-sampling cycle.

Thus, the sampling circuit 1000 functions to respond to P signals and certaining timing and control pulses for producing a series of pulses, at the printer rate, on the W line utilized for sampling each block of data stored in the information recirculation registers.

CONCLUSION

A compact data transfer system receiving data in one form and at a predetermined rate from the storage unit of a data processor and arranging and transferring it in another form and at a different predetermined rate to a high speed printer has been described.

While the novel features of the invention as applied to a preferred embodiment have been shown and described, it will be understood that various changes in the form, details and operation of the system illustrated may be made by those skilled in the art without departing from the spirit of the invention.

What is claimed is:

1. A data transfer system for transferring sequences of characters of data from a first storage device to a second storage device, said system comprising a transfer unit having first and second transfer sections, control means for transferring successive sequences of data from said first storage device alternately to the first and second transfer sections of said transfer unit, means for transferring sequences of data alternately from said transfer sections of said transfer unit to said second storage device, and control means for said transferring means to first cause transfer of alternate characters of a sequence of characters and then to cause transfer of the remaining characters of said sequence.

2. A data transfer system for transferring characters of data from a storage device to a utilization device, said system comprising a pair of storage units, each having first and second sections, means for transferring non-sequential sequences of characters of data from said storage device alternately to the first or second section of the first of said storage units, mean for first transferring from the section of said first storage unit which is not receiving a sequence of characters, alternate characters of the data therein to the first section of the second of said storage units and for thereafter transferring the remaining characters of data from said section of said first storage unit to the second section of said storage unit, and converter means for thereafter alternately transferring successive characters of data from the first and second sections of said second storage unit to said utilization device such alternate character transfer restoring said characters to the original sequence.

3. A data transfer system for transferring a series of characters from a storage device to a utilization device, said system comprising a storage unit having a plurality of sequential character storage positions in two groups, means for transferring all of the odd numbered characters of the series of characters from said storage device to a first group of successive character storage positions of said storage unit and for then transferring all of the even numbered characters of said series to the second group of said positions such that the series of characters is stored in non-sequential character storage positions, and means for selectively transferring each of the stored characters from said storage unit at a predetermined rate such that the characters are transferred in the sequence of the original series to said utilization device.

4. A data transfer system for transferring a given series of characters from a storage device to a printer, said system comprising a recirculation register having a plurality of sequential character storage positions, means for firstly transferring alternate characters of said given series of characters from said storage device to successive character storage positions of said recirculation register and thereafter transferring the remaining characters of said given series to the remaining successive character storage positions of said recirculation register whereby the given series of characters is stored in non-sequential character storage positions and thus in a different series, and means for selectively transferring the stored characters from said recirculation register such that the sequence of characters are transferred in the sequence of the given series to said printer.

5. A data transfer system for transferring characters of data from a tape unit to a printer, said system comprising an intermediate storage unit for intermediately storing characters of data, means for sequentially transferring characters of data from said tape unit to said intermediate storage unit, a recirculation storage unit having first and second storage sections, means for storing the odd-occurring and the even-occurring characters of data from said intermediate storage unit in the first and second storage sections respectively of said recirculation storage unit, and means for transferring characters of data alternately from the first and second storage sections of said recirculation storage unit to said printer.

6. A data transfer system for transferring a group of characters including a plurality of sequences of characters from a storage device to a utilization device, said system comprising first and second storage units, a first transfer control means for controlling said storage units such that sequences of characters are transferred from said storage device alternately to said first and second storage units, a main storage unit having first and second sections, a second transfer control means for controlling said storage units such that each sequence of characters is transferred in two parts of non-sequential characters and the two parts are transferred alternately from said first and second storage units to said main storage unit, each sequence of characters being stored in a non-sequential manner in the sections of said main storage unit, until the group of characters is stored in said main storage unit, and means for selecting each character of a sequence alternately from the sections of said main storage unit for transfer to said utilization device.

7. A data transfer system for transferring a group of characters including a plurality of sequences of characters from a storage device to a utilization device comprising first and second storage units, a first transfer control means for controlling said storage units such that alternate sequences of characters are transferred from said storage device to said first and second storage units, a recirculation register having first and second sections, a second transfer control means for controlling said storage units such that sequences of characters are transferred alternately from said first and second storage units to said recirculation register, the alternate characters stored in said storage units being transferred to the first section of said recirculation register and the remaining characters stored in said storage units being transferred to the second section of said recirculation register until the group of characters is stored in said recirculation register, and means for selecting a character alternately from the sections of said recirculation register for transfer to said utilization device.

8. A data transfer system for transferring a group of characters including a plurality of sequences of characters from a tape unit to a printer, said system comprising first and second storage units, a read in control means for controlling said storage units such that successive sequences of characters are transferred from said tape unit alternately into said first and second storage units, a recirculation register having first and second portions, read out control means for controlling said storage units such that sequences of characters are read out alternately from said first and second storage units and transferred to the portions of said recirculation register, each sequence of characters being read out in two parts with each part being composed of non-sequential characters and each part being stored in a separate portion of said recirculation register, until the group of characters is stored in said recirculation register, and means for selecting a character alternately from the portions of said recirculation register for transfer to said printer.

9. A data transfer system for transferring serial blocks of data, each of which includes a predetermined number of groups of characters, from a first storage device to a second storage device, said system comprising a storage unit having first and second storage sections, a first transfer control means for controlling data transfer from said first storage device to said storage unit such that successive blocks of data are transferred from said first storage device alternately to the first and second storage sections of said storage unit, a second control means for controlling said storage unit such that the groups of characters of each block of data are sequentially stored in said storage unit, transfer means for selectively transferring blocks of data alternately from the sections of said storage unit to said second storage device, each block of data being transferred in two sections of non-sequential characters and stored in separate locations in said second storage device and a third transfer control means for controlling said transfer means such that the groups of characters of each block of data are transferred simultaneously and in parallel to said second storage device.

10. A data transfer system for transferring a group of characters including a plurality of sequences of characters from a tape unit to a printer comprising first and second storage units, a read in control means for controlling said storage units such that alternate sequences of characters are transferred from said storage device and read in to said first and second storage units, a recirculation register having first and second sections, a read out control means for controlling said storage units such that sequences of characters are read out alternately from said first and second storage units and transferred to said recirculation register, the alternate characters stored in said storage units being transferred to the first section of said recirculation register and the remaining characters stored in said storage units being transferred to the second section of said recirculation register, until the group of characters is stored in said recirculation register, and means for selecting a character alternately from the sections of said recirculation register for transfer to said printer.

11. A data transfer system for transferring blocks of data, each of which includes a predetermined number of groups of characters, each group including a plurality of sequences of characters, from a first storage device to a second storage device, said system comprising first and second storage units, a first transfer control means for controlling said storage units such that successive sequences of characters of each group of characters are transferred from said first storage device alternately to said first and second storage units, a main storage unit having first and second sections, a second transfer control means for controlling reading out of characters from said storage units such that sequences of characters of each group of characters are transferred alternately from said first and second storage units to said main storage unit, each sequence being transferred in two parts, each part being composed of non-sequential characters of said sequence and each part being transferred to a different section of said main storage unit, a third transfer control means for controlling said main storage unit such that alternate blocks of data are transferred from said storage units to the first and second sections of said main storage unit, and means for selectively transferring blocks of data alternately from the sections of said main storage unit to said second storage device.

12. A data transfer system for transferring serial blocks of data, each of which includes a predetermined number of groups of characters, each group including a plurality of sequences of characters, from a first storage device to a second storage device comprising first and second intermediate storage units, a read in control means for controlling said intermediate storage units such that alternate sequences of characters of each group of characters are transferred from said first storage device and read in to said first and second storage units, a recirculation storage unit having first and second sections, a read out control means for controlling said intermediate storage units such that sequences of characters of each group of characters are read out alternately from said first and second intermediate storage units to said recirculation storage unit, a transfer control means for controlling said recirculation storage unit such that alternate blocks of data are transferred from said intermediate storage units to the first and second sections of said recirculation storage unit, and means for selectively transferring blocks of data alternately from the sections of said recirculation storage unit to said second storage device.

13. A data transfer system for transferring serial blocks of data, each of which includes a predetermined number of groups of characters, each group including a plurality of sequences of characters, from a tape unit to a printer comprising first and second intermediate storage units, a read in control means for controlling said intermediate storage units such that alternate sequences of characters of each group of characters are transferred from said tape unit and read in to said first and second intermediate storage units, a recirculation storage unit having first and second sections, a read out control means for controlling said storage units such that sequences of characters of each group of characters are read out alternately from said first and second intermediate storage units to said recirculation storage unit, a transfer control means for controlling said recirculation storage unit such that alternate blocks of data are transferred from said intermediate storage units to the first and second sections of said recirculation storage unit, and means for selectively transferring blocks of data alternately from the sections of said recirculation storage unit to said printer.

14. A data transfer system for transferring serial blocks of data, each block of data including a predetermined number of groups of parallel coded characters, from a first storage device to a second storage device comprising a first converter for converting the parallel coded characters of each block of data to serial coded characters, a recirculation storage unit having first and second storage sections, a transfer means for transferring alternate blocks of serial coded characters to the first and second storage sections of said recirculation storage unit, a transfer control means for controlling said transfer means such that the groups of serial coded characters of each block of data are sequentially stored in said recirculation storage unit, a second converter for selectively converting the serial coded blocks of data alternately to parallel coded blocks of data for said second storage device, and converter control means for controlling said converter such that corresponding characters in the groups of characters of each block of data are converted simultaneously and in parallel.

15. A data transfer system for transferring a plurality of data characters from a storage device to a utilization device, said system comprising a pair of storage units, each storage unit for receiving and storing a sequence of data characters from said storage device, a recirculation register having a first and a second half, control means to select one storage unit to receive data from said storage device and another to transmit data to said recirculation register, devices in said control means to first determine transmission of the successive odd numbered characters of a sequence of data characters in a storage unit into the first half of said recirculation register and to thereafter determine transmission of the successive even numbered characters of the same sequence into the second half of said recirculation register, and a converter device for transferring separate data characters alternately from said halves of said recirculation register and thus in the original order to said utilization device.

16. A data transfer system for transferring a plurality of data characters from a storage device to a utilization device, said system comprising a pair of intermediate storage units, means for transferring successive sequences of data characters alternately into said storage units, a main storage unit having a first half and a second half, means for transferring successive characters of a sequence of characters in the intermediate storage unit which is not receiving a sequence from said storage device alternately into said first and second halves of said main storage unit and means effective when said main storage unit is filled with data characters, to transfer characters alternately and thus in the original order from said first and second halves of said main storage device to said utilization device.

References Cited in the file of this patent

UNITED STATES PATENTS

| | | |
|---|---|---|
| 2,207,743 | Larson | July 16, 1940 |
| 2,468,462 | Rea | Apr. 26, 1949 |
| 2,504,997 | Mason | Apr. 25, 1950 |
| 2,617,704 | Mallina | Nov. 11, 1952 |
| 2,632,044 | Light | Mar. 17, 1953 |
| 2,636,672 | Hamilton | Apr. 28, 1953 |
| 2,674,733 | Robbins | Apr. 16, 1954 |
| 2,702,380 | Brustman | Feb. 15, 1955 |
| 2,793,806 | Lindesmith | May 28, 1957 |

OTHER REFERENCES

"Automatic Computing Machinery" by the Staff of the Machine Development Laboratory of the National Bureau of Standards found in publication: "Mathematical Tables and Other Aids to Computation," by National Research Council of D.C. January 1950, pages 31 to 39.

"Universal High-Speed Digital Computers: A Magnetic Store" by Prof. F. C. Williams et al. found in: "Proceedings of Institute of Electrical Engineers," April 1950, pages 94 to 106.